(12) United States Patent
Stevens et al.

(10) Patent No.: US 9,836,703 B2
(45) Date of Patent: Dec. 5, 2017

(54) SYSTEMS AND METHODS FOR ASSESSING TEAM DYNAMICS AND EFFECTIVENESS

(75) Inventors: Ronald H. Stevens, Carlsbad, CA (US); Christine Berka, Carlsbad, CA (US); Adrienne Behneman, Carlsbad, CA (US); Daniel Levendowski, Carlsbad, CA (US)

(73) Assignee: ADVANCED BRAIN MONITORING, INC., Carlsbad, CA (US)

( * ) Notice: Subject to any disclaimer, the term of this patent is extended or adjusted under 35 U.S.C. 154(b) by 1595 days.

(21) Appl. No.: 12/980,156

(22) Filed: Dec. 28, 2010

(65) Prior Publication Data

US 2011/0213211 A1  Sep. 1, 2011

Related U.S. Application Data

(60) Provisional application No. 61/290,765, filed on Dec. 29, 2009, provisional application No. 61/417,796, filed on Nov. 29, 2010.

(51) Int. Cl.
G06Q 10/00 (2012.01)

(52) U.S. Cl.
CPC .................... G06Q 10/00 (2013.01)

(58) Field of Classification Search
CPC ..................................................... G06Q 10/00
USPC ........................................................ 434/350
See application file for complete search history.

(56) References Cited

U.S. PATENT DOCUMENTS 6,167,298 A * 12/2000 Levin ................... A61B 5/0482
                                                    600/545
2004/0229685 A1   11/2004 Smith et al.
2005/0177058 A1 *  8/2005 Sobell .................. A61B 5/0484
                                                    600/545
2007/0184420 A1   8/2007 Mathan et al.
2009/0069707 A1   3/2009 Sandford
(Continued)

FOREIGN PATENT DOCUMENTS

WO      2009090671 A2      7/2009

OTHER PUBLICATIONS

Stevens RH, Galloway, T. et al. (Jul. 19-24, 2009), Can Neurophysiologic Synchronies Provide a Platform for Adapting Team Performance?, Human Computer Interaction International, San Diego, CA., 5th International Conference, FAC 2009 Held as Part of HCI International 2009 San Diego, CA, USA, Jul. 19-24, 2009 Proceedings.*

(Continued)

*Primary Examiner* — Thomas Hong
(74) *Attorney, Agent, or Firm* — Procopio, Cory, Hargreaves and Savitch LLP

(57) ABSTRACT

Techniques for monitoring neurophysiologic indicators of the members of a team while performing one or more collaborative tasks, for analyzing the collected neurophysiologic data and environmental data, for generating feedback, and for generating assessments of the performance of the team based on the collected data are provided. Feedback can be created based on the assessments of the team performance. Assessments of team performance can be performed in real time and feedback can also be provided in real time. In other embodiments, feedback can be provided to team members and/or the team as a whole after training exercise and/or simulation has been completed.

41 Claims, 30 Drawing Sheets

(56) References Cited

U.S. PATENT DOCUMENTS

2010/0100001 A1* 4/2010 Aguilar et al. ............... 600/544
2010/0185113 A1* 7/2010 Peot .................... A61B 5/7267
                                                    600/544

OTHER PUBLICATIONS

Wikipedia, Standard Score available at < https://web.archive.org/web/20090326235017/http://en.wikipedia.org/wiki/Standard_score >, publication date Mar. 26, 2009.*
International Search Report and Written Opinion issued on Aug. 30, 2011, in corresponding PCT/US2010/062252, 7 pages.

* cited by examiner

EEG Engagement Nodal Map

EEG Workload Nodal Map

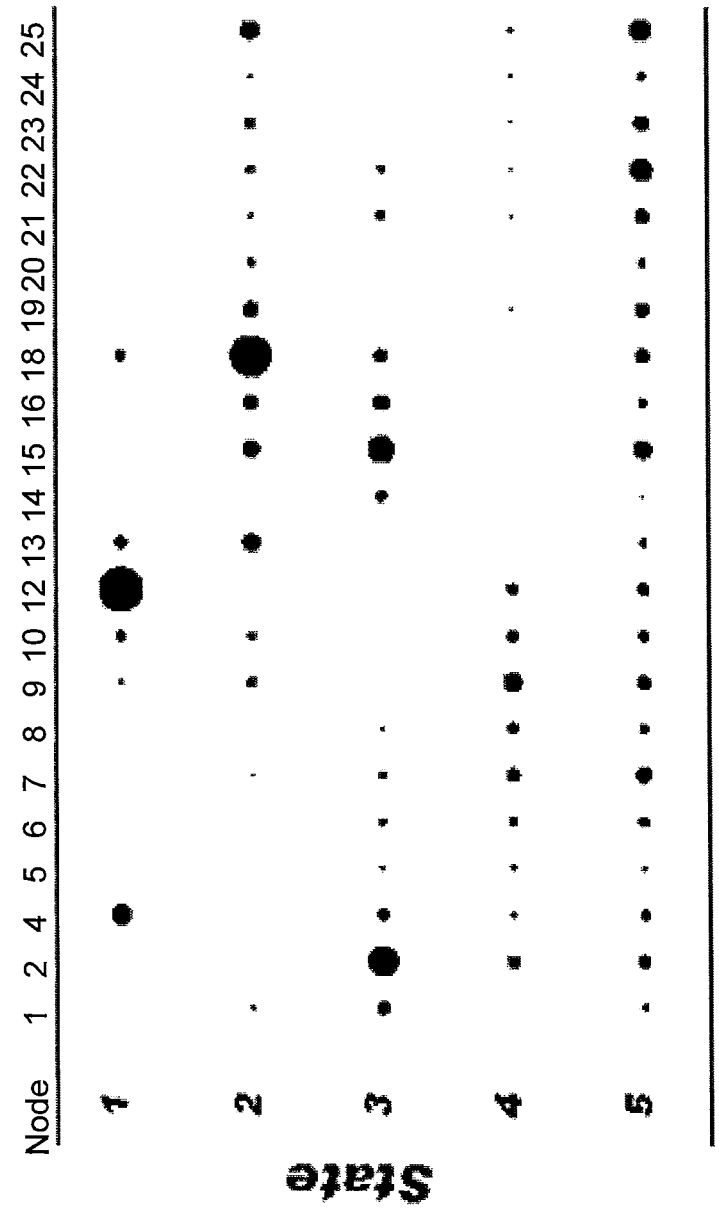
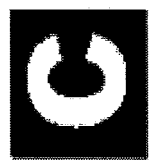
FIG. 10C

FIG. 22 Analyze Data to Identify Neurophysiologic Synchronies

FIG. 21 Normalize Data

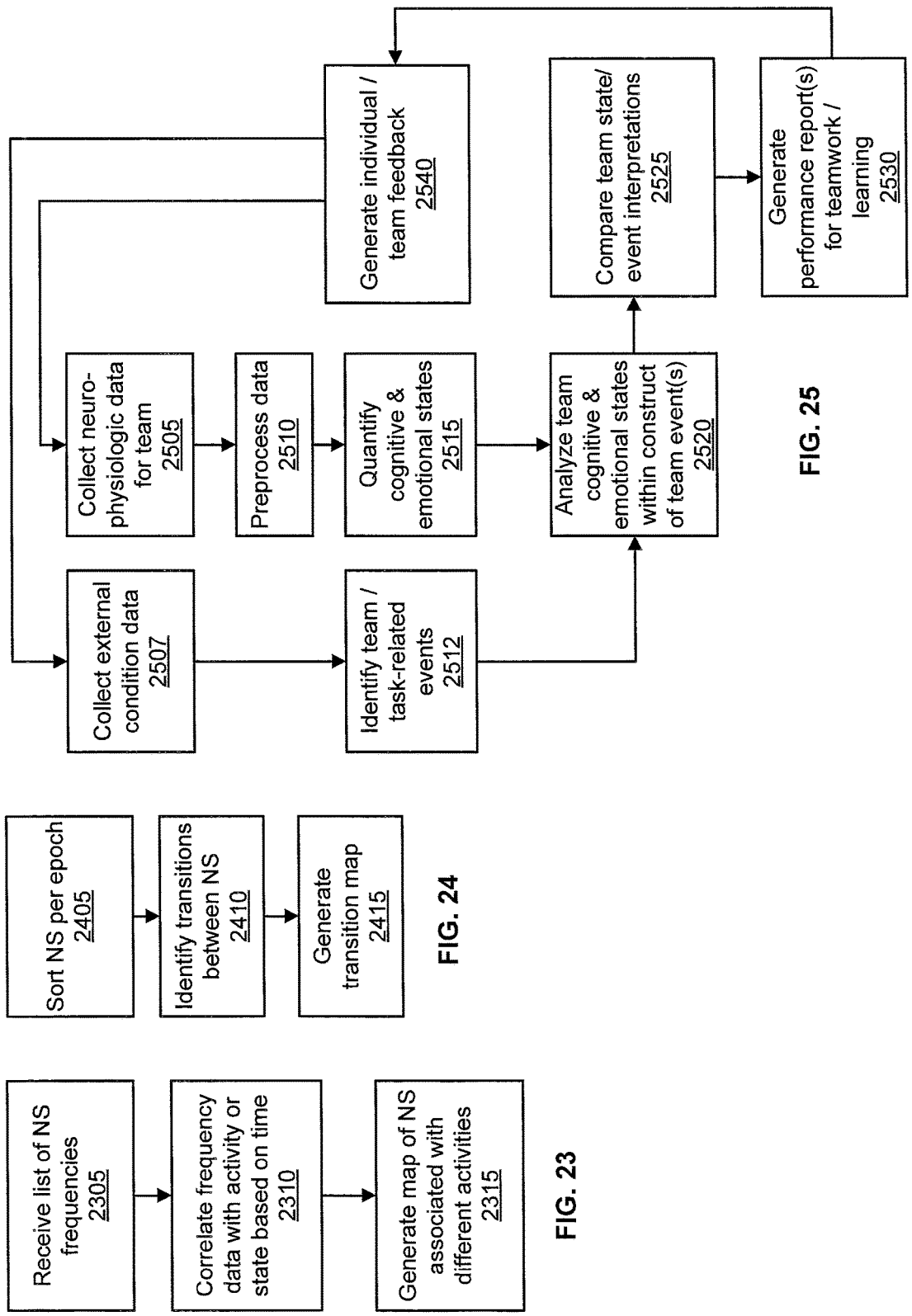

SYSTEMS AND METHODS FOR ASSESSING TEAM DYNAMICS AND EFFECTIVENESS

RELATED APPLICATION

This application claims the benefit of U.S. provisional patent application Ser. No. 61/290,765 entitled "INTERACTIVE NEURO-EDUCATIONAL TECHNOLOGY (I-NET)," filed on Dec. 29, 2009, and the benefit of provisional patent application Ser. No. 61/417,796 entitled "A SYSTEM AND METHOD FOR ASSESSING TEAM DYNAMICS AND EFFECTIVENESS," filed on Nov. 29, 2010, both of which are incorporated herein by reference in their entirety.

GOVERNMENT LICENSE RIGHTS

This invention was made with government support under contract #NBCHC090054/C09PC75596 awarded by Defense Advanced Research Projects Agency (DARPA). The government has certain rights in the invention.

FIELD OF THE INVENTION

The systems and method disclosed herein relate generally to systems and methods for identifying neurophysiologic indicators of individual and team behavior and more specifically to systems and methods for electroencephalography derived measures of engagement and workload.

BACKGROUND

A challenge in studying collaborative teamwork is the measurement of team cognition and the separation of it from aspects of individual cognition. Research on teamwork and cooperative behaviors often adopts an input-process-output framework (IPO). In this model the interdependent acts of individuals convert inputs such as the member and task characteristics to outcomes through behavioral activities directed toward organizing teamwork to achieve collective goals. These activities are termed team processes and include goal specification, strategy formulation, or systems and team monitoring.

Much of this teamwork research has made use of externalized events focusing on who is a member of the team, how they work together and what they do to perform their work. These studies often rely on post-hoc elicitation of the subjective relationships among pertinent concepts. There have been fewer studies looking at the "when" of teamwork interactions although the dynamics of team function are known to be complex with temporal models of teamwork suggesting that some processes transpire more frequently in action phases and others during transition periods. Closely related to team processes are dynamic states that characterize properties of the team that vary as a function of team context, inputs, processes and outcome. Emergent states describe cognitive, motivational and affective states of teams and can serve both as outputs and inputs in dynamic IPO models. When viewed this way, the focus shifts to when and how fast activities and change occur, and the variables move from amounts, dependencies and levels to pace, cycles and synchrony.

SUMMARY

Systems and methods are provided herein for monitoring neurophysiologic indicators of the members of a team while performing one or more collaborative tasks, for analyzing the collected neurophysiologic data and environmental data, and for generating assessments of the performance of the team based on the collected data. The tasks can include training exercises and/or simulations, and the assessments of team performance can be generated using team performance data from multiple sessions from the same team, performance collected from multiple teams, and/or expert data that can be used to assess the performance of the team. According to some embodiments, feedback can be created based on the assessments of the team performance. This feedback can be on a team member by team member basis or provided to the team as a whole. In some embodiments, information can be provided to an instructor or administrator who is tasked with monitoring or administrating a training exercise and/or simulation to inform the instructor or administrator about the state of the team to allow the instructor to intervene and make changes to the training exercise and/or simulation. According to an embodiment, assessments of team performance can be performed in real time and feedback can also provided in real time. In other embodiments, feedback can be provided to team members and/or the team as a whole after training exercise and/or simulation has been completed.

According to an embodiment, a computer-implemented method for monitoring and analyzing neurophysiologic indicators of a team is provided where one or more processors are programmed to perform the steps of the method. The method includes receiving sensor data representing neurophysiologic data collected from the members of a team while the team is performing one or more collaborative tasks, analyzing the sensor data to identify neurophysiologic synchronies exhibited by the team while performing the one or more collaborative tasks, and generating feedback for at least one member of the team based on the identified neurophysiologic synchronies exhibited by the team while performing the one or more collaborative tasks.

According to an embodiment, a technical system for monitoring and analyzing neurophysiologic indicators of a team is provided. The system includes a plurality of sensors configured to collect neurophysiologic data from members of a team and to output a signal representing a neurophysiologic data collected from each team member while the team member is performing one or more collaborative tasks. The system also includes a data analysis server comprising a non-transitory computer readable medium configured to store executable programmed modules and a processor configured to execute programmed modules stored therein. The data analysis server also comprises a data interface module, a data analysis module, and a feedback module. The data interface module is stored in the non-transitory computer readable medium and is configured to receive sensor data collected by the plurality of sensors and to receive environmental condition data related to the environment in which the one or more collaborative tasks are performed by the team. The data analysis module is stored in the non-transitory computer readable medium and is configured to identify events that occurred during the performance of the one or more collaborative tasks based on the external condition data and to analyze the sensor data to identify neurophysiologic synchronies exhibited by the team while performing the one or more collaborative tasks. The feedback module is stored in the non-transitory computer readable medium and is configured to generate feedback for at least one member of the team based on the identified neurophysiologic synchronies exhibited by the team while performing the one or more collaborative tasks.

According to an embodiment, a computer-implemented method for monitoring and analyzing neurophysiologic indicators of a team is provided where one or more processors are programmed to perform the steps of the method. The method includes receiving sensor data representing neurophysiologic data collected from the members of a team while the team is performing one more tasks, the sensor data comprising a plurality of neurophysiologic metrics collected from each member of the team, analyzing the sensor data to identify neurophysiologic synchronies exhibited by the team while performing the one or more collaborative tasks, wherein analyzing the sensor data to identify neurophysiologic synchronies exhibited by the team includes combining the plurality of neurophysiologic metrics collected from each of the members of the team into each neurophysiologic synchrony exhibited by the team, and generating feedback for at least one member of the team based on the identified neurophysiologic synchronies exhibited by the team while performing the one or more collaborative tasks.

According to an embodiment, a technical system for monitoring and analyzing neurophysiologic indicators of a team is provided. The system includes a plurality of sensors configured to collect neurophysiologic data from members of a team and to output a signal representing a neurophysiologic data collected from each team member while the team member is performing one or more collaborative tasks. The sensor data comprises a plurality of neurophysiologic metrics collected from each member of the team. The system also includes a data analysis server comprising a non-transitory computer readable medium configured to store executable programmed modules and a processor configured to execute programmed modules stored therein. The data analysis server also includes a data interface module, a data analysis module, and feedback module. The data interface module stored in the non-transitory computer readable medium and configured to receive sensor data collected by the plurality of sensors and to receive environmental condition data related to the environment in which the one or more collaborative tasks are performed by the team. The data analysis module stored in the non-transitory computer readable medium and configured to identify events that occurred during the performance of the one or more collaborative tasks based on the external condition data and to analyze the sensor data to identify neurophysiologic synchronies exhibited by the team while performing the one or more collaborative tasks, wherein analyzing the sensor data to identify neurophysiologic synchronies exhibited by the team includes combining the plurality of neurophysiologic metrics collected from each of the members of the team into each neurophysiologic synchrony exhibited by the team. The feedback module stored in the non-transitory computer readable medium and configured to generate feedback for at least one member of the team based on the identified neurophysiologic synchronies exhibited by the team while performing the one or more collaborative tasks.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 10A, 10B, and 10C are diagrams illustrating a mapping of NS states to a events during a monitored team performance according to an embodiment;

FIG. 21 is a flow diagram of a method for normalizing physiologic data for a team according to an embodiment;

FIG. 22 is a flow diagram of a method for analyzing physiologic data for a team according to an embodiment;

FIG. 23 is a flow diagram of a method for generating a neurophysiologic synchrony frequency map associated with various monitored activities or events according to an embodiment;

FIG. 24 is a flow diagram of a method for generating a transition map according to an embodiment;

FIG. 25 is a flow diagram of a method for monitoring and analyzing neurophysiologic indicators of members of multiple teams according to an embodiment;

DETAILED SPECIFICATION

Figure 1:
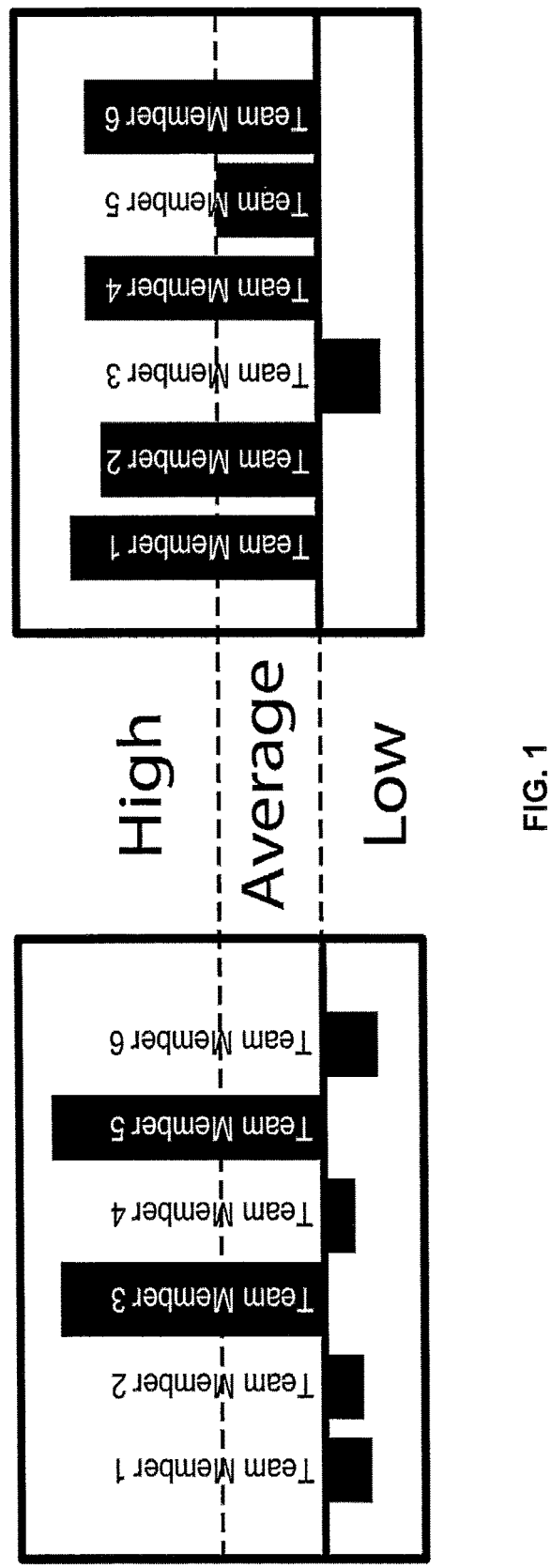
FIG. 1 is a diagram illustrating neurophysiologic measurements for each member of a six-member team according to an embodiment.

Systems and methods are provided herein for measuring cognitive or emotional states of members of a team in to detect physiologically-derived correlates of team work and team learning. In some embodiments, the derived correlates can analyze collected physiologic data and generate assessments of the performance of a team. The systems and methods disclosed herein can collect and analyze various physiologic indicators, such as electroencephalogram data (EEG), for each of the members of the team and perform a Neurophysiologic Synchrony Analysis on the collected data. Other embodiments can collect other types of neurophysiologic data using other approaches, such as measures derived from levels of EEG levels of sympathetic loader stress derived from EEG pulse rate, galvanic skin response, pupil size, or measures of cognitive or emotional state (e.g. attention, workload, engagement, interest, distractions, confusion, boredom, interest, etc.) obtained by non-neurophysiologic means (e.g., eye tracking, electrooculography (EOG), functional MRI, near-infrared spectroscopy, etc) or other neurophysiologic methods. Some embodiments can use a combination of neurophysiologic methods, such as those described herein, to provide the data used to perform a Neurophysiologic Synchrony Analysis for the team being assessed.

As described above, the conventional studies of team cognition have not focused on the "when" aspect of team cognition. One framework for studying the "when" of team cognition is macrocognition which is defined as the externalized and internalized high-level mental processes employed by teams to create new knowledge during complex collaborative problem solving. External processes (processes occurring outside the head) are those associated with actions that are observable and measurable in a consistent, reliable, repeatable manner. Internalized processes are those that cannot be expressed externally and are generally approached indirectly through qualitative metrics like think aloud protocols or surrogate quantitative metrics, (pupil size, electroencephalography (EEG) metrics, galvanic skin responses). The systems and methods disclosed herein can be used to analyze internalized processes across members of a team as the members of the team engage in teamwork tasks order to assess the performance of the team members and the team as a whole as well as provide a better understanding of team cognition.

As members of a team perform a collaborative task each will exhibit varying degrees of cognitive components such as attention, workload, engagement, etc. and the levels of these components at any one time will depend (at least) on: 1) what that person was doing at a particular time, 2) the progress the team has made toward the task goal, and 3) the composition and experience of the team. Given the temporal model of team processes, some of the balances of the components across team members may also repeat as different phases of the task, like data acquisition, or communication are repeatedly executed. The techniques disclosed herein provide systems and methods for using EEG measures of mental workload and engagement for detecting neurophysiologic correlates of teamwork. Although the studies have been developed using these measures derived by EEG it is also applicable to neurophysiologic measures derived by approaches such as galvanic skin response, pupil size, and other neurophysiologic methods.

Embodiments of the systems and methods disclosed herein can use various metrics to assess the team's performance of a collaborative task, such as a training exercise and/or a simulation. In some embodiments task specific metrics can be used to assess team performance of a collaborative task, while in other embodiments team metrics can be used to assess team performance. In yet other embodiments, a combination of task specific metrics and team metrics can be used to assess team performance.

Task specific metrics can be used to determine whether a particular team member or multiple members of a team are performing a particular task at an acceptable level. For example, the operator of the sonar system for a nuclear submarine must exhibit high levels of attention for extended periods of time while on duty. In a training exercise designed for training submarine crews, the engagement and mental workload of crewmember training for the sonar operator position can be monitored to ensure that crew member exhibits expected or acceptable levels of engagement and mental workload. One skilled in the art will recognize that different task specific metrics can be used to assess the performance of individual team members or constellations of team members and these metrics can be selected based on the types of tasks to be performed. According to some embodiments, the assessment of task specific metrics includes comparing the neurophysiologic state exhibited by a team member, by a constellation of more than one team members, or by the team as a whole to "expert" data. This expert data can be created by monitoring the neurophysiologic states exhibited by a team member, by a constellation of more than one team members, or by the team as a whole where the task specific metrics have been collected from a team that is proficient in a particular collaborative task. In some embodiments, progress of a team from a novice state to an expert state can be determined by comparing the neurophysiologic states exhibited by the team members during a series of performances of a collaborative task. The neurophysiologic states exhibited by the team members for each performance can be compared to the expert data and/or to neurophysiologic states exhibited in previous performances of the task by the same and/or other teams to determine whether the team is exhibiting neurophysiologic states indicative of progress from a novice to an expert state.

General or team metrics can also be used to assess the performance of a team. Team metrics are not tied to a specific task, but can be used to evaluate team performance. According to some embodiments, expert data can be used to identify team metrics (metrics which are indicative of whether a group is performing well as a team). For example, the neurophysiologic states exhibited by a team proficient in a collaborative task can be identified and the identified states can be compared to neurophysiologic states exhibited by other teams assigned the same or a similar collaborative task in order to determine whether the other teams exhibit similar neurophysiologic states as the expert team. Any differences in the states exhibited by the novice teams and the expert teams can be used to identify feedback that is presented to the team and/or one or more team members of the team to try improve the team's performance and to help the team progress from a novice state to an expert state.

According to an embodiment, the assessment of the neurophysiologic states exhibited by team members can be assessed in real time in order to provide real time assessments of the performance of the team and/or individual team members. For example, real time assessments can isolate performance problems exhibited by individual team members or constellations of team members that are not performing well together (and/or that are not performing their individual task well). According to some embodiments, these real time assessments allow for real time feedback and/or intervention to address the problems identified. For example, in a training exercise, real time assessments can be used to identify team members that are not performing and real time feedback can be provided to the team members and/or an administrator or trainer or leader responsible for running the training exercise.

Various types of real time feedback can be provided in response to the real time assessments of team performance. This feedback can be on a team member by team member basis or provided to the team as a whole. The type of feedback provided can also depend on the type of metric on which a real time assessment was based. For example, task specific metrics can have a type of feedback associated with the task specific metric that can help a team or team member focus on the task to be accomplished. For example, returning now to the sonar operator example described above, if a sonar operator is exhibiting low engagement during a training exercise, various task specific feedback is generated, such as haptic feedback (e.g. a haptic feedback device could be placed on the shoulder of a team member to provide feedback when the team member exhibits low engagement during the training exercise) and/or audiovisual feedback (e.g., audio instructions, textual instructions, graphical feedback on a monitor, changes to ambient lighting in the training environment).

In some embodiments, the systems and methods disclosed herein can also provide for non-real time feedback by generating reports or other information that can be used to assess the performance of a team after the team has completed a collaborate task. According to an embodiment, these reports can be used by training exercise and/or simulation designers to assess whether a particular training exercise and/or simulation is effective. The neurophysiologic states exhibited by teams performing the collaborative tasks that are part of the training exercise and/or simulation are compared with the neurophysiologic states exhibited by the teams participating in other training exercises and/or simulations that are known to be effective.

In some embodiments, information can be provided to an instructor or administrator who is tasked with monitoring or administering a training exercise and/or simulation to inform the instructor or administrator about the state of the team to allow the instructor to intervene and make changes to the training exercise and/or simulation. According to an embodiment, assessments of team performance can be performed in real time and feedback can also provided in real time. In other embodiments, feedback can be provided to team members and/or the team as a whole after training exercise and/or simulation has been completed.

In an alternative embodiment, the systems and methods disclosed herein can be used in an operational environment rather than a training environment. For example, the systems and methods disclosed herein might be employed by military teams in the field to monitor, analyze, and provide feedback to the team in real time to help to optimize the team's performance in the field. In another example, the performance of a crew of a commercial airliner, maritime vessel, such as a cruise ship or a freighter, or a commercial spacecraft could be monitored, analyzed, and feedback could be provided in real time while the crew performs a collaborative task in the field. Such field deployments could increase the safety and the efficiency of the crew while performing complex and potentially dangerous collaborative tasks in the field.

Neurophysiologic Synchronies

For the purposes of this disclosure, the term "neurophysiologic synchronies" is defined as second-by-second quantitative co-expression of the same neurophysiologic/cognitive measures by different members of a team.

FIG. 1 illustrates two examples of neurophysiologic measure being simultaneously detected from the members of a six person team. FIG. 1 provides two histograms that represent a neurophysiologic state of each member of the team at a particular point in time. In the example on the left, team members 3 and 5 expressed an above average measure of the neurophysiologic state while team members 1, 2, 4 and 6 expressed below average levels at the point in time represented by this graph.

We define neurophysiologic synchronies (NS) as the second-by-second quantitative co-expression of the same neurophysiologic/cognitive measures by different members of the team. FIG. 1 shows two examples for a putative neurophysiologic measure being simultaneously detected from the members of a six person team. In the example illustrated in the graph on the left, team members 3 and 5 expressed above average levels of this particular measure while team members 1, 2, 4 and 6 expressed below average levels at this point in time. In the example illustrated in the graph on the right, team member 3 expressed below average levels, team member 5 expressed average levels, and the other members expressed above average of this measure. Each of these graphs represents the NS profile or pattern, for the team as a whole at a particular point in time.

Example System for Collecting and Analyzing Physiologic Data

Figure 17:
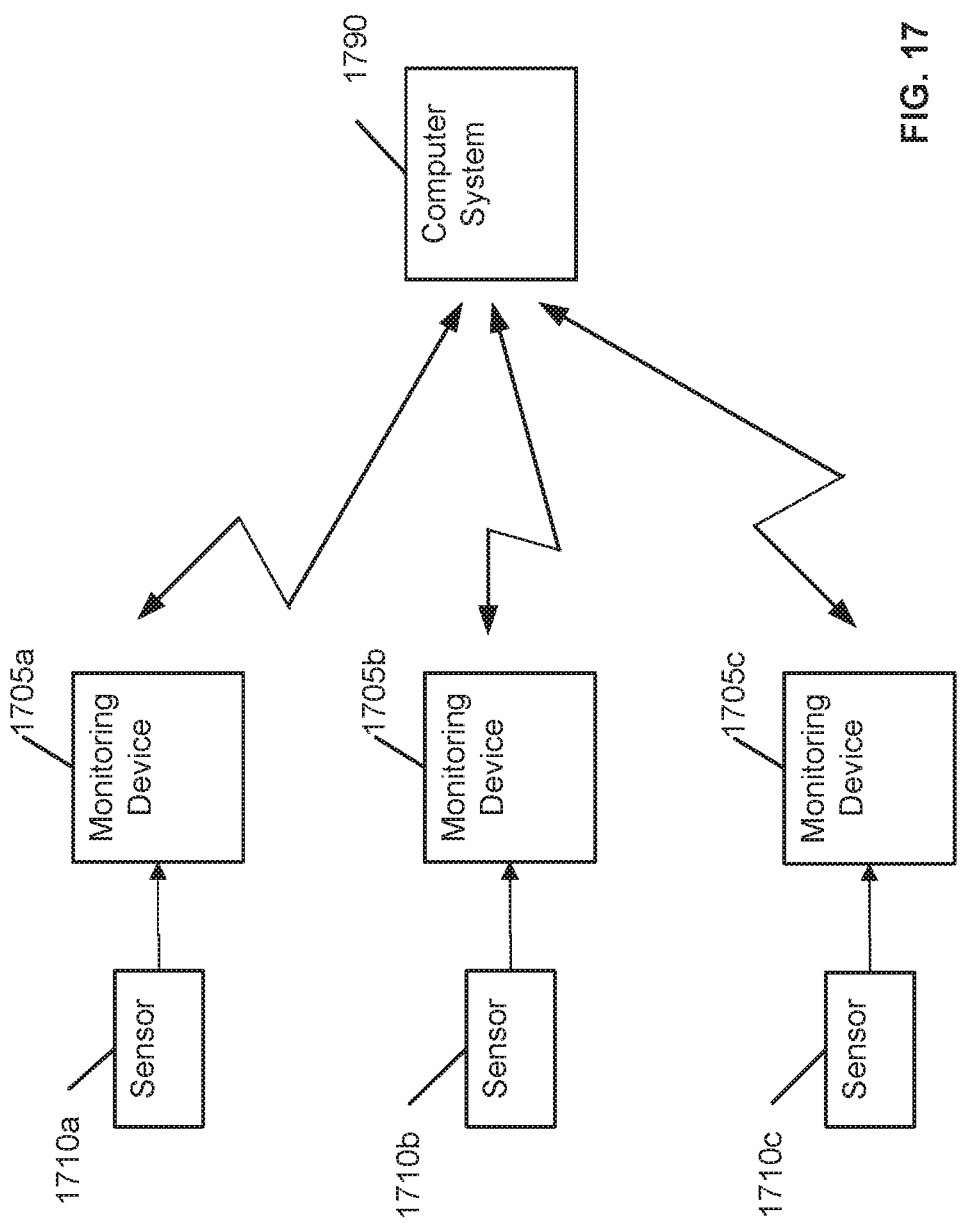
FIG. 17 is a block diagram of the functional components of a system for a neurophysiologic monitoring and analysis system according to an embodiment.

FIG. 17 is a block diagram of the functional components of a system for a neurophysiologic monitoring and analysis system that can be used to implement the various techniques described herein according to an embodiment. The neurophysiologic monitoring and analysis system illustrated in FIG. 17 is configured to collect and analyze neurophysiologic data from a team comprising three members. However, the system can be configured to collect and analyze neurophysiologic data from teams having fewer than or greater than three members. The neurophysiologic monitoring and analysis system includes one or more sensors 1710 worn by or affixed to a member of a team being evaluated, monitors 1705 configured to collect data from the sensors 1710, and a computer system 1790 configured to receive collected data from the monitors 1705 and to analyze the received data.

According to an embodiment, the sensors 1710 and the monitoring devices 1705 can be implemented using the sensors and the monitoring device Sensors 1710a, 1710b, and 1710c each collect neurophysiologic data from a member of a team whose performance is being evaluated using the neurophysiologic monitoring and analysis system. In many of the embodiments disclosed herein are electroencephalogram (EEG) sensors. However, in other embodiments, other types of sensors for collecting neurophysiologic data can be used. For example, sensors 1710a, 1710b, and 1710c can include, but are not limited to, sensors for collecting electroencephalogram (EEG) data, electrocardiogram (EKG) electrooculogram (EOG) data, electromyogram (EMG) data, respiration data, heart rate data, body movement data, galvanic skin reaction data, blood pressure data, blood flow data, blood chemistry data, behavioral responses data, or any other physiological signals that change as a function of neurocognitive or emotional state, or some combination thereof. In some embodiments, a combination of different types of sensors for collecting neurophysiologic data from the team members can be used. According to an embodiment, where the same combination of sensors is used to collect data from each of the team members in order to provide a set of neurophysiologic data that can be correlated across the team. According to an embodiment, EEG data can be acquired using the wireless, wearable, and field-deployable EEG apparatus disclosed in U.S. Pat. No. 6,640,122, which is incorporated herein by reference as if it were set forth in its entirety. According to an embodiment, the sensor data can be acquired using the sensor systems disclosed in U.S. patent application Ser. No. 12/766,322 filed on Apr. 23, 2010 entitled "Adaptive Performance Trainer," which is incorporated herein by reference as if it were set forth in its entirety.

In the embodiment illustrated in FIG. 17, each member of the team is also provided with a monitoring device 1705 that is configured to collect signal data output by the sensor devices 1170 collecting physiologic data from the team members. According to an embodiment, the monitoring device 1705 can be implemented according to the data acquisition unit disclosed in U.S. patent application Ser. No. 12/766,322 which has been incorporated by reference above. In the embodiment illustrated in FIG. 17, monitoring device 1705a is configured to collect data output by sensor 1710a, monitoring device 1705c is configured to collect data output by sensor 1710c, and monitoring device 1705c is configured to collect data output by sensor 1710c. According to an embodiment, the sensors 1710 can be configured to communicate monodirectionally or bidirectional with the monitoring device 1705 via a wired or wireless connection. For example, in some embodiments, sensor 1710 can be connected to the monitoring device 1705 via a wire lead. In other embodiments, the sensor 1710 can be connected to the monitoring device 1705 via a wireless connection, such as Bluetooth connection. In one embodiment, the sensor device can be a wireless EEG sensor developed by Advanced Brain Monitoring, Inc. of Carlsbad, Calif. disclosed in U.S. Pat. No. 6,640,122, which is incorporated herein by reference as if it were set forth in its entirety.

Monitoring device 1705 can be configured to collect and store signal data from the sensor 1705 until the signal data can be downloaded to the computer system 1790 for processing and analysis. According to some embodiments, monitoring device 1705 can be configured to perform some processing on the signal data received from sensor 1715. Monitoring device 1705 can comprises algorithms for basic signal conditioning that can be used to remove artifacts from the signal data received from sensor 1705. For example, monitor 110 can include algorithms for basic signal conditions, such as artifact recognition and rejection, band-pass filtering, other signal conditioning algorithms, or a combination thereof.

According to an alternative embodiment, the sensor data from sensors 1710a, 1710b, and 1710c can be collected directly by the computer system 1790 via wired or wireless connections. And the computer system 1790 can be configured to perform the functions of the monitoring device 1705 described herein.

Computer system 1790 can be configured to receive data collected by the monitoring systems 1705 and to process and analyze the collected data to assess team performance. Various techniques for analyzing the collected neurophysiologic data are described below. Computer system 1790 can be configured to analyze the data collected by the sensors to determine the cognitive state of each of the team member while performing various tasks.

Computer system 1790 can be configured to communicate with the monitoring device 1710 via a wired or wireless connection. For example, computer system 1790 can include an interface, such as a Universal Serial Bus (USB) interface that allows monitor device 1705 to be connected to the computer system 1790 to transfer data collected by the monitoring device 1710 to the computer system 1790 for analysis and/or to upload software and/or data to the monitoring device 1710. According to some embodiments, the computer system 1790 can include a wireless interface that can be used connect to the monitoring system 1710 in order to transfer data collected by the monitoring device 1710 to the computer system 1790 for analysis and/or to upload software and/or data to the monitoring device 1710.

Figure 18:
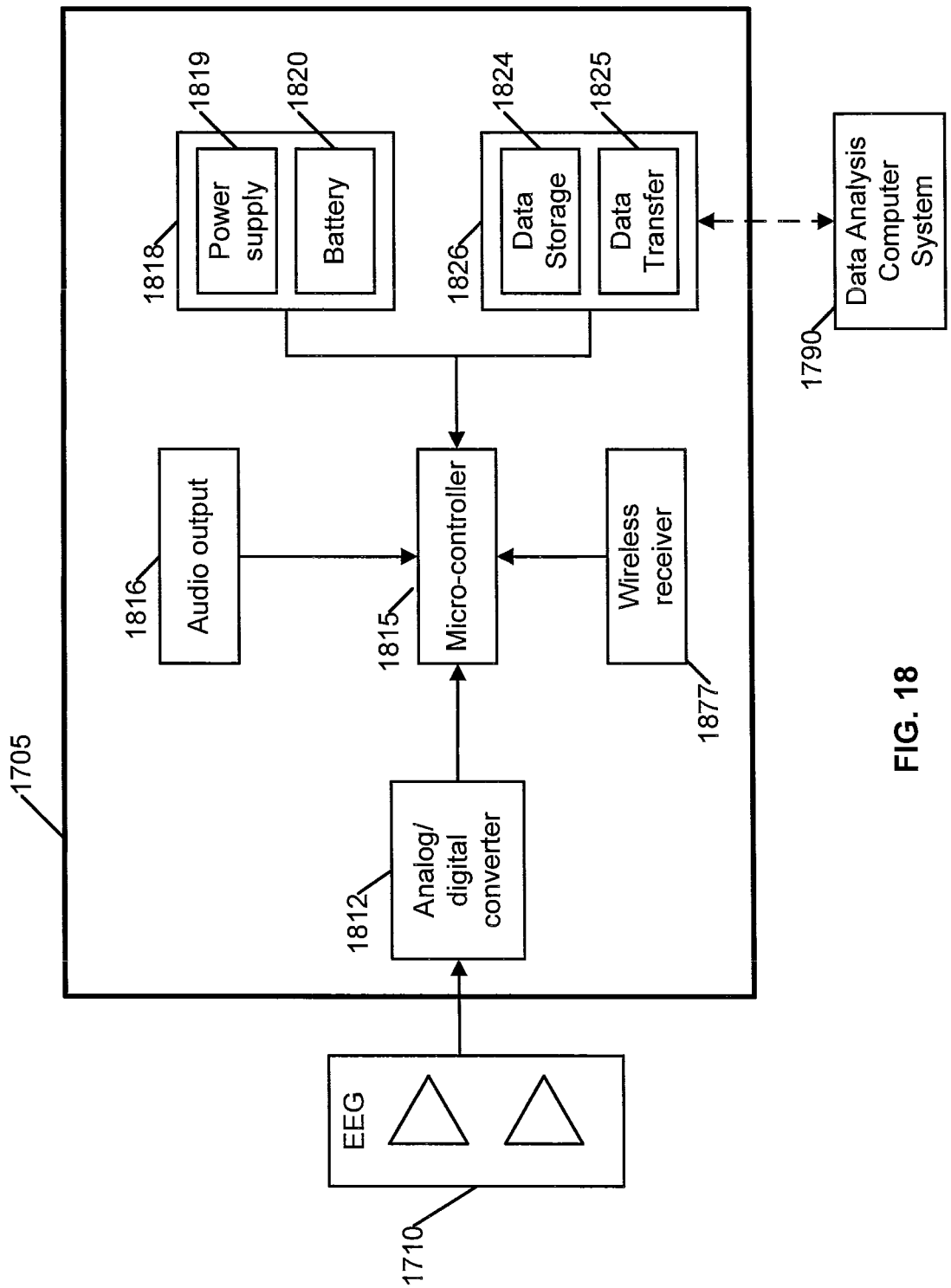
FIG. 18 is a block diagram of a data collection device that can be used to collect neurophysiologic data according to an embodiment.

FIG. 18 is a block diagram of a monitoring device that can be used to collect neurophysiologic data according to an embodiment. The monitoring device illustrated in FIG. 18 can be used to implement the monitoring device 1705 of FIG. 17.

Monitoring device 1705 includes can include an analog to digital converter (ADC) 1812 that can be used to amplify and convert analog signals received from sensor 1710 into digital signals. For example, in some embodiments, the sensor 1710 can comprise an EEG sensor that collects EEG data from a member of a team whose performance is to be analyzed and the sensor 1710 can output an analog signal via a wire connection the to monitoring device 1705. The ADC 1812 can convert the analog EEG signals received from the EEG sensor 1710 into digitals signals that can be collected by the monitoring device 1705 for analysis.

In the embodiment illustrated in FIG. 17, monitoring device 1705 includes a battery power component 1818 that includes a rechargeable lithium polymer battery 1820 and a power supply and recharging circuitry 1819 for receiving power from an external source for recharging battery 1820 and/or powering the monitoring device 1705. The battery power component 1818 allows the monitoring device 1705 to operate without requiring the monitoring device 1705 to be tethered to an external power cord or power supply, which could be inconvenient and uncomfortable for a user of the device and could impede the movements of member of team when performing various tasks to be tested. According to some embodiments, an external power supply can be used to power the device. According to other embodiments, battery 1820 can be another type of battery and in some embodiments battery 1820 can be removable and replaceable.

The monitoring device 1705 can include a memory 1824 for data storage. In an embodiment, the memory 1824 can comprise a removable Multimedia Memory or Secure Digital card or other types of removable persistent memory. In another embodiment, the memory 1824 can comprise a fixed flash chip. According to an embodiment, a data transfer interface 1825 is provided. According to an embodiment, the data transfer interface comprises a USB data transfer chip. In another embodiment, USB transfer capabilities can be incorporated into micro-controller 1815.

According to an embodiment, firmware can be stored in a controller memory associated with micro-controller 1815. According to an embodiment, the controller memory is a flash memory. According to some embodiments, the firmware can be updated via data transfer interface 1825. Furthermore, according to some embodiments, the controller memory and the memory 1824 can be part of the same persistent memory.

In an embodiment, the firmware is configured to routinely sample and save signal data received by monitoring device 1705. According to an embodiment, filtering routines can be used to detect poor quality signal data and to notify the user via an audible signal generated using audio speaker 1816 or via a piezo-electric buzzer (not shown). For example, if the user has misaligned the position of the sensor strip EEG sensor 1710, the signals received from the sensor may be of poor quality. The monitoring device 1705 can generate an audible alarm or vibrate if the sensor strip needs to be realigned.

In one embodiment, monitoring device 1705 can include a wireless transmitter/receiver 1877 for receiving data from peripheral sensors (i.e., wireless ECG sensors, finger pulse oximeter, respiratory effort bands, sensors measuring leg movements, etc.) and/or transmit signals to a data analysis computer system 1790 for real time monitoring of the data being acquired by the monitoring device 1705. Data acquired from these sensors can be used to determine access cognitive state of the team member being monitored during various tasks and correlated with data from other team members to identify neurophysiologic synchronies between team members, which can be used to assess the performance of the team. In some embodiments, the wireless transmitter/receiver 1877 can be integrated into data transfer module 1826 of monitoring device 1705.

According to an embodiment, micro-controller 1815 can be based on an ARM 32-bit reduced instruction set computer (RISC) instruction set or equivalent architecture. Firmware can be configured to minimize the power requirements of the ARM chip when the monitoring device 1705 is being used in recording mode. The computational capacity of the ARM chip can provide the option for firmware to transform the signals during acquisition or prior to data download. For example, fast-Fourier transforms can be applied to a 512 samples/second EEG signal can quantify the high frequency power spectral densities of the EEG or EMG without requiring the large data files to be transferred off line to make this computation. Once high resolution power spectra are computed the EEG can be saved at 64 samples/second for purposes of visual inspection. This approach can significantly reduce the size of and time to transfer data files from the monitoring device 1705 to a data analysis computer system 1790 for analysis. In alternative embodiments, a lower-powered micro-controller can be used when the monitoring device 1705 is used as a recorder. The micro-controller and also include features such as a temperature monitor, analog to digital converter, and/or the capability to transfer the data file in USB format to reduce the need for extra components.

Figure 19:
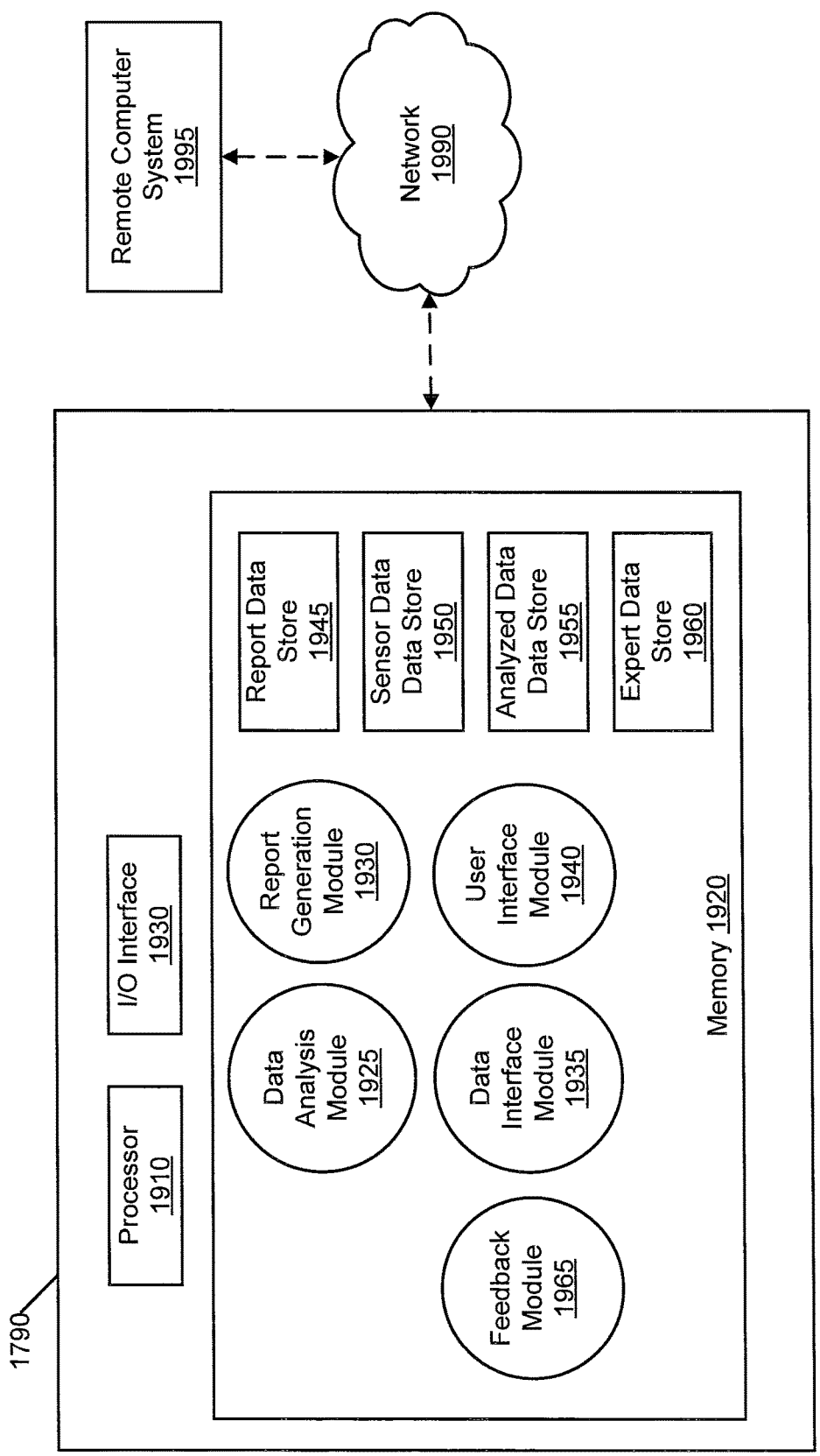
FIG. 19 is a block diagram of a computer system that can be used in conjunction with the neurophysiologic monitoring and analysis system illustrated in FIGS. 1 and 2 according to an embodiment.

FIG. 19 is a block diagram of a computer system that can be used in conjunction with the neurophysiologic monitoring and analysis system illustrated in FIGS. 17 and 18 and can be used to implement computer system 1790 according to an embodiment.

Computer system 1790 can include an I/O interface 1930 for communicating with the data transfer module 1826 of monitoring device 1705. According to some embodiments, the data analysis computer system 1790 can interface with the monitoring device 1705 using either a wired or a wireless interface. In an embodiment, the monitoring device 1705 can download information to the data analysis computer system 1790 for analysis, receive firmware updates from data analysis computer system 1790, and/or receive configuration data for configuring the operation of the monitoring device 1705. Data analysis computer system 1790 includes a processor 1910 for executing computer-software instructions, and a memory 1920 that can be used to store executable software program modules that can be executed by the processor 1910 of data analysis computer system 1790.

According to an embodiment, monitoring device 1705 can be configured to perform various processing on the data collected from the sensors and to download the processed data to data analysis computer system 1790. According to some embodiments, monitoring device 1705 can capture and store data from the various sensors and the data is downloaded to data analysis computer system 1790 for processing. As described above, monitoring device 1705 can include firmware that performs at least a portion of the processing of the signal data collected before the data is downloaded to the data analysis computer system 1790.

According to an embodiment, memory 1920 can include various modules that can be used to receive and process data from the monitoring device 1705 as well as data stores for storing the data collected from the monitoring device 1705. For example, in the embodiment illustrated in FIG. 19, the memory 1920 includes a data analysis module 1925, a report generation module 1930, a data interface module 1935, and a user interface module 1940.

Data interface module 1935 is configured to receive collected sensor data from the monitoring device 1705 via the input-output (I/O) interface 1930. According to some embodiments, the data interface module 12935 can be configured to receive sensor data from the sensors directly either via a wired or wireless connection. The data interface module 1935 can also be used to upload configuration data and/or firmware updates to the monitoring device 1705 via the I/O interface 1930. According to an embodiment, the data interface module 1935 can store data received from the monitoring device 1705 in sensor data data store 1950. In some embodiments, the monitoring device 1710 may have performed some preprocessing on the collected sensor data, such as executing filters to remove artifacts from the data, and digitizing an analog signal received from one or more sensors if any of the sensors used output an analog signal.

Data interface module 1935 can also be configured to receive environmental condition data that can be used to characterize the environmental conditions in which a monitored team performance is taking place. The environmental condition data can be correlated to with neurophysiologic synchrony data to identify relationships between events occurring during the monitored performance and the neurophysiologic synchronies expressed by the team being monitored. According to an embodiment, data interface module 1935 can store the received environment condition data can be stored in the sensor data store 1950. In some embodiments, a separate environmental condition data store can be included in memory 1920 and data interface module 1935 can be configured to store the received environment condition data in the environment condition data store. Data interface module 1935 can receive environmental data from external sources via I/O interface 1930. For example, environmental information, such as timestamped audio or video content can be captured using audiovisual equipment while a team performs one or tasks that are part of a monitored team performance. The timestamped audiovisual data can then later be synchronized with sensor data using timestamp information included in the sensor data. According to some embodiments, simulation software can be executed by processor 1910 of computer system 1790, and simulation software can be configured to output an event log that identifies events that occurred during the simulation. Data interface module 1935 can receive this event log from the simulation software and extract event information from the log. According to some embodiments, simulations can be executed on an external computing system and log information from the simulation can be transferred to computer system 1790 via I/O interface 1930 and processed by data interface module 1935.

Data analysis module 1925 is configured to analyze the collected sensor data stored in the sensor data data store 1950 to assess the performance of the team members. The data analysis module 1925 can also be configured to normalize the collected data and to create baseline information for individual team members as well as the team as a whole. Various techniques for analyzing the data that can be implemented by the data analysis module are described in detail below. According to an embodiment, the raw sensor data collected by the monitoring device 1705, which in some embodiments can be preprocessed by the monitoring device 1705, can be analyzed by the data analysis module 1925, and the data analysis module 1925 can store analyzed data in the analyzed data data store 1955. Data analysis module 1925 can be configured to analyze collected sensor data in real time and to provide analyzed data to the report generation module 1930 and/or the feedback module 1965 in real time to provide real time updates on the team performance to the team members and/or an instructor or administrator monitoring the team's performance of one or more collaborative tasks.

Expert data store 1960 can be used to store data generated by experts that can be used in the analysis of team performance and learning. For example, the expert data can include expected team performance under certain conditions and/or interpretations of neurophysiologic synchronies expressed by a team during a monitored performance.

Report generation module 1930 can be configured to access analyzed data stored in the analyzed data data store 1955 and to generate reports that present the analyzed data in a predetermined format. The report data store 1945 can be used to store reports generated by the report generation module 1930 and can also include report templates that can be used by the report generation module 1930 to determine the format of the report and/or the types of analysis to be included in the reports. According to some embodiments, the user interface module 1940 can provide a user interface that allows a user to select a format or a template to be used to generate a report.

User interface module 1940 can be configured to provide a user interface, such as a web page that can be viewed in a browser program or an application, that displays the analyzed data stored in the analyzed data data store 1955 to a user. According to an embodiment, the user interface module 1940 can also be configured to provide a user interface that can display reports generated by the report generation module 1930.

According to an embodiment, data analysis computer system 1790 can be connected to a remote computer system 1995 via a network 1990. For example, in an embodiment, monitoring device 1705 can include software that periodically connects to data analysis computer system 1790 via a wireless interface, downloads data from monitoring device 1705 to the data analysis computer system 1790, and triggers a transfer of the data from the data analysis computer system 1790 to a remote computer system 1995, such as an analyst's computer system or a web portal that allows users affiliated with a team assessment access report data and/or view the collected sensor data. For example, in an embodiment, members of the team being assessed can be provided with login credentials that allow the team member to log remotely after the reports have been generated to receive an assessment report that is tailored to that team member. Project managers or team leaders that have requested an assessment for a team can also be provided with login credentials that allow these users to access report data that includes an analysis of the performance of the team.

Feedback module 1965 can be configured to provide feedback to one or more members of a team during the performance of a collaborative task. The feedback module 1965 can generate control signals to operate various types of feedback devices, such as haptic motors to provide tactile feedback to one or more members of the team, displays or other types of visual indicators, such as light emitting diodes, to provide visual feedback, and speakers or headphones to provide audio feedback to team members. The feedback module 1965 can also be configured to provide feedback to an instructor or administrator of the one or more collaborative tasks, to allow the instructor to intervene and to make changes to a training task or environment that could be used to influence the team's performance of a task. According to an embodiment, the visual feedback can include graphical representations of the neurophysiologic synchronies exhibited by the team during the performance of one or more tasks. According to an embodiment, the visual feedback could also include changes in ambient lighting or textual commands to one or more team members that are displayed within a training exercise or simulation environment. The feedback module 1965 can be configured to send requests to the user interface module 1940 to display audiovisual feedback to the users and/or administrators.

Feedback module 1965 can be configured to provide feedback based on task specific metrics and/or on team specific metrics. For example, the feedback module can be configured to monitor the neurophysiologic states exhibited during the performance of various tasks by one or more team members and to provide feedback to one or more team members if the neurophysiologic states exhibited by the team members do not match an expected neurophysiologic state associated with that task. Feedback module 1965 can use the data from the expert data store 1960 and the information received from data analysis module 1925 and/or report generation module 1930 to determine whether to generate feedback based on the neurophysiologic states exhibited by the team members while performing the one or more tasks. Feedback module 1965 can also be configured to provide feedback based on team metrics. For example, data from the expert data store 1960 can include data representing neurophysiologic states that are generally exhibited by a team that is working well together on a collaborative task and/or neurophysiologic states that are generally exhibited when a team is not working well together. The feedback module 1965 can use this data to identify neurophysiologic states exhibited by the team during the performance of the one or more collaborative tasks that are undesirable and provide feedback According to an embodiment, the expert data stored in the expert data store 1960 can be associated with various types of feedback that are recommended for various scenarios that could occur during the performance of a collaborative effort. For example, for task specific metrics, the expert data store 1960 can include a recommended type of feedback if one or more team members exhibit a particular neurophysiologic state associated with a particular task. The feedback module 1965 can use this information to select an appropriate type of feedback for a particular scenario based on the types of feedback devices that are available in a particular configuration of the system. In another example, for team metrics, the expert data store 1960 can also include a recommended type of feedback if one or more team members express an undesirable neurophysiologic state that indicates that team is not performing optimally during the performance of a collaborative task.

Examples of how Neurophysiologic Synchronies can be Applied

The neurophysiologic synchrony analysis techniques disclosed herein can be applied to a wide variety of team tasks. The techniques can be applied to assist with research into team dynamics. For example, the systems and methods disclosed herein could be used to study the elicitation of emotions by members of a six-person team. These techniques can also be applied in an educational environment to assist in learning of team oriented tasks. For example, the systems and methods disclosed herein could be used to study the temporal dynamics of NS expression by teams of high school students performing a simulation where the goal is to decide if the person being studied has a problem with substance abuse. Theses techniques can also be used in team training exercises. For example, the systems and method disclosed herein can also be used in high fidelity training exercises where trainees are learning to coordinate complex submarine piloting and navigation scenarios. In yet another example, the techniques disclosed here could be used to study the temporal dynamics of scientists engaged in brainstorming sessions.

Detecting and Analyzing Neurophysiologic Synchronies

Figure 20:
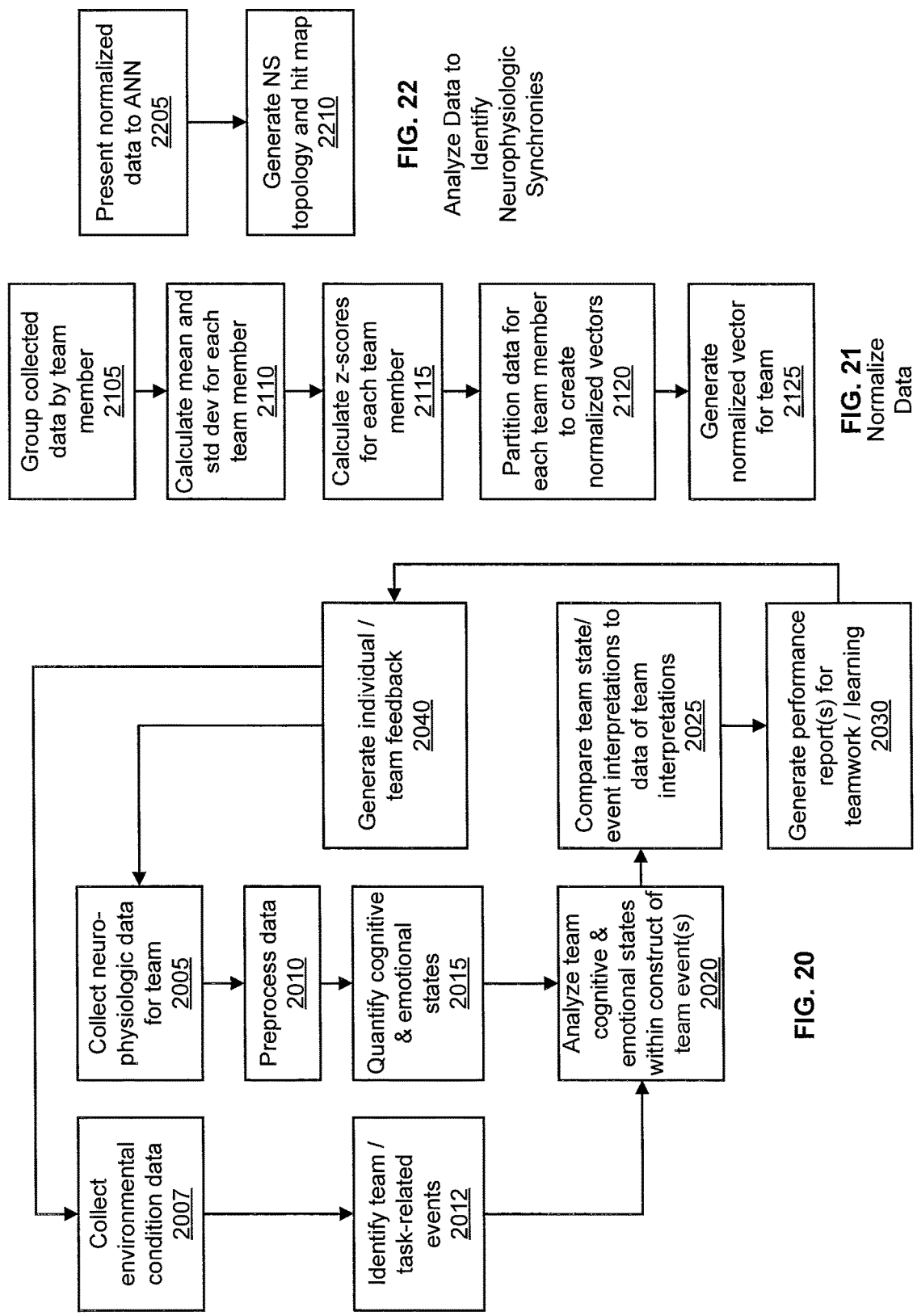
FIG. 20 is a flow diagram of a method for monitoring and analyzing neurophysiologic indicators of members of a team according to an embodiment.

FIG. 20 is a flow diagram of a method for monitoring and analyzing neurophysiologic indicators of members of a team according to an embodiment. The method illustrated in FIG. 20 can be implemented using the systems illustrated in FIGS. 17, 18, and 19 according to an embodiment. The steps of FIG. 20 can be executed by data analysis computer system 1790 unless otherwise specified in the description. The method illustrated in FIG. 20 can be used to implement real time monitoring and analysis of a team performance of a collaborative task. The method can be used to provide real time feedback regarding the team's performance during the performance of the collaborative task or to provide offline feedback that can be used after the team's performance of the collaborative task to improve subsequent performances or to make adjustments to the collaborative task.

Sensors are used to collect neurophysiologic data for team while the team performs one or more collaborative tasks (step 2005). The data collected can include various neurophysiologic data, including High EEG-Engagement (EEG-E), Low EEG-E, Distraction and High EEG-Workload (EEG-WL) data. For example, in the embodiment illustrated in FIG. 17, EEG sensors 1710*a*, 1710*b*, and 1710*c* are used to collect EEG data from three members of a team whose performance is being monitored and analyzed. While the embodiment illustrated in FIG. 17 illustrates a team that includes three members, teams of other sizes that include more or less members can be included. As described above, other types of sensors and/or types of neurophysiologic data collected can be collected in other embodiments. Furthermore, while the embodiment described herein collects and analyzes just EEG data, in some embodiments, more than one type of neurophysiologic data can be collected and analyzed to identify neurophysiologic synchronies for the team.

As described above, the monitoring devices 1705*a*-1705*c* can be associated with one of the members of the team and can be used to collect the signal data output by the sensor devices 1710*a*-1719*c*. The monitoring device 1705*a*-1705*c* can be configured to store data collected by the sensor devices 1710*a*-1719*c*. The monitoring device 1705*a*-1705*c* can also be configured to download the sensor data to data analysis computer system 1790 via a wired or wireless connection. According to some embodiments, the monitoring devices 1705*a*-1705*c* can be configured to collect data during a team activity that is being monitored and the collected data is downloaded to the data analysis computer system 1790 after the event is completed. In other embodiments, the monitoring devices 1705*a*-1705*c* can be configured to transmit data to the data analysis computer system 1790 as the data is collected.

According to an embodiment, the one or more collaborative tasks performed by the team can comprise a training exercise. In some embodiment, the training exercise can comprise a simulation of team activity. The simulation can be used to assess the team's performance of the team activity and/or to train the team to perform an activity. For example, in one embodiment, the one more tasks performed by the team can comprise a submarine piloting exercise. An embodiment where such an exercise is monitored and the team performance during a Submarine Piloting and Navigation (SPAN) exercise is described in detail below. One skilled in the art will recognize that that techniques described herein can be applied to other types of team-oriented training exercises and for assessment of team performance in team-oriented tasks.

According to some embodiments, data is collected for a plurality of time periods (also referred to herein as "epochs"). For example, in some embodiments neurophysiologic data can be collected on a second-by-second basis. For example, in an embodiment, second-by-second calculations of the probabilities of High EEG-Engagement (EEG-E), Low EEG-E, Distraction and High EEG-Workload (EEG-WL) can be performed.

According to an embodiment, data representing environmental conditions can be collected in parallel with the collection of the neurophysiologic data for the team in step 2005 (step 2007). The environmental data can be associated with the cognitive and/or emotional states of the team members when analyzing neurophysiologic data collected in step 2005. According to some embodiments, audio and/or video recording can be used. In some embodiment, manual or automatic logging of key tasks, periods or events can be performed. For example, an administrator may manually generate an entry in an event log when team members begin and/or complete specific tasks, when a particular time event occurs (e.g., a team member performs a specified action), or when a particular period of a monitored team performance beings and/or ends (e.g., a rest period, team begins/ends a particular task period or rest period). In some embodiments, environmental conditions experienced by team members can be manipulated through the use of virtual reality or simulation hardware and/or software. When simulations hardware and/or software are employed to manipulate the environmental condition, log files synchronized to the physiological data can be generated to describe changes to environment. According to an embodiment, the level of detail included in the log files can be dependent on a number of factors, including but not limited to the capability to discern and describe artificial intelligence that introduces changes to the environment unique to each repetition of the condition.

According to an embodiment, the information collected in step 2007 can be analyzed to characterize the team environmental condition (step 2012). Interpretation of team dynamics requires some knowledge of cause-and-effect impact on members of the team. According to an embodiment, the team environmental conditions can be characterized using a combination of environmental inputs such as a computerized simulated training scenario or a classroom where students are listening to an instructor, conditional constraints that could include varying the level of difficult of task or instructions or adding various distractors or stressors to the teaming environment, or applied logic based on the anticipated actions of the team using previously developed models. According to an embodiment, the log file information collected for multiple team members can be collected can be used to determine when team members are engaged in interrelated tasks, such a Team Member A waiting for a conditional response from Team Member B before proceeding with an assigned task. According to an embodiment, events where a response or action from one team member impacts the complexity of a task assigned to another team member can be identified. According to yet another embodiment, expected behavior patterns obtained from subject matter experts on team behavior for various environmental conditions can be obtained and stored in a behavior pattern data store. The expected behavior pattern information can be compared to behavior patterns identified in the collected environmental data to identify optimal or sub-optimal performance of team members during a monitored team exercise.

According to some embodiments, the data collected by the sensors can be optionally preprocessed before the data is analyzed to identify neurophysiologic synchronies (step 2010). In some embodiments, the sensor data collected in step 2005 can be synchronized and time stamped so that the data collected for each of the members of the team can be aligned with that team members respective description of the environmental condition and/or physiologic and environmental condition information collected for other team members. The collected data can also be processed to remove artifacts that can increase the probability for misclassification of the cognitive state of team members, such as spikes, excursions, eye blinks, and non-specific physiological interference (e.g., muscle activity in the EEG signal). Various techniques can be used to remove artifacts in the data caused by eye blink events. In some embodiments, other types of preprocessing of the data can also be performed, such as to remove artifacts caused by muscle movement. In some embodiments, the data collected by the sensors can be processed to remove line noise or other artifacts introduced during the data collection process. According to an embodiment, the preprocessing step can be performed by the data analysis module 1925 of the data analysis computer system 1790. According to other embodiments, monitoring device 1705 can be configured to perform some or all of the preprocessing of the data before the data is downloaded to the data analysis computer system 1790.

The neurophysiologic data collected from the team members can then analyzed to identify the cognitive and emotional states of the individual team members and of the team as a whole (step 2015). According to an embodiment, the collected data for the team is normalized before the collected data is analyzed to identify neurophysiologic synchronies. In some embodiments, the normalization step is performed by the data analysis module 1925 of data analysis computer system 1790. According to an embodiment, a continuum of EEG metrics which measure high or low engagement, distraction/confusion/boredom/fatigue, or mental workload can be utilized to assess the cognitive state of the team members. According to an embodiment, variability in heart rate (preferably derived from ECG or pulse rate) can be used to assess rapid changes in sympathetic arousal/stress (i.e., emotion). Any of these cognitive or emotional state assessments may be used to assess the state of the individual.

Before comparisons of these individual measures can be made across team members, the metrics are preferably normalized for individual differences. In one embodiment, methods are used to quantify each of the cognitive and emotional states to account for individual variability prior to calculating the absolute value for each epoch. Alternatively, the absolute levels of each metric for each team member can be compared to his own average levels.

Figure 2:
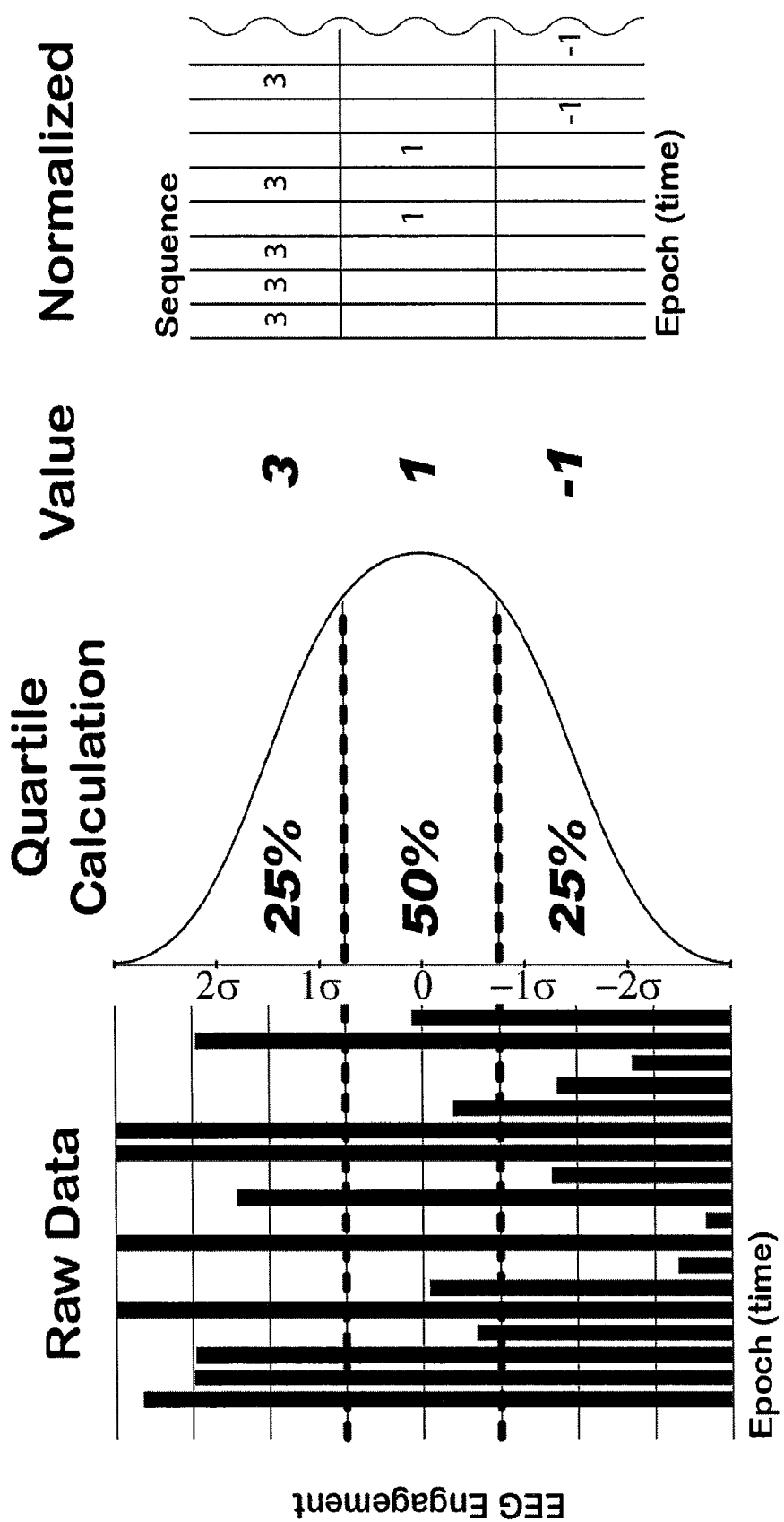
FIG. 2 is a block diagram illustrating a technique for normalization of neurophysiologic measures collected for a member of a team according to an embodiment.

In an embodiment, the absolute levels of each metric for each team member are compared to his or her own average levels. In an embodiment, in the normalization step, an average EEG-E level is calculated for each member of the team, and the absolute levels of EEG-E of each team member are equated with his or her own average levels. Normalizing the collected data allows for the identification not only of whether an individual team member is experiencing above or below average levels of EEG-E or EEG-WL, but also whether the team as a whole is experiencing above or below average levels of these measures. FIG. 2 illustrates and example of a normalization process that can be used in step 2015 according to an embodiment. In this approach, a z-score is calculated that measures how many standard deviations an observed data point is above or below the mean for the entire data set collected for an individual team member. FIG. 21 is a flow diagram of a normalization method that can be used to implement the normalization process illustrated in FIG. 2. According to an embodiment, the normalization step can be performed by the data analysis module 1925 of the data analysis computer system 1790. Once the data has been normalized, the normalized data can be analyzed to identify neurophysiologic synchronies for the team. Various techniques can be used to analyze the data to identify neurophysiologic synchronies. FIG. 22 illustrates an example of a method that can be used to analyze the normalized data identify neurophysiologic synchronies. According to an embodiment, the analysis of the normalized data can be performed by the data analysis module 1925 of the data analysis computer system 1790.

Once the individual and the team's cognitive and emotional states and the team environmental conditions have been identified in the preceding steps, the team's cognitive and emotional states can be analyzed within the construct of team event that occurred during the monitored period of learning or training (step 2020). Neurophysiologic synchrony expression by the team can be compared to event information in order to identify and interpret NS expression associated with specific events during a monitored performance. Because the expression and temporal patterning of team neurophysiologic synchronies are highly dependent on environmental conditions, certain NS expressions may be unique or highly-specific to certain types of training events. Therefore, certain types of NS expression may be expected for certain types of training events.

Figure 13:
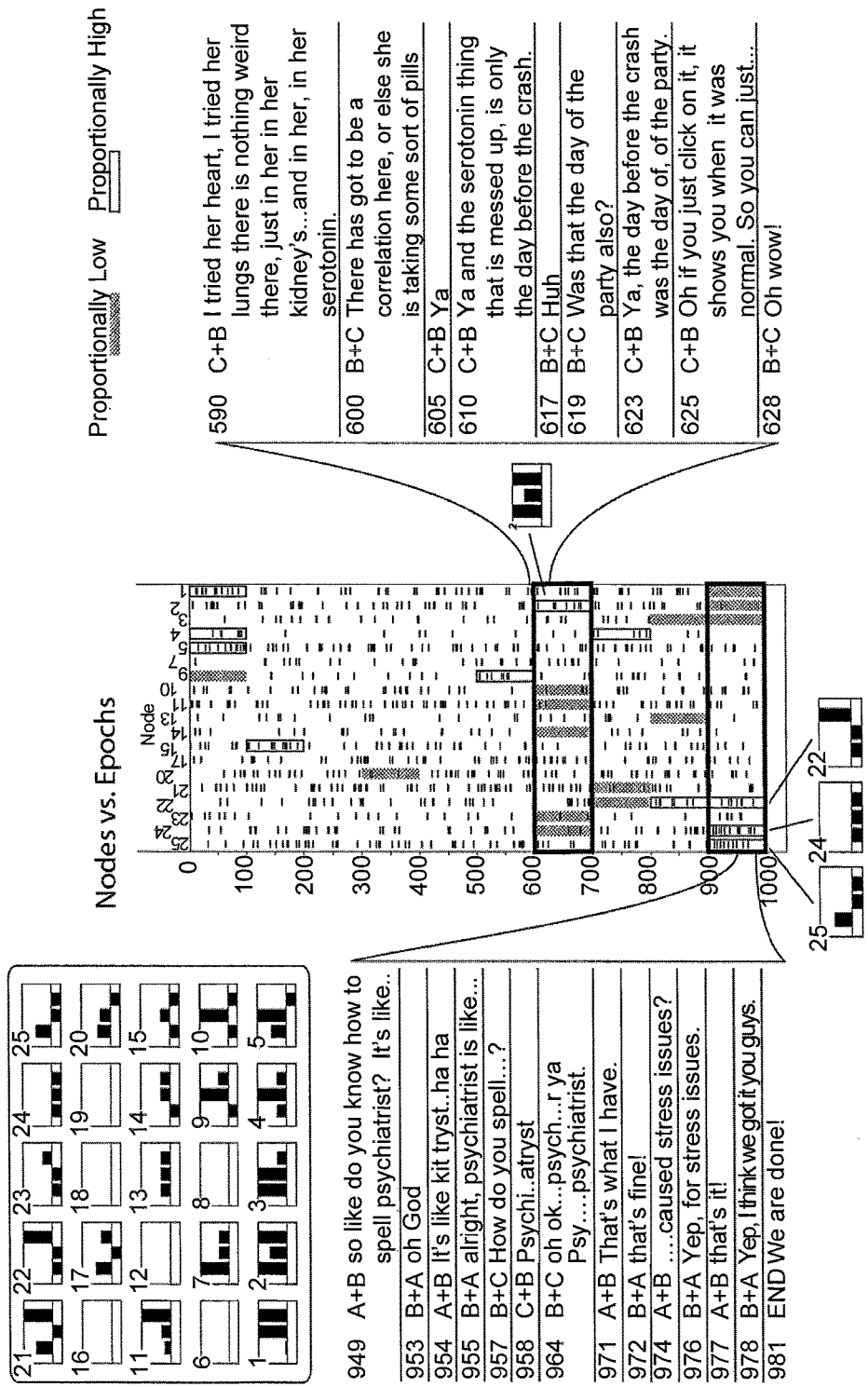
FIG. 13 is a diagram illustrating a link between conversations between team members with EEG-E neurophysiologic synchronies according to an embodiment.

FIG. 13 provides an example of analyzing team cognitive and emotional states identified in step 2015 in the context of the team-related and/or task-related events identified in step 2012. In the embodiment illustrated in FIG. 13, event information from a monitored performance is correlated with NS expression for the team during specified events. The embodiment illustrated in FIG. 13 is described in greater detail below.

A comparison of team state/event interpretations to data of team interpretations can then be performed (step 2025). According to an embodiment, the team state/event interpretations generated in step 2020 can be compared to a team state or event interpretations from previous sessions and/or with expert data regarding team performance. Team performance data from a monitored session can be compared to expert data or to data from previous session from the same or another team to provide evidence that the team is learning a particular task. Comparing performance data from a single session to previous session data allows a single monitored session to provide useful training information, because the data generated from the session can be analyzed, reviewed and discussed in the context of prior performances and/or expert data.

Figure 16A:
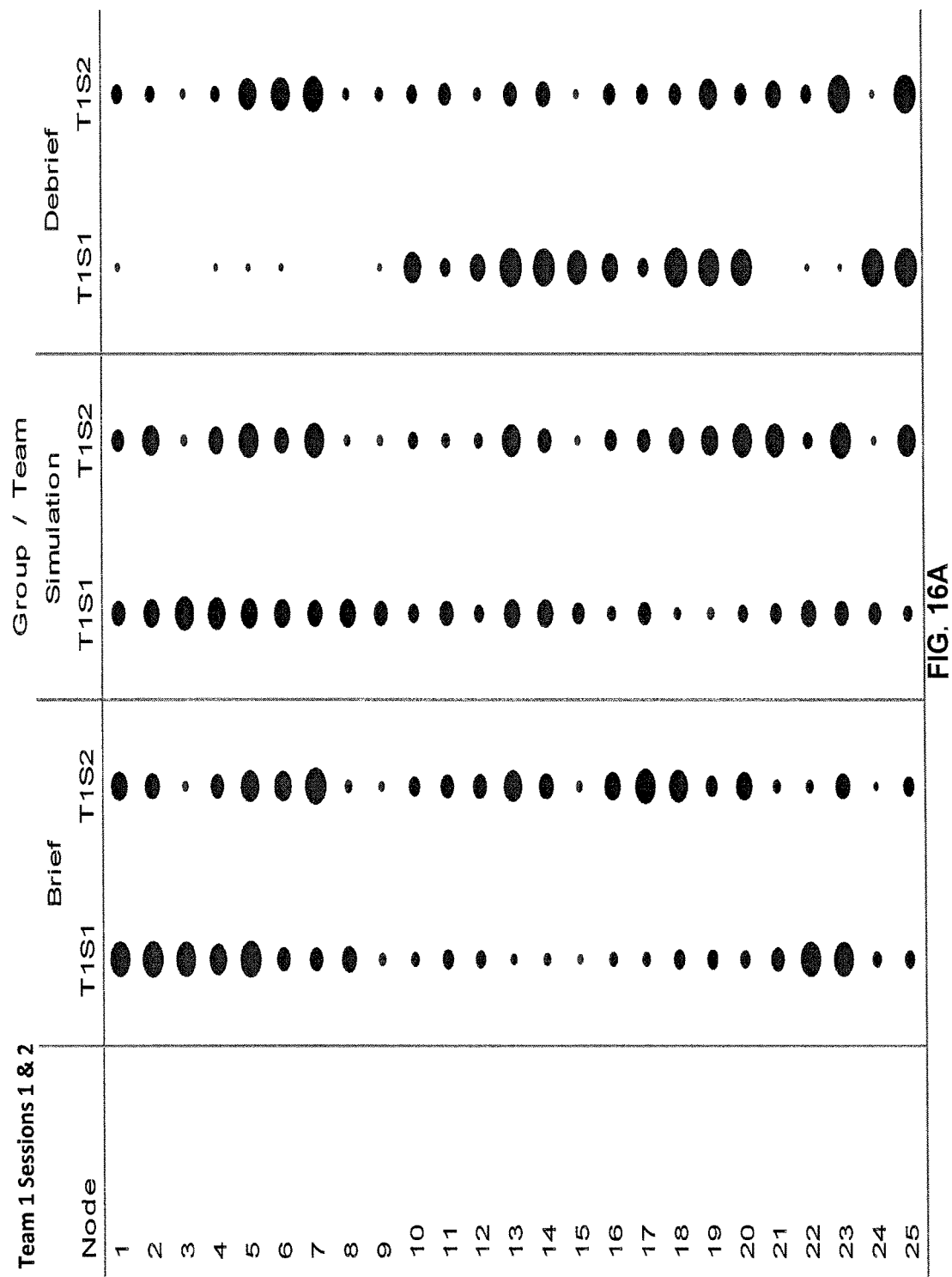
FIGS. 16A and 16B are diagrams illustrating frequencies of neurophysiologic synchronies across sessions training sessions according to an embodiment.
Figure 16B:
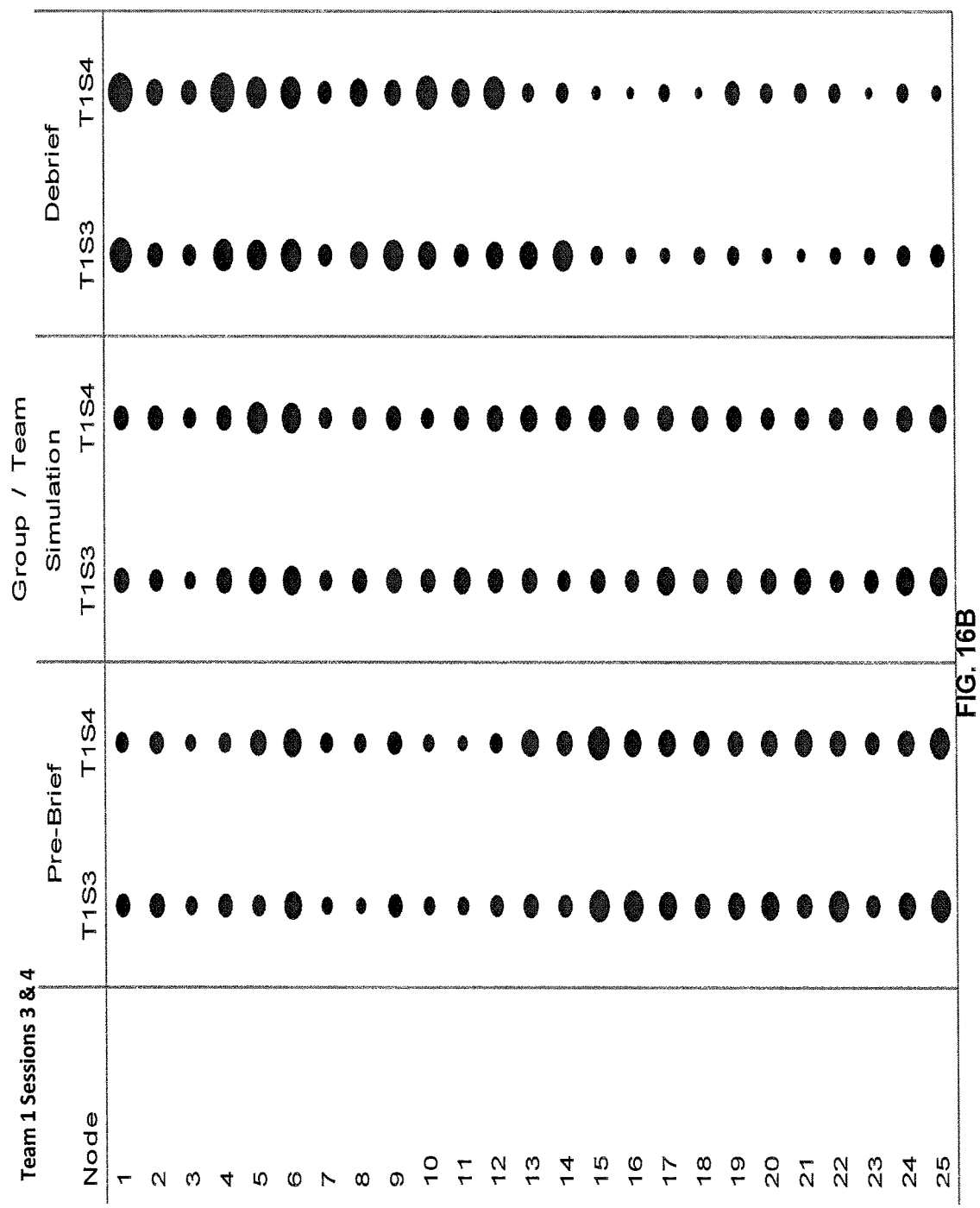

According to an embodiment, computer system 170 can include a data store that can be used to store data from previous sessions. In some embodiments, analyzed data from previous sessions can be stored in analyzed data data store 1955. According to some embodiments, the team state/event interpretations can be compared with expert data stored in expert data store 1960 and/or with data collected from repeated sessions using the same team to assess team neurodynamics indicative of learning. According to an embodiment, an example of analyzing and comparing team performances is illustrated in FIGS. 16A and 16B. The embodiment illustrated in FIGS. 16A and 16B is described in greater detail below.

One or more performance reports can also be generated for the monitored team performance/team learning session (step 2030). According to an embodiment, one or more team performance reports can be generated that illustrate the neurophysiologic synchronies identified in the analysis of the neurophysiologic data collected from the team while the team performance was being monitored and/or a user interface of the computer system 1790 can be used to generate a visualization of the data generated in the previous steps of this method. According to an embodiment, the report generation module 1930 of the data analysis computer system 1790 can be configured to generate various types of reports that present the results of the data analysis. The reports can include comparisons with expert data and/or with prior performance information for the team to highlight team learning and/or changes in team performance. The learning and/or performance information included in the reports can be used to identify problems with the team (e.g., one or more members that do not work well together) and can be used to identify whether a team is exhibiting NS expression that indicate mastery or lack thereof of certain skills. This information can be used to tailor training tasks for the team to focus on particular aspects of the team task that may require improvement.

The team's cognitive and emotional states identified in step 2020, and/or the results of the comparison of the team state/events interpretations of step 2025, and/or the various performance reports generated in step 2030 can be used as a basis for generating individual and/or team feedback (step 2040). As described above, feedback for one or more team members can be generated in real time as the team performs a collaborative task. In these embodiments, steps 2020, 2025, and 2030 can also be performed in real time while the team is performing the collaborative task. As a result, feedback can be generated from the results of these steps and the method can return to steps 2005 and 2007 where additional data can be collected and analyzed. The data generated in the preceding steps can be used to identify individual team members or a constellation of multiple team members who are not performing the collaborative task at a desired level, and to provide real-time intervention during the performance of the collaborative task by providing real-time feedback.

As described above, various types of feedback can be provided. For example, haptic feedback can be provided to one or more team members, which provides tactile stimulation to the team members to alert the team members to somehow alter their behavior. For example, haptic feedback could be provided to a member of team who is exhibiting low engagement during a portion of a collaborative task that requires a high level of attention from the team member. The haptic feedback can be used to signal the team member to pay attention to the task. Other types of feedback, such as audiovisual feedback can be provided. For example, audible signal or commands could be played through headphones to specific team members or played through a speaker system, so that the signal or commands are audible to the team members. Visual feedback could also be provided, such as a graphical representation of team performance or textual commands or performance indicators could also be displayed to the team members. In embodiments where the collaborative task involves a simulation, the simulation could be configured to display the various audiovisual indicators in the simulated environment.

According to some embodiments, feedback (e.g., real time monitoring) can also be provided to an administrator or instructor of the collaborative task, and the administrator or instructor can use this information to make changes to a training session and/or simulation to address the issues identified. For example, an instructor could use feedback received regarding the team's performance of the task in real-time to make changes to the simulation environment and/or other corrective actions to address the identified problems. Various types of feedback can be provided to the administrator or instructor, such as graphical representations of the neurophysiologic states exhibited by team members during performance of the collaborative task and/or audiovisual signals indicating that one or more members of the team are exhibiting neurophysiologic states that are divergent from desired states indicative of learning or acquisition of expertise at a particular task or team performance.

According to some embodiments, the method can be used to provide offline feedback to instructors and/or team members. The reports and other information generated in the preceding steps of the method can be examined after the collaborative task is completed, and the information provided can be used to make change to the training exercises and/or simulations and/or discussed with team members to allow team members to adjust their behavior accordingly in subsequent collaborative tasks.

FIG. 21 is a flow diagram of a method for normalizing physiologic data for a team according to an embodiment. The method illustrated in FIG. 21 can be used to perform the normalization step included in step 2015 in the method illustrated in FIG. 20. According to an embodiment, the method illustrated in FIG. 21 can be performed by the data analysis module 1925 of the data analysis computer system 1790.

The normalization process begins by grouping the collected neurophysiologic data by team member (step 2105). In some embodiments, the neurophysiologic data may already be grouped into separate groups based on the team members, because each monitoring device 1705 collects data from a single member of the team and the data is downloaded from the monitoring device 1705 to the data analysis computer system 1790.

For each team member, the arithmetic mean or average of the absolute levels of each metric collected for each of the epochs is determined, and the standard deviation of the population of metric data collected (step 2110).

A z-score is then calculated for each metric collected at each epoch (step 2115). The graph on the left portion of FIG. 2 illustrates an example of the z-values calculated for the raw EEG-E value collected for a team member for a series of epochs. According to an embodiment, the z-value can be calculated using the following equation:

$$z = (x - \mu)/\delta$$

where x represents the value of the metric collected for a particular epoch, $\mu$ represents the mean calculated in step 2110, and $\delta$ represents the standard deviation calculated in step 2110. The z-value represents the distance between the raw metric score for the epoch and the population mean in units of the standard deviation. The z-score will be negative when the raw metric score is below the mean, and the z-score will be positive when the raw metric score is above the mean.

The data for each team member can then be partitioned based on the z-score values calculated above (step 2120). Partitioning the data divides the collected data into separate ranges based on the level of engagement exhibited at each epoch. According to an embodiment, the partitions can be selected ahead of time based on the type of visualization or reporting to be generated from the neurophysiologic data. In the embodiment illustrated in FIG. 2, the EEG-E levels are partitioned into the three ranges: the upper 25%, the lower 25%, and the middle 50%. The raw EEG-E levels (shown in the graph on the left side of FIG. 2) can be divided up into one of these three ranges. According to other embodiment, different ranges can be selected, and the three ranges shown in the example illustrated in FIG. 2 are merely one possible way of partitioning the raw EEG-E data. According to some embodiments, the data can be partitioned in more or less partitions than the three partitions illustrated in the embodiment illustrated in FIG. 2.

Once the data has been partitioned, a value can be associated with each partition to generate a normalized vector of neurophysiologic data for each team member. For example, in the embodiment illustrated in FIG. 2, a value of "3" is assigned to an epoch where the EEG-E value for that epoch falls within the upper 25% partition, a value of "1" is assigned to an epoch where the EEG-E value for that epoch falls within the middle 50% partition, and a value of "−1" is assigned to an epoch where the EEG-E value for that epoch falls within the lower 25% partition. The partition values illustrated in FIG. 2 are merely one example of the values that can be used. In other embodiments, other values can be associated with each of the partitions. For example, other values can be associated with the partitions to enhance subsequent visualizations of the neurophysiologic data.

Figure 3:
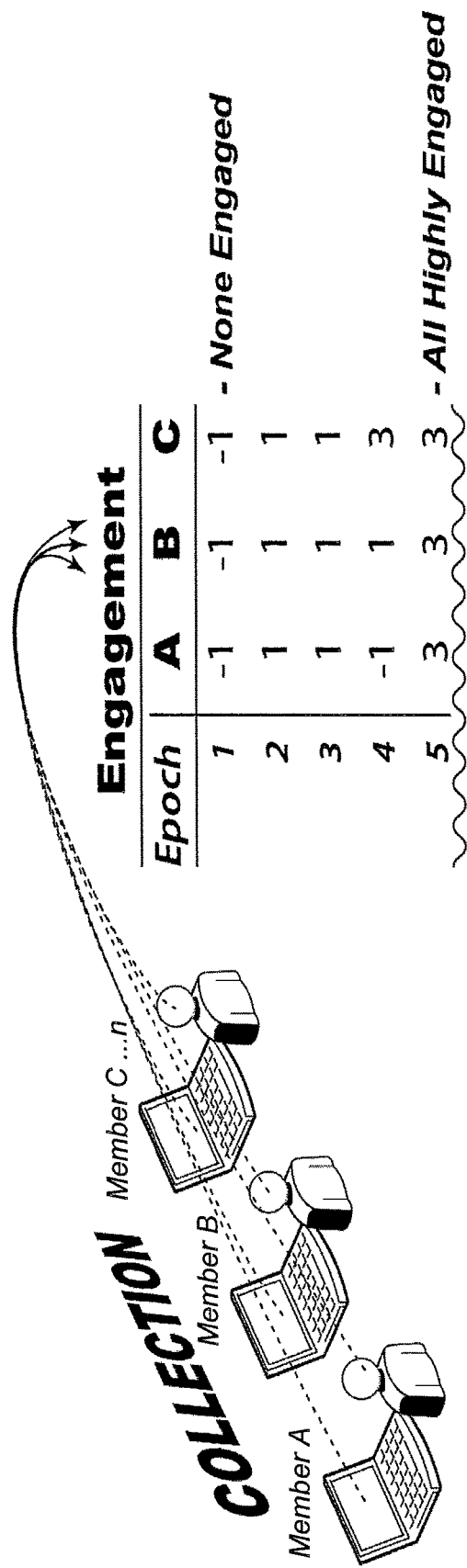
FIG. 3 is a block diagram illustrating a technique for creating team performance vectors according to an embodiment.

Once the normalized vector for each team member has been created, a team performance vector can be created by combining the normalized vectors of each of the team members (step 2125). The team performance vector can be created by aligning the individual team member's normalized vectors with one another according to epoch. FIG. 3 illustrates a creation of a team performance vector for a three-person team. The first five epochs from a plurality of epoch recorded are illustrated in FIG. 3. The normalized data for each of the team members determined in step 2120 is included in the team performance vector for each epoch. In Epoch 1 of the example illustrated in FIG. 3, all three members of the team exhibited low levels of engagement where the EEG-E levels for each of the team members fell within the lower 25% partition. In Epoch 5 of the example illustrated in FIG. 3, all three members of the team exhibited high levels of engagement where the EEG-E levels for each of the team members fell within the upper 25% partition. The team performance vector can then be used to identify neurophysiologic synchronies for the team.

FIG. 22 is a flow diagram of a method for analyzing neurophysiologic data for a team to identify neurophysiologic synchronies for the team according to an embodiment. According to an embodiment, the method illustrated in FIG. 22 can be used to implement step 2015 of the method illustrated in FIG. 20. According to an embodiment, the method illustrated in FIG. 21 can be performed by the data analysis module 1925 of the data analysis computer system 1790.

According to an embodiment, when quantifying team dynamics, the patterns of cognitive or emotional state can be assessed based on second-by-second quantitative co-expression from different members of the team. FIG. 1 is a diagram illustrating two examples for a putative neurophysiologic measure being simultaneously detected from the members of a six person team. In the example on the left, team members 3 and 5 expressed above average levels of this particular measure while team members 1, 2, 4 and 6 expressed below average levels at this point in time. In the example on the right, team member 3 expressed below average levels, team member 5 expressed average levels, and the other members expressed above average of this measure. Each of these examples represents the NS profile or pattern, for the team as a whole at a particular point in time.

The normalized team performance vector is presented to an artificial neural network (ANN) for training (step 2205). The ANN can be used to identify patterns in the normalized team performance vector. According to an embodiment, the ANN can be implemented as part of the data analysis module 1925 of the data analysis computer system 1790 or in other embodiments can be implemented in a separate module of the data analysis computer system 1790.

According to an embodiment, the normalized team performance vector can include data comprising one second epochs. The normalized team performance vector is submitted to the ANN and the ANN is trained using the team performance vector information. In the embodiment illustrated in FIG. 4, the ANN comprises a 1×25 node unsupervised ANN. In other embodiments, other configurations of the ANN can be used including an ANN that includes a different number of nodes (either more or less than the 25 nodes included in this embodiment).

During the training process, a topology develops such that the EEG-E vectors most similar to each other become located closer together and more disparate vectors are pushed away. The training results in a linear series of 25 team CES patterns that are referred to herein as neurophysiologic synchronies (NS). In embodiments where a different number of nodes are included in the ANN, the training results in a series of EEG-E patterns that match the number of nodes included in the ANN.

According to an embodiment, a visualization of the NS topology and hit map can be generated (step 2210). The hit map includes a frequency for each NS pattern appeared in the data collected during the team performance. The frequency represents the number of times that the team expressed that particular NS pattern during the monitored team performance.

Figure 4:
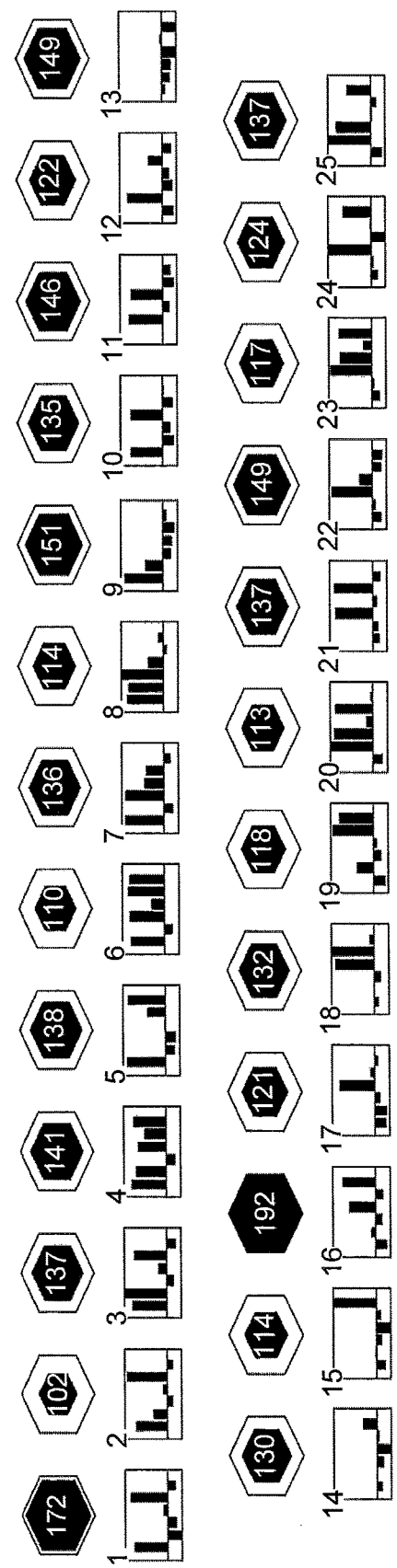
FIG. 4 is a diagram illustrating a neurophysiologic synchrony and hit map for a six-member team according to an embodiment.
Figure 5:
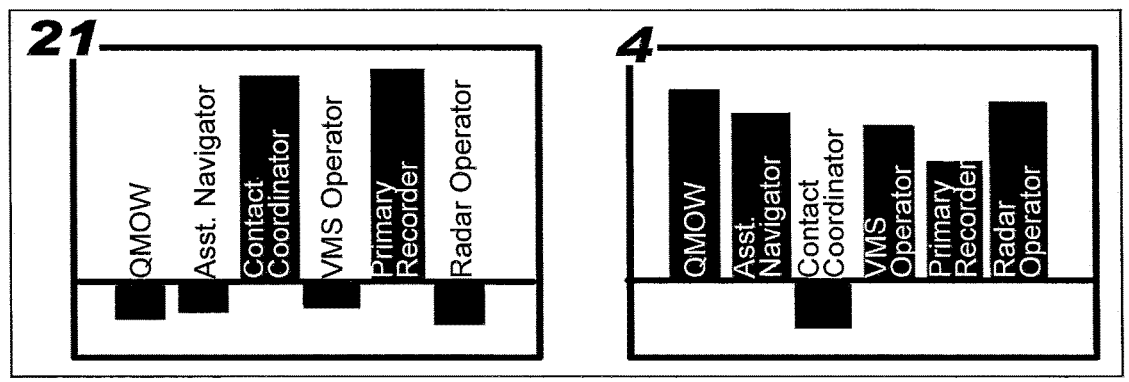
FIG. 5 is a diagram illustrating neurophysiologic synchrony patterns for a six-member team according to an embodiment.

FIG. 4 illustrates an example of a neurophysiologic synchrony and hit map for a six-member team engaged in submarine piloting and navigation. In the embodiment illustrated in FIG. 4, neurophysiologic data was collected from each of the members of the six member team, and a normalized team performance vector was generated from the collected data using the technique described above. The normalized team performance vector was then used to train a 1×25 node unsupervised ANN. FIG. 4 provides a visualization of the neurophysiologic synchronies and frequencies at which each of these neurophysiologic synchronies occurred during the period of time that the team was monitored. Each of the 25 nodes of the unsupervised ANN has a specific neurophysiologic synchrony associated with that node (illustrated by the histograms numbered 1-25). Above each of the histograms representing the neurophysiologic synchronies is a hexagon that includes a hit count representing the number of occurrences of that neurophysiologic synchrony pattern. Each neurophysiologic synchrony shows the EEG-E levels of each member of the team and provides a snapshot profile of the overall team EEG-E. FIG. 5 is an illustration of two of the neurophysiologic synchronies included in the NS and frequency hit map illustrated in FIG. 4. NS 21 (the NS data corresponding to node 21 of the unsupervised ANN) indicates a pattern where the Contact Coordinator (Position 3) and Primary Recorder (Position 5) have high levels of EEG-E and the other four team members are expressing low levels. NS 4 (the NS data corresponding to node 4 of the unsupervised ANN) shows a pattern where the Contact Coordinator is expressing below average levels of EEG-E and the team members at the other positions are expressing high levels.

Both the use of an unsupervised neural network protocol and the linear alignment of the nodes as illustrated in this method illustrated in FIG. 22 are important for the subsequent data analysis. The protocol is important as the unsupervised training provides a discovery mechanism for the most prevalent categories of neurophysiologic synchronies while also generating a topological ordering such that the synchronies with shared similarity tend to be close to each other on the resulting map. The linear arrangement of this topology map is important for subsequent dynamic symbolic data analysis.

Given the second-by second nature of the neurophysiologic synchrony measures, their expression likely reflects the contributions of both individual (the person on the task) and team (the person in the group) cognition. Analogous to the long memory phenomena embedded in some communication and other data streams, there may also be information contained in the sequence of the neurophysiologic stream over longer time frames which may reflect more aspects of team cognition rather than individuals' immediate concerns with the task.

An additional advantage of defining NS (a transformed set of real-valued data) patterns as described in this application is that the sequence of their expression can be modeled into temporal trajectories using the NS pattern designations through a process termed symbolic analysis. There are many reasons for investigating temporal patterns of neurophysiologic synchronies: First, such an analysis can help determine whether the teamwork processes reflected by NS are random, chaotic or periodic in nature. Second, this can then be used to predict whether a team is going into or out of synch. Third, NS patterns can also be used to help identify the NS transitions that characterize teams under different task conditions or that are linked with particular external macrocognitive processes associated with teamwork.

Autocorrelation studies have provided evidence that temporal component(s) to NS expression exist over both short (seconds) and longer (minutes) periods of time. In this way the different NS being expressed over time might be viewed as output symbols from one or more hidden state of a team, and if so the sequence provides information about the hidden states the team is passing through.

According to an embodiment, hidden Markov models (HMM) can be used for temporal modeling of NS expression of a team. According to an embodiment, hidden Markov models can be used in steps 2015 and/or 2020 of the method illustrated in FIG. 20. An HMM is a statistical Markov model in which the state is not directly visible. Instead, output dependent upon the state is visible and each state has a probability distribution over the possible outputs. The sequence of the outputs generated by the HMM can be used to determine information about the sequence of the states.

In HMM modeling, the NS data stream for teams can be segmented into sequences of 10 to 240 seconds in order to generate NS symbol arrays. HMM are then trained using these arrays assuming 5 hidden states as we have performed previously for modeling problem solving learning trajectories.

Figure 10A:
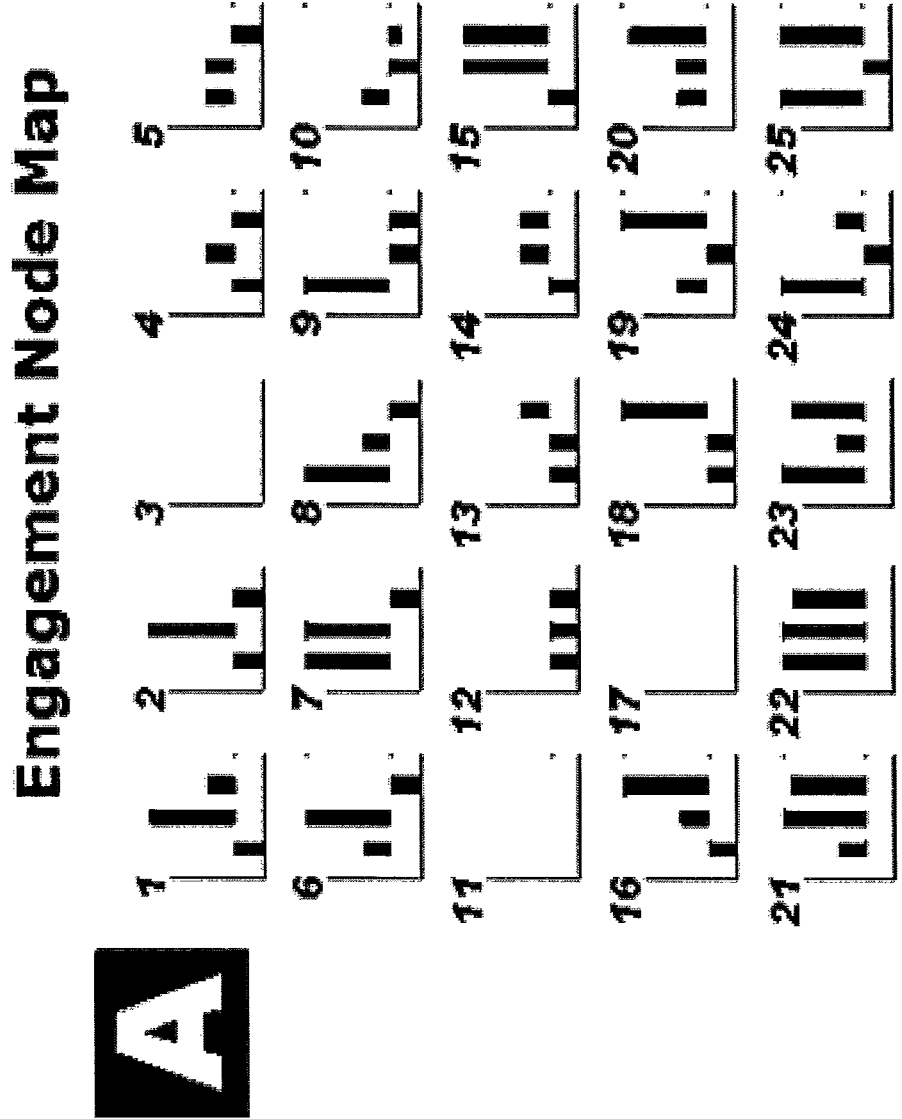
Figure 10B:
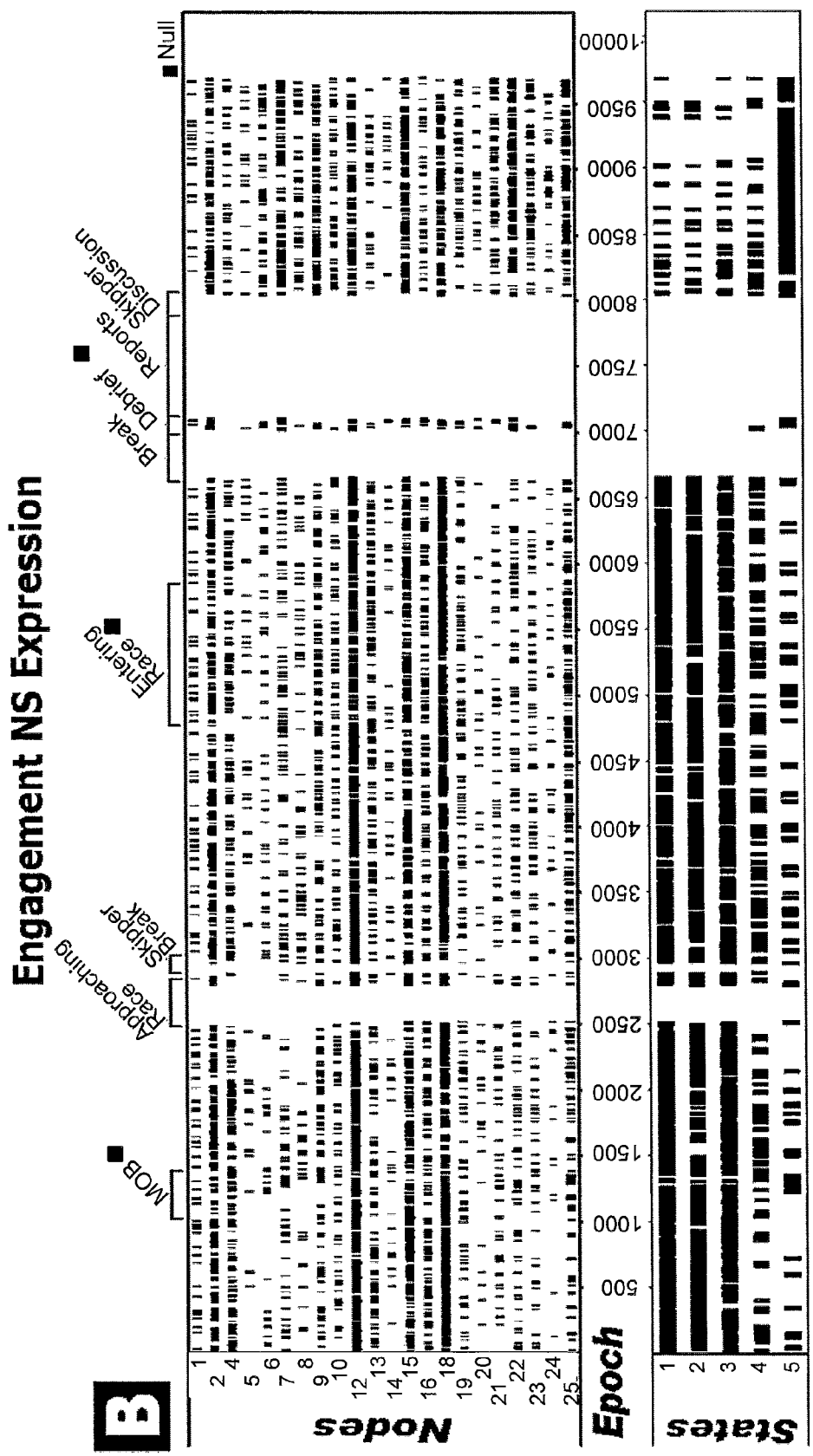

According to an embodiment, once the NS data stream has been segmented, the most likely state sequence through the performance can be generated by the Viterbi algorithm. The NS patterns from the neural network analysis can be mapped through the HMM modeling to the different states that are termed NS States. The NS States can then be related to different events in the performance similar to the NS patterns. An example of this mapping is shown in FIGS. 10A, 10B, and 10C, which are diagrams illustrating a mapping of NS states to events during a monitored performance of an experienced submarine piloting and navigation team.

Figure 11:
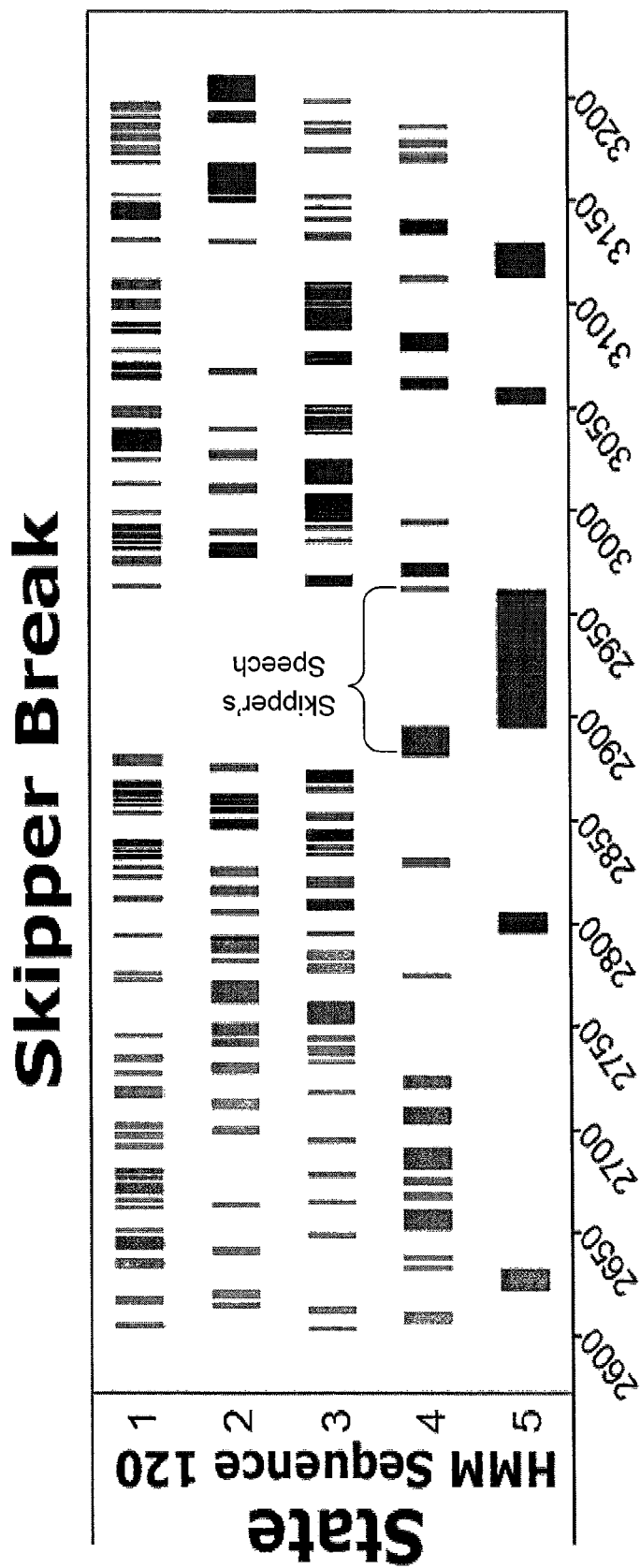
FIG. 11 is a diagram illustrating small scale changes in response to events during a monitored training session according to an embodiment.

NS patterns and modeled HMM states can detect both large (minutes) and small (10 seconds) scale changes in response to events during training sessions. An example of a short scale change is shown by one non-routine period of a navigation simulation where the Skipper paused the simulation when the team was having difficulties navigating a hazardous section of water (FIG. 11). Within a second the NS expression switched from the dominant States 1, 2 and 3 to State 4 and then State 5 where most members showed high levels of EEG-E, i.e. the team became externally engaged. After the short talk the team went back to the dominant expression of States 1-3 which represent a more introspective state of the team. FIG. 11 illustrates the NS state expression during the Skipper Break and Debrief session of the monitored performance of the experienced submarine piloting and navigation team from FIGS. 10A, 10B, and 10C. The bracketed section of the FIG. 11 identifies the portion of the simulation where the Skipper paused the simulation to discuss the simulation with the team members.

Example Embodiment—Emotion Recall by a Team

The following example embodiment illustrates how the systems and methods described above can be applied for studying the dynamics of teamwork. In this embodiment, a three-member team performs an exercise in emotion recall.

Each member of the team is provided with a wireless EGG sensor headset similar to the sensor device 1710 illustrated in FIG. 17. Data was then collected and analyzed using systems and methods similar to those illustrated in FIGS. 17-22 described above.

Figure 6A:
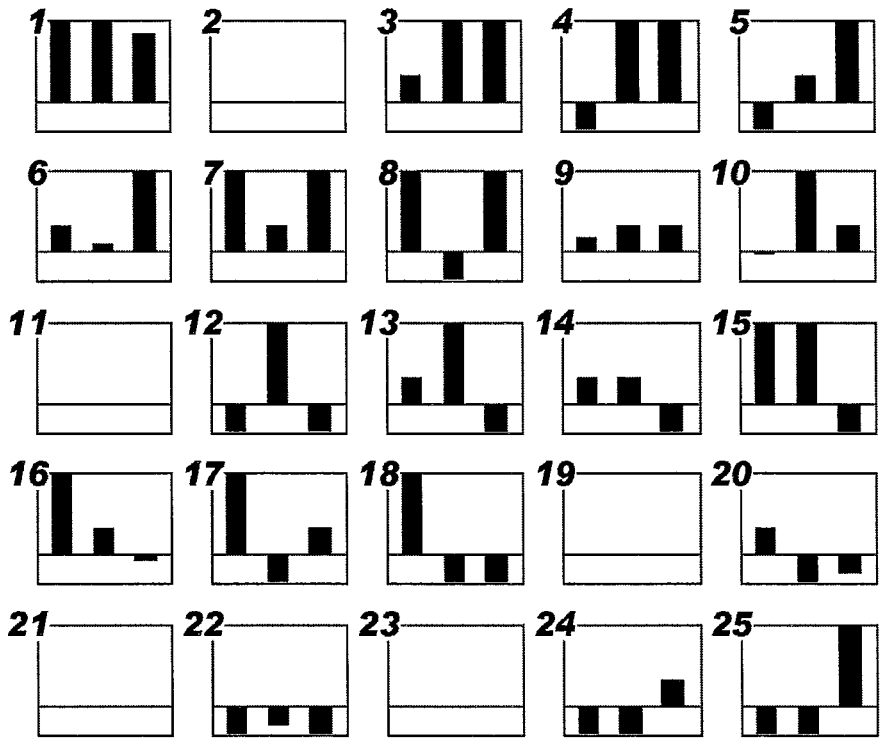
FIG. 6A is a diagram of the NS patterns for EEG-E generated by the ANN.
Figure 6B:
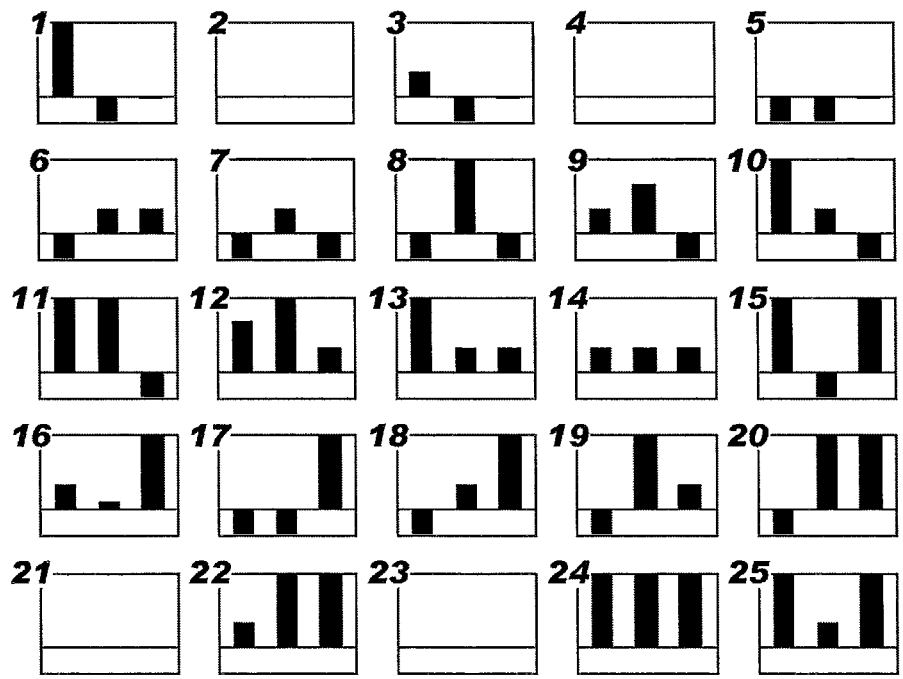
FIG. 6B is a diagram of the NS patterns for EEG-WL generated by the ANN.

During the data collection step, the team members were asked to recall a sequence of emotions, including anger, grief, hate, joy, romantic love, platonic love, reverence and good learning and bad learning. Each three minute period of emotion recall was separated by 1-2 minutes of rest time before the next emotion was recalled. During both the emotion recall and the rest periods, there was minimal talking and the subjects tended to focus on a region of space and/or object. EEG measures of Engagement (EEG-E) and Workload (EEG-WL) were collected at 1 second epochs, normalized as described with regard to FIGS. 20 and 21 and the normalized data used to train unsupervised ANN as described in the method of FIG. 22. The NS patterns for EEG-E generated by the ANN are illustrated in FIG. 6A. In this embodiment, NS patterns for EEG-WL were also determined. The NS patterns for EEG-WL are illustrated in FIG. 6B. The most common NS pattern for the EEG-E was pattern 22, representing epochs where all three individuals on the team expressed low levels of engagement, followed by pattern 20, where only one member of the team (individual #1 on the far left in the histogram) exhibited an elevated EEG-E level.

Figure 7:
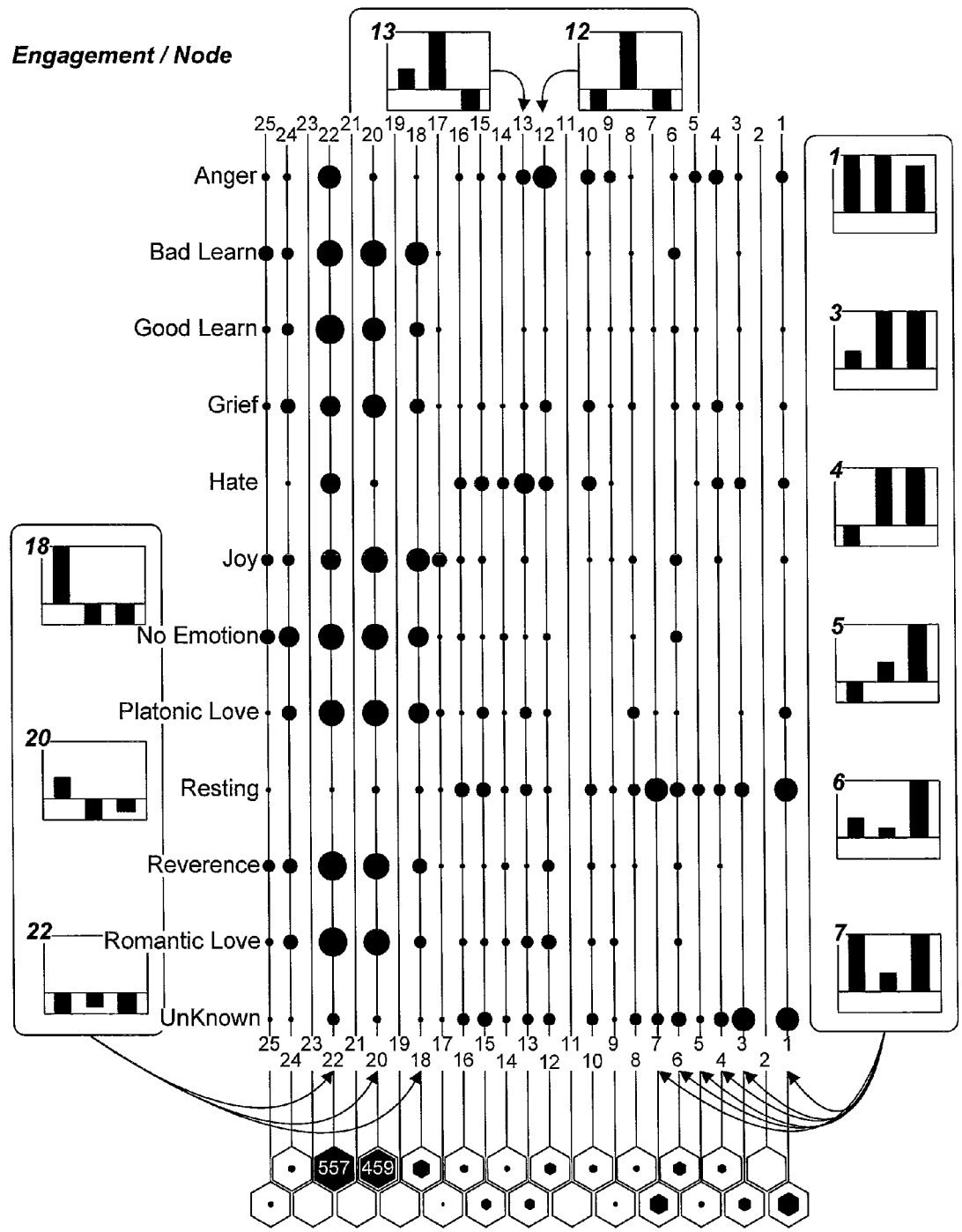
FIG. 7 is a diagram illustrating EEG-E neurophysiologic synchronies associated with the recall of different emotions according to an embodiment.

The epochs for each segment were then binned for each emotion and resting states, and the frequencies of each NS patterns calculated. FIG. 7 is a diagram mapping the EEG-E neurophysiologic synchronies associated with the recall of different emotions to the relative frequency of expression of each NS pattern. The numbered boxes (1, 3, 4, 5, 6, 7, 13, 13, 18, 20, and 22) illustrate one of the more frequent NS patterns associated with the various emotions listed in the chart. The various emotions recalled and resting periods are listed along the vertical axis, and the NS patterns 1-25 are listed along the horizontal axis. If a particular NS pattern was detected during the elicitation of a particular emotion (or during a particular resting period), a circular dot or bubble has been drawn at the intersection of the vertical line extending up from the NS pattern and the horizontal line extending out from that emotion (or resting period). The size of the circular dot is related to the relative frequency of the particular NS pattern for a particular emotion or resting period. The larger the circular dot, the more frequent the particular NS pattern appeared during the elicitation of the particular emotion or during a particular resting period.

Neurophysiologic Synchrony patterns #20 and 22 were associated with most of the emotions except anger and hate. Neurophysiologic Synchrony patterns #20 and 22 were also not associated with the Resting period or the Unknown periods. In the embodiment illustrated in FIG. 7, the Unknown period was a resting period that was extended for 7 minutes. Team member 2 showed high levels of EEG-E for Hate and Anger while the other 2 team members remained low. The epochs where 2 or more members of the team showed elevated EEG-E levels were primarily found during the resting periods.

Figure 8:
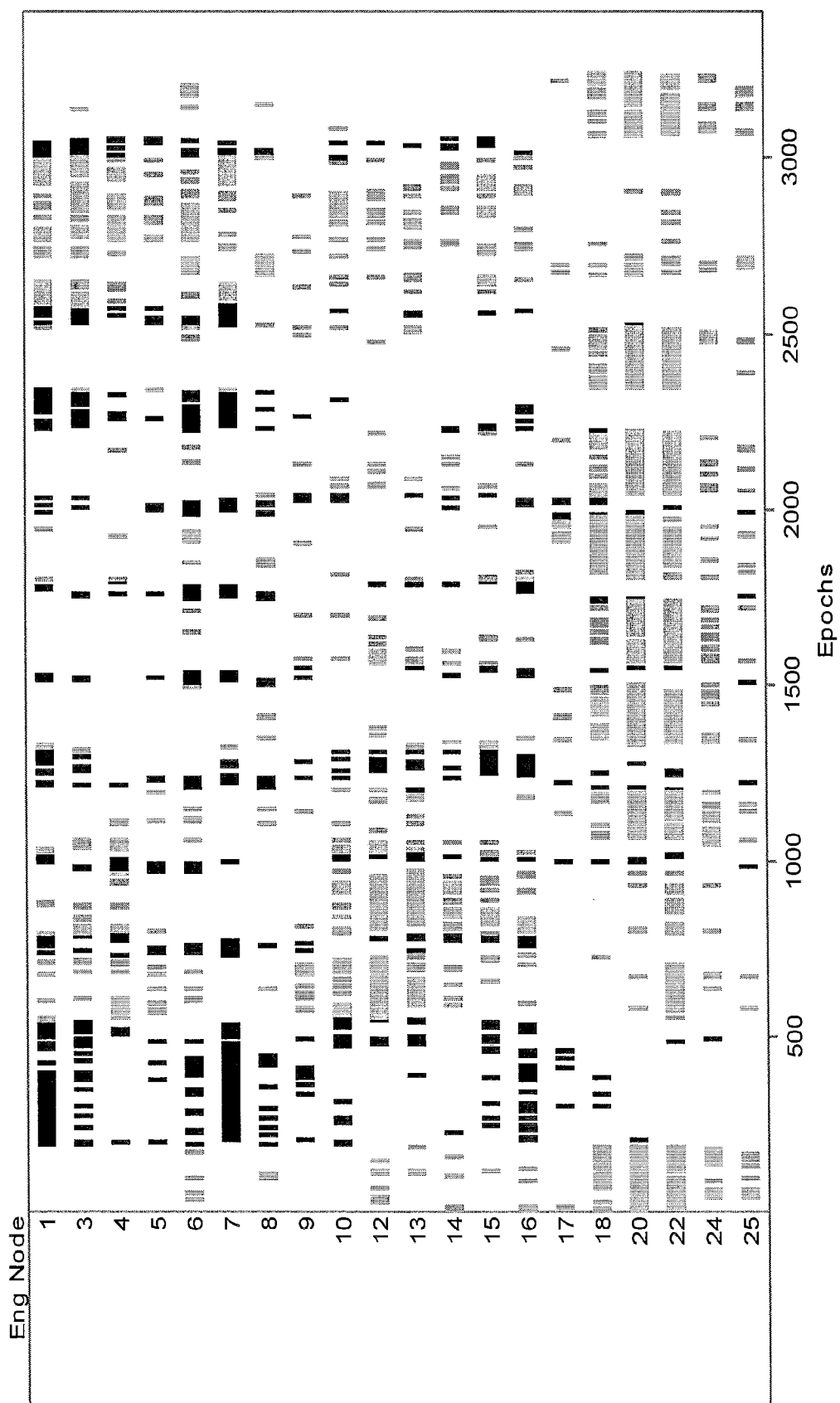
FIG. 8 is a diagram illustrating second-by-second neurophysiologic synchronies for EEG-E during emotion recall according to an embodiment.

FIG. 8 is a diagram illustrating a second-by-second breakdown of neurophysiologic synchronies for the team for each second of the entire exercise, including the periods of emotional recall and the reset periods. Each of the NS patterns (1-25) is listed along the vertical axis of the graph, and the epochs (in seconds) are listed along the horizontal axis. The epochs in black indicate resting periods and those in gray indicate epochs in which the recall of emotions was performed.

Figure 9:
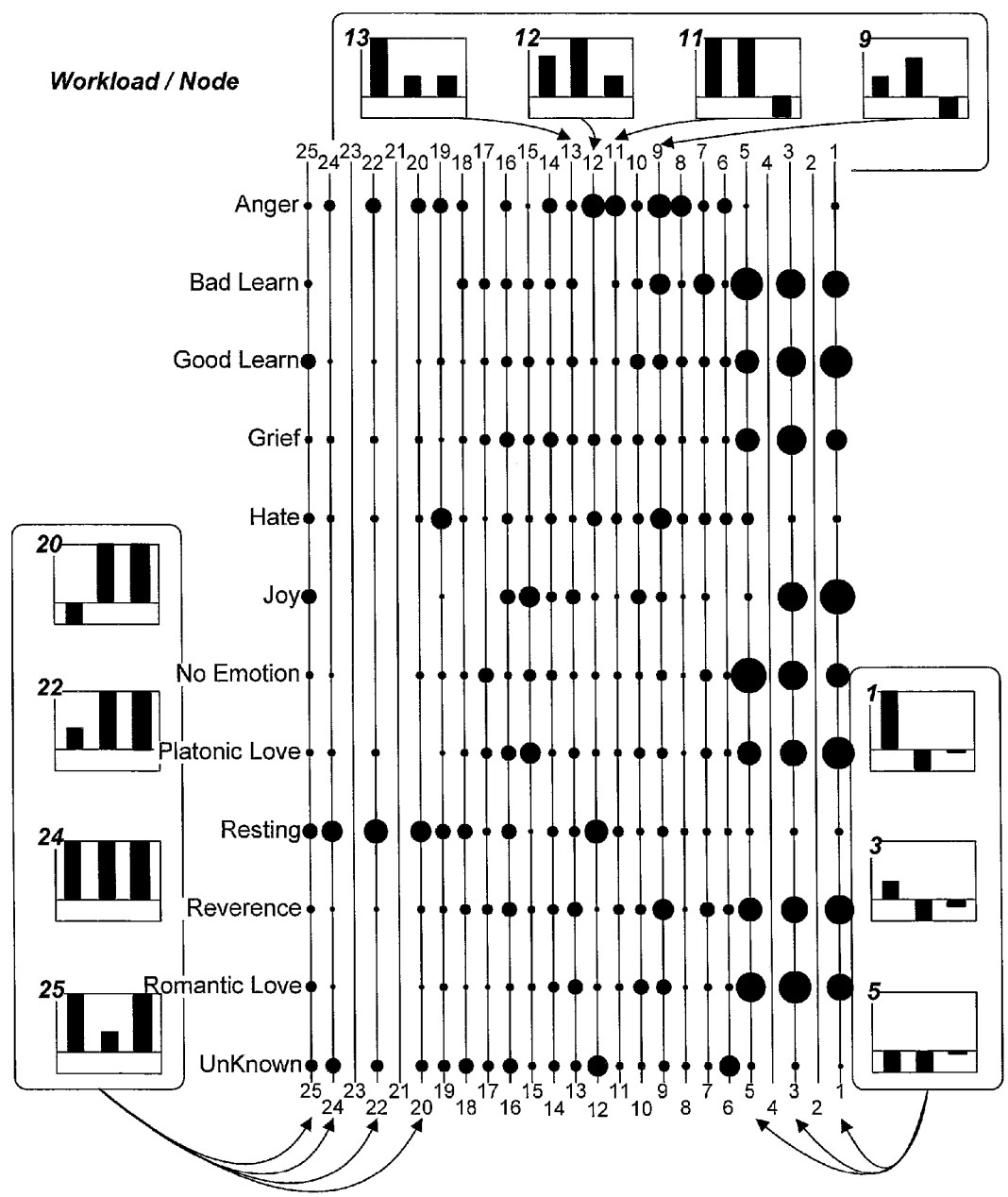
FIG. 9 is a diagram illustrating EEG-WL neurophysiologic synchronies associated with the recall of different emotions according to an embodiment.

FIG. 9 is a diagram similar to that of FIG. 7, except that the diagram illustrated in FIG. 9 provides a visualization of the analysis of EEG-WL neurophysiologic measures that were collected for the members of the team during the exercise, in contrast with the embodiment illustrated in FIG. 7 where a visualization of EEG-E data was provided. The dominant EEG-WL NS patterns identified by the ANN were where two or more team members expressed low levels of EEG-WL. Similar to EEG-E NS expression, most emotions, with the exception of Anger and Hate were associated with NS patterns where two or more members expressed low levels of EEG-WL. There were also large differences between the resting periods and the periods of emotion elicitation. The dominant EEG-WL NS associated with Hate and Anger emotions was where all three members had moderate levels of EEG-WL (NS pattern #9).

From the perspective of neurophysiologic synchronies and teamwork, these results are important as they show that the different members of the team consistently entered a particular neurophysiologic state during the elicitation of emotions and they consistently exited that state during the rest periods. This result was observed both for EEG-E and EEG-WL, although the transition between states was more pronounced with the EEG-E. As the team was not engaged in verbal communication, these results also indicate that the state that was entered into during emotion elicitation was not dependent on active communication among the team members, but was instead more related to the internal representation of the task being generated by each of the team members. Thus NS expression may be a reflection of the internal state of team members and of the team as a whole.

FIG. 23 is a diagram a method that can be used to generate a diagram mapping the EEG-E neurophysiologic synchronies associated with the recall of different emotions to the relative frequency of expression of each NS pattern, such as those illustrated in FIGS. 7 and 9, according to an embodiment. The method illustrated in FIG. 23 can be used to implement, at least in part, symbolic data analysis step 2030 of the method illustrated in FIG. 20. According to an embodiment, the data analysis module 1925 can be configured to perform the steps illustrated in FIG. 23.

The method beings with receiving a list or set of NS frequencies that indicate the number of times that each NS pattern was observed in the data collected while a team is performing one or more monitored tasks (step 2305). The NS frequencies can be calculated as part of step 2020 of the method illustrated in FIG. 20 where the collected data is analyzed to identify NS patterns.

The NS frequency data can then be correlated with information identifying one or more activities or states that occurred during the monitored task (step 2310). For example, in the embodiment illustrates in FIGS. 7 and 9, members of the team were requested to recall a particular emotion at specified times during the exercise. The times that each of these events can be recorded by computer system 1790. For example, the user interface module 1940 can be configured to provide a user interface that allows a user overseeing a task to note the times of specific events, such as the start and end times of the periods during which members of the team were requested to recall specific emotions or were requested to rest without recalling a specific emotion. In some embodiments, the system can be configured to automatically note the beginning and end of specific events, such as the administration of a problem set to a team or other types of tasks that the team is to complete while being monitored.

Once the NS frequency data has been correlated with the information identifying one more events, a map of NS events associated with a particular activities and/or events that occurred during the time that team was monitored can be generated (step 2315). The layout of the map can be similar the layout presented in the embodiments illustrated in FIGS. 7 and 9. Other possible configurations of the report are possible.

A visualization of the map can be generated in step 2030 of FIG. 20. In some embodiments, the user interface module 1940 can be configured to generate a display, such as a web page, that displays the map to a user. In other embodiments, the report generation module 1930 can be configured to generate a report that includes the map generated in step 2315.

Example Embodiment—Temporal Correlations and Autocorrelations in Neurophysiologic Synchrony Expression The present embodiment illustrates how the sequence of expression of neurophysiologic synchronies can be modeled into temporal trajectories using NS pattern designations through a process called symbolic analysis. The symbolic analysis techniques described herein can be used to implement step 2020 of the method illustrated in FIG. 20. The use of symbolic analysis to analyze temporal patterns of neurophysiologic synchronies provides a number of advantages. For example, the analysis of the temporal patterns of NS can be used to determine whether the teamwork processes reflected by NS are random, chaotic or periodic in nature. Furthermore, analysis of the temporal patterns of NS exhibited by a team can be used to predict whether a team is going in or out of synch. Yet another advantage of analyzing temporal patterns is that the analysis of these patterns can be used help identify to help identify the NS transitions that characterize teams under different task conditions or that are linked with particular external macrocognitive processes associated with teamwork.

In the present embodiment, symbolic analysis is applied to the data collected in the example embodiment described above where emotion data was collected using the systems and methods disclosed herein. Transition matrices and autocorrelation at different time lags can be applied to the neurophysiologic synchrony data to provide further insight into the performance of a team. Autocorrelation can be used to compare NS data collected at various points in time to identify correlations in the data at different times during the time that the team was monitored.

Figure 30:
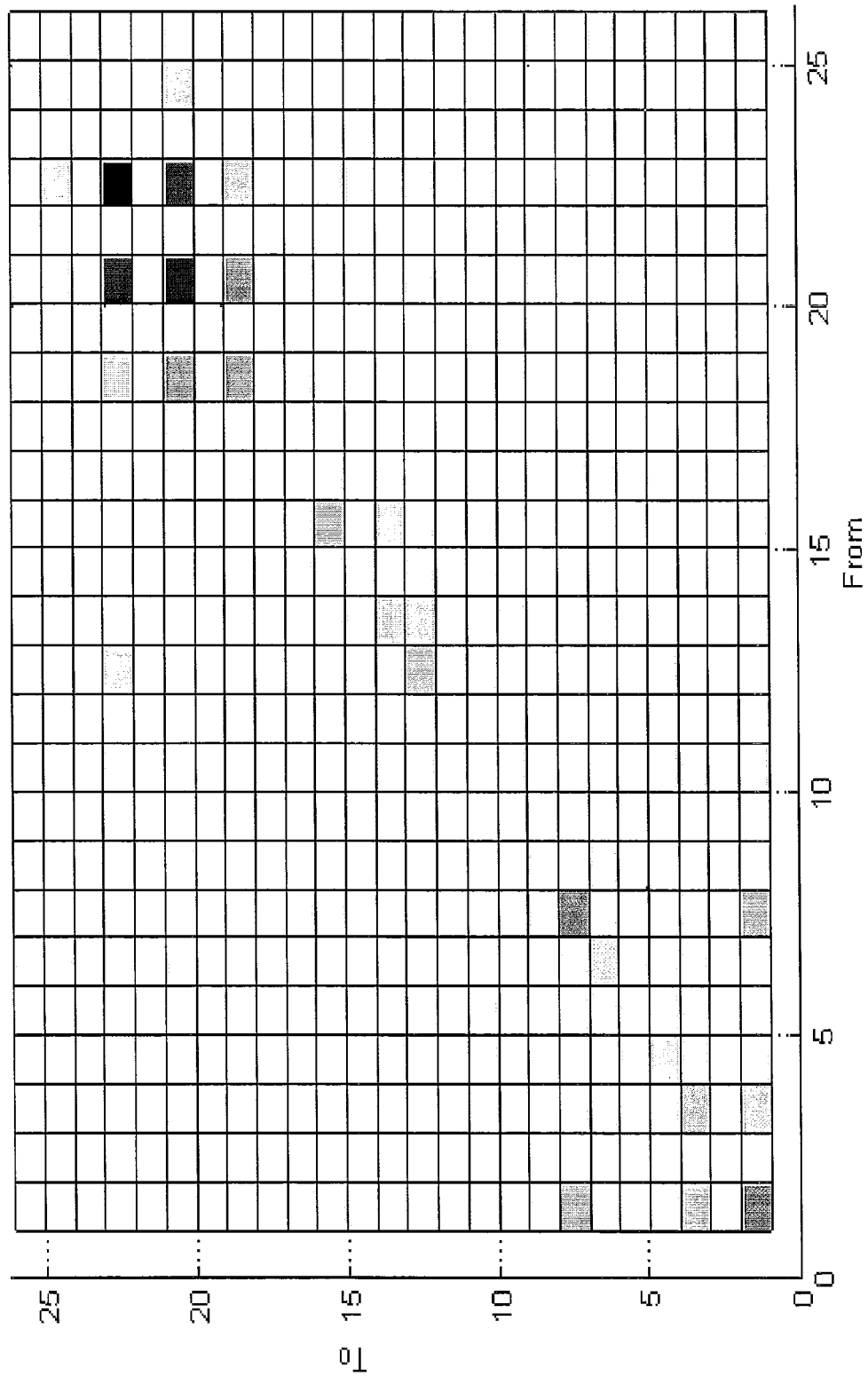
FIG. 30 is a diagram illustrating an EEG-E neurophysiologic synchronies matrix for emotion elicitation according to an embodiment.

FIG. 30 illustrates an EEG-E neurophysiologic synchronies matrix for emotion elicitation according to an embodiment. FIG. 30 illustrates transitions between neurophysiologic synchronies with a time lag of 1 second. According to other embodiments, similar transition matrices can be generated for longer intervals. FIG. 30 shows the transitions from (x-axis) one NS to (y-axis) the next NS one second later. The relative darkness of the shading of the block associated with a particular transition from a first NS to a second NS is used to illustrate the frequency of the transitions between these NS. A non-shaded block indicates that no or very few transitions between that pair of NS were identified in the data.

The upper right hand corner contains the NS associated with the emotions (without including the Anger and Hate emotions). The most frequent transition was from NS 22 to NS 22 with fewer transitions between NS 18 and 20. This shows that temporally NS have a persistent character to them and that the team transitions often involve one member jumping to higher or lower levels of EEG-E. More to the middle of FIG. 10 are the team NS associated with the emotions Hate & Anger, NS #12 & #13. Lastly, the lower left corner contains the synchronies associated with the rest periods, NS #1, 3 and 7, and again the most frequent transitions are among these three nodes.

FIG. 24 is a diagram of a method that can be used to generate a transition map, such as that illustrated in FIG. 30, according to an embodiment. In an embodiment, the method illustrated in FIG. 24 can be implemented by the data analysis module 1925 of computer system 1790. The method illustrated in FIG. 24 can also be used to implement, at least in part, step 2030 of the method illustrated in FIG. 20.

The method begins with neurophysiologic synchrony data being sorted by epoch. As described above, data is collected for a plurality of time periods referred to herein as epochs (step 2405). Each NS pattern may be exhibited by the team members during one or more epochs. The NS patterns can be identified in step 2015 of the method illustrated in FIG. 20.

Transitions between NS patterns are then identified in the sorted information (step 2410), and a transition map can then be generated based on the information identified (step 2415). The transition map can include the number of times that each transition from a first NS pattern to a second NS pattern is identified.

A visualization of the transition map can be generated in step 2030 of FIG. 20. In some embodiments, the user interface module 1940 can be configured to generate a display, such as a web page, that displays the map to a user. In other embodiments, the report generation module 1930 can be configured to generate a report that includes the map generated in step 2415.

Figure 29:
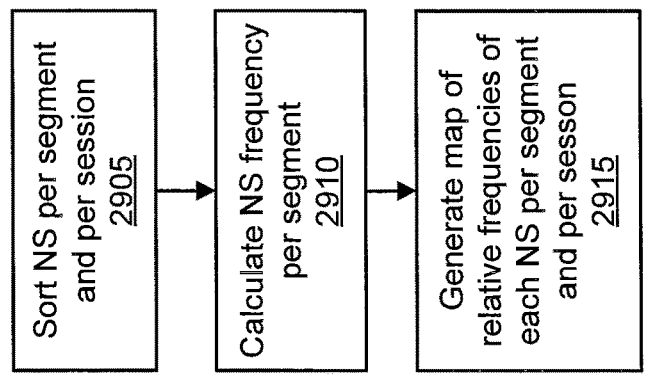
FIG. 29 is a flow diagram of a method for generating a map of frequencies of neurophysiologic synchronies expression across sessions.
Figure 31:
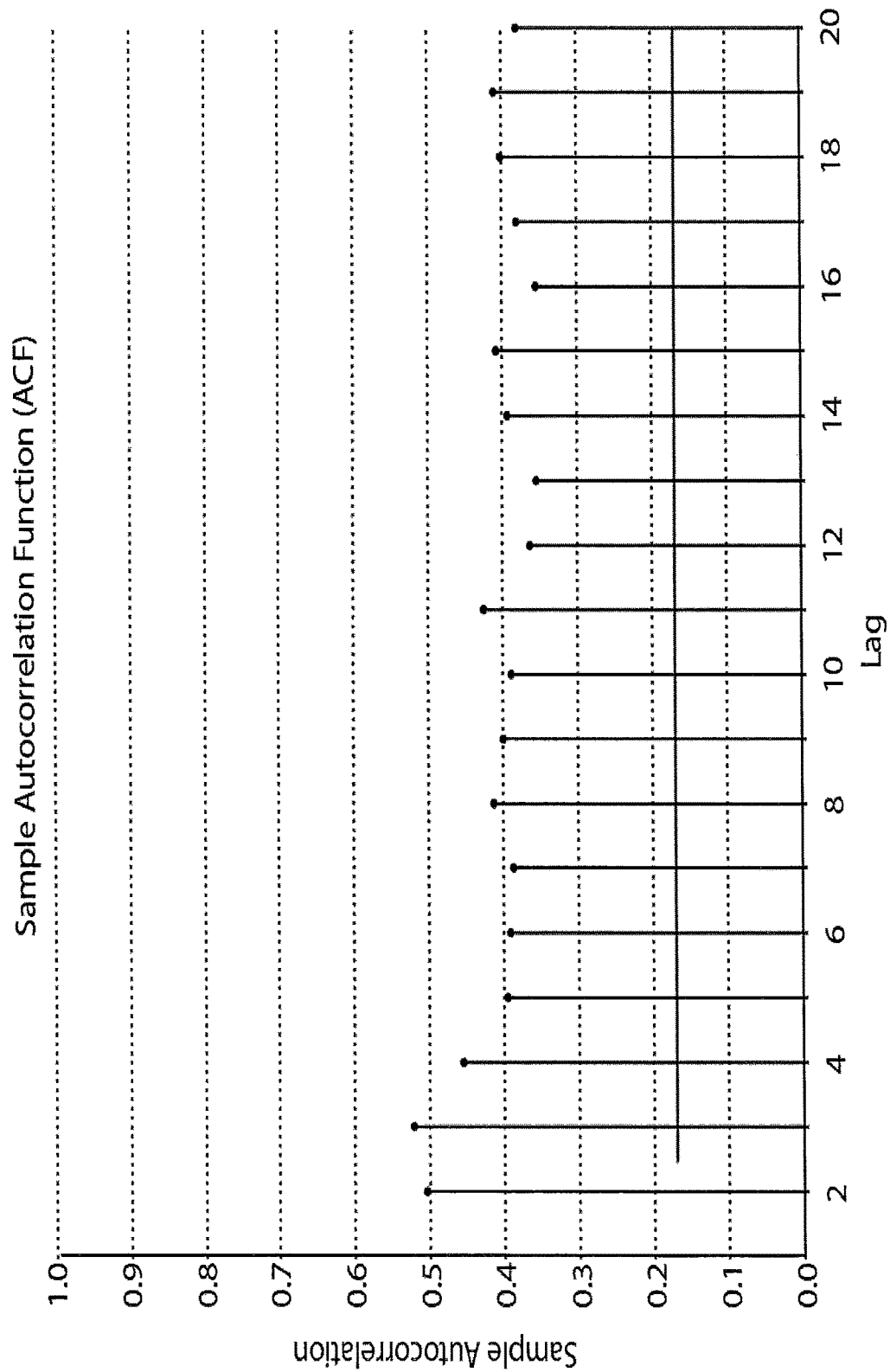
FIG. 31 is an autocorrelation diagram for the emotion recall data illustrated in FIG. 11 according to an embodiment.

FIG. 31 is an example of an autocorrelation data that has been created for the emotion recall data also used to generate the matrix of FIG. 30. The autocorrelations for this data set at time lags out to 20 seconds are shown in FIG. 29 and show a high (0.6-0.7) and slowly diminishing autocorrelation with increasing time lags. According to an embodiment, the twenty second time lag used in this embodiment can rule out the possibility of the NS being randomly expressed and suggests more of a chaotic dynamic. According to other embodiments, a different time lag can be used in the autocorrelation function.

Both transition matrices, such as those illustrated in FIG. 30, and autocorrelations, such as those illustrated in FIG. 31, can be generated during shorter segments of the teamwork to increase the temporal granularity of the analysis, and examples are illustrated in later sections of this application. Combined these results establish that there is a persistent character to NS expression by a team and indicates the possibilities for using NS to predict, and perhaps modify future performance/behavior based on current NS expression. Given that the participants were not communicating verbally or creating a shared mental model of the situation (other than in their own heads) these studies also suggest some utility for NS for virtual teams.

Example Embodiment—Substance Abuse Simulation

In the embodiment described in this section, the systems and methods described above are applied to study the decision making process of teams of three high school students who are working to determine if a person in a simulation should seek help for a substance abuse problem. This embodiment illustrates how neurophysiologic synchrony data can be used in an educational environment to monitor and analyze the performance of a team in a problem solving exercise.

In this embodiment, students were monitored to captured neurophysiologic data while the teams of students worked to answer problems sets of substance abuse questions. The question sets used were from an IMMEX problem set called "SOS" which is a series of substance abuse simulations cast like a reality show. IMMEX stands for "Interactive Multi-Media Exercises." IMMEX is a suite of software application that can be used to challenge students' problem solving skills and provide teachers with real-time assessment tools. IMMEX problem sets can be used to assess a student's performance in solving various types of problems. The results from the IMMEX problem sets can be used to generate a Strategic Performance Map that provides a graphic representation of a student's performance on a problem set, and the Strategic Performance Map can be used to determine whether a student's problem solving strategies are improving or getting worse.

The SOS problem set begins with a short introduction to a person who may or may not be abusing drugs. The challenge for the student is to gather sufficient information about this person to answer the question "Should this person seek help, and if so, from whom?" The primary interface is a timeline that covers up to twelve specific events (such as health, job, social school, etc. related activities) and drilling down into this interface provides information in eleven areas with contents covering subject history, behavior, medical data and conjecture, and help. These 600+ content items are divided into social and scientific areas allowing the student to gather information from many perspectives.

Prior modeling studies have shown that ~20% of the students use science-only approaches, ~40% will use social approaches, and ~40% will use a combination of the two. This task provides a convenient mechanism for the division of teamwork (i.e. social vs. scientific evidence), as well as a potential source of conflict within the group as to what evidence is important relative to the decision.

Experimentally, students log on to IMMEX and individually perform a SOS simulation so that each can develop a mental model of the problem space, and so that individual levels of EEG-related workload and engagement can be determined. Two students then log on to a second SOS problem set where Member A selects data from the timeline and reports information from General Health, Anecdotes and Cell & e-mails (i.e. the social perspective), Member C selects data from all the other science categories and reports them to the group (the science perspective) and the leader (Member B) integrates the information and decides when to make a decision, and what the decision will be. Students are given 30 minutes to complete the simulation (a time constraint).

During the performance of the SOS simulation, time-stamped logs are generated that include information about mouse clicks and web page changes made by the students as well as capturing detailed video and audio logs of the students' actions during the simulation. This provides a knowledge rich environment that can be used with the NS techniques disclosed herein for improved understanding of team performance by allowing tighter linkages between NS expression and other aspect of teamwork to be established.

Students participating in the SOS simulations were each provided with a wireless EGG sensor headset similar to the sensor device 1710 illustrated in FIG. 17. Data was then collected and analyzed using systems and methods similar to those illustrated in FIGS. 17-22 described above.

In one embodiment, the performance of six collaboration groups was examined to identify common and dissimilar EEG-E patterns across the teams. As described above, the data collected can be analyzed to identify neurophysiologic synchronies (see steps 2015 and 2020 of FIG. 20 and the method illustrated in FIG. 22). As describe above with respect to FIG. 22, an ANN can be trained to identify neurophysiologic synchronies within the data collected.

Figure 12A:
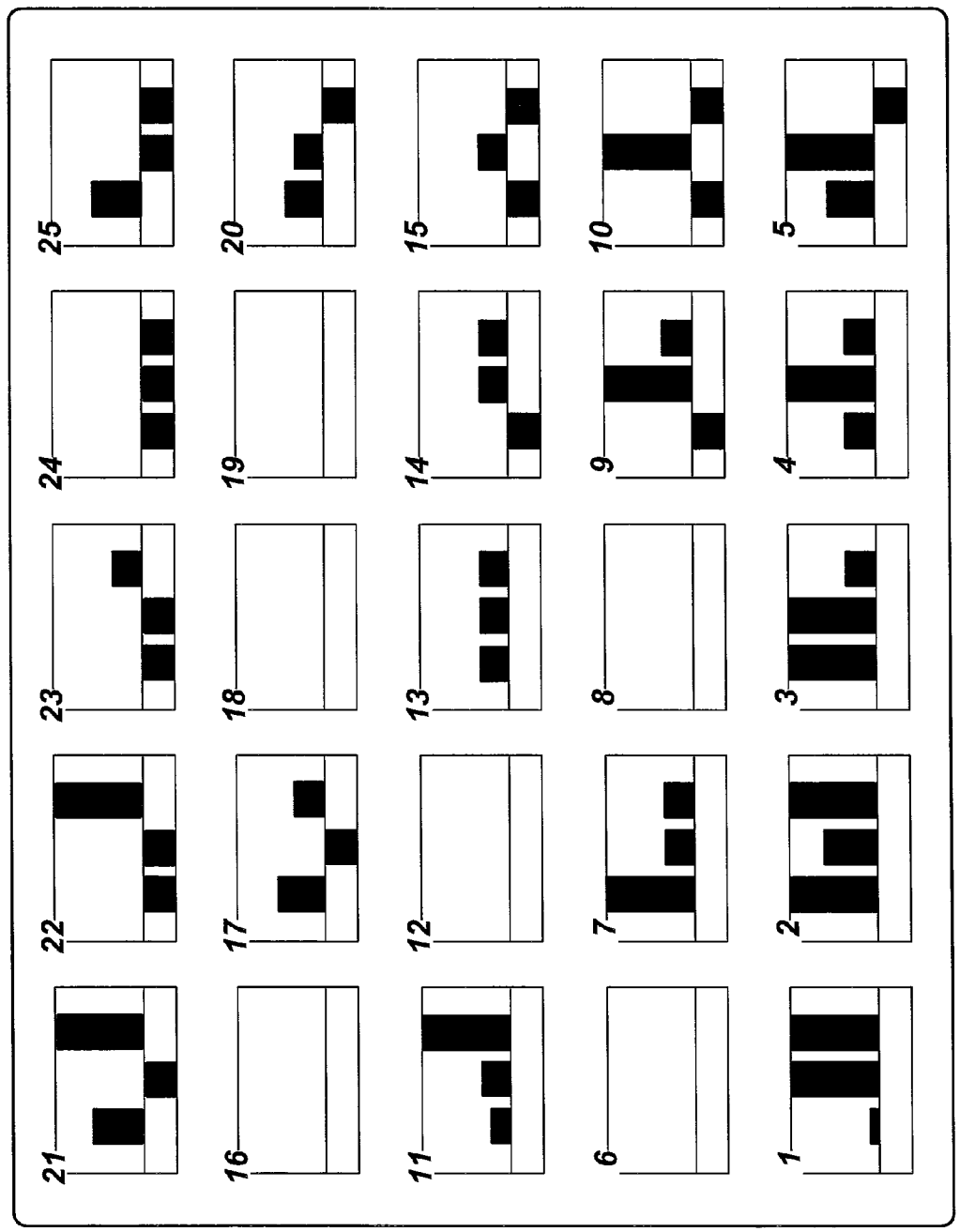
FIGS. 12A, 12B, and 12C illustrates an example map of neurophysiologic synchrony expression across teams.
Figure 12B:
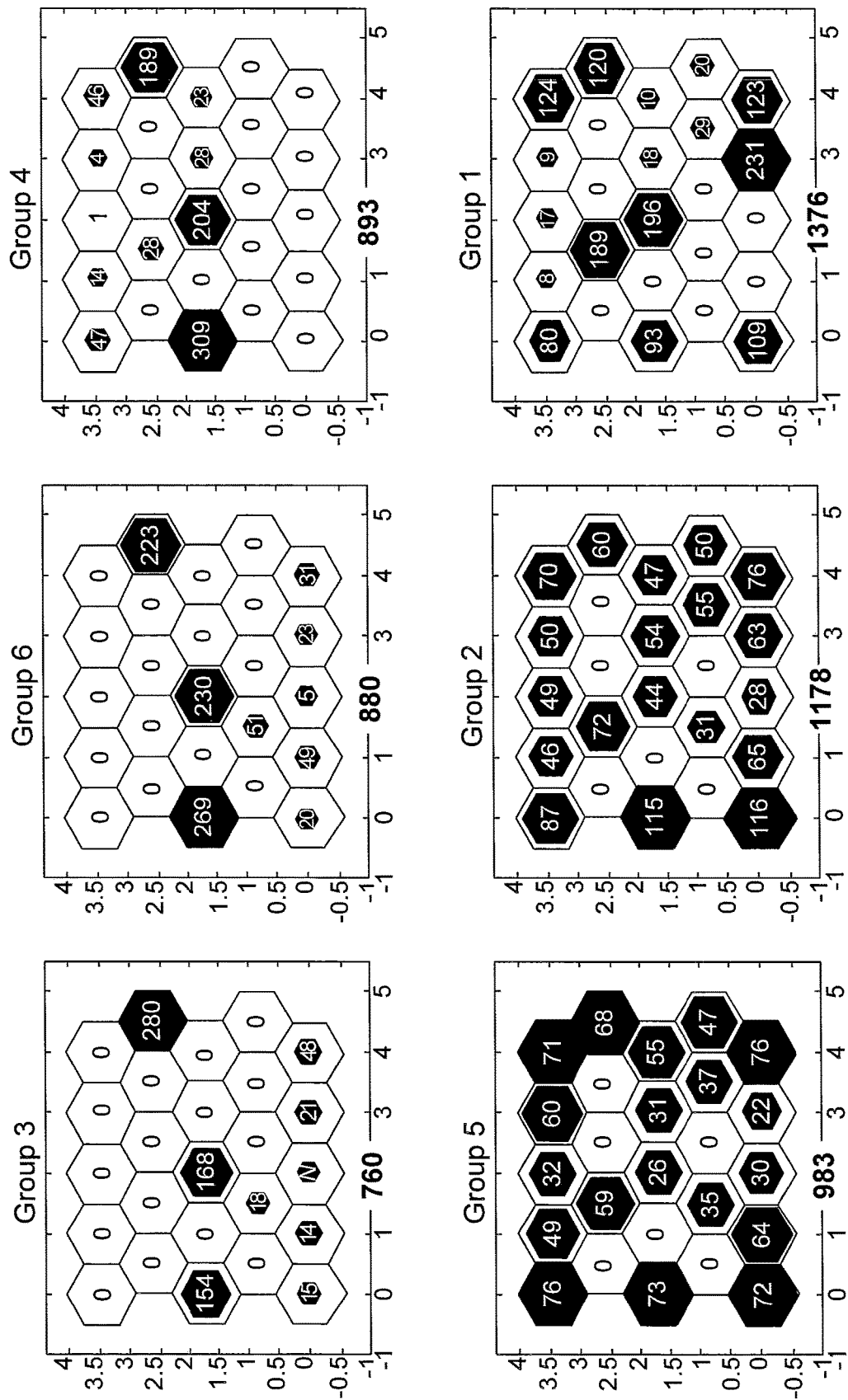
Figure 12C:
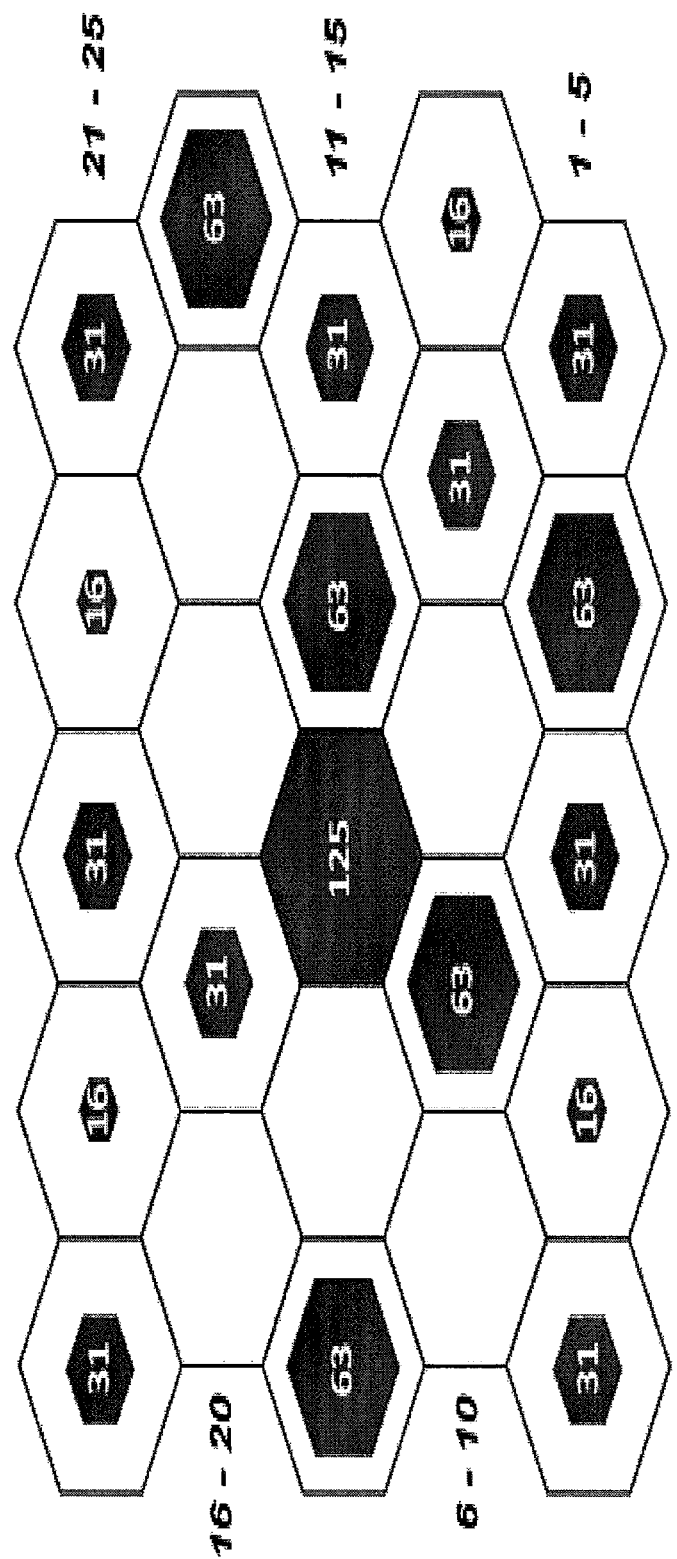

FIGS. 12A, 12B, and 12C illustrates an example of map of neurophysiologic synchrony expression across teams. In this example an unsupervised ANN was trained with the performances of six teams performing the same SOS simulation and following training, each of the team performances were individually tested on the trained neural network.

The six boxes containing hexagons in FIG. 12B represent the frequency of expression of each of the NS patterns shown FIG. 12A for each of the six teams. As can be seen from FIG. 12B, there are 25 NS patterns, one for each of the nodes of the unsupervised ANN. As in the examples described above, a 1×25 node unsupervised ANN was used. However, one skilled in the art will recognize that in other embodiments an ANN having a different number of nodes can be used. The single figure below shows the frequencies of each NS that would be expected were NS expression random. For instance, NS 12 where all members are expressing average levels of EEG-E would be expected to have the highest frequency as this represents 50% of the total sample population when the data has been normalized according to the method illustrated in FIG. 21 and FIG. 2.

FIG. 12C is a frequency map that includes which frequencies would be expected if the NS expression were random, that is based on the normalization algorithm where there should be ¼ high values, ¼ low values and ½ intermediate values. Comparing the random frequency map with the experimental data for the six teams that is found on FIG. 12B again indicates that NS expression is not a random event. As the different groups are ordered by decreasing time there are suggestions that the more efficient groups (with regard to time utilization) express the fewest number of different NS patterns. For example, Group 3 completed the task in 760 seconds, Group 6 completed the task in 880 seconds, and Group 4 completed the task in 893 seconds. Group 5 completed the task in 983 seconds, Group 2 completed the tasks in 1178 second, and Group 1 completed the task in 1376 seconds. Groups 3, 6, and 4 completed the task more quickly than Groups 5, 2, and 1 and, Groups 3, 6, and 4 exhibited far less different NS patterns than groups 5, 2, and 1.

Cross tabulation analysis provided further details linking NS expression with teamwork activity. For instance, there were statistical associations between NS expression and who was speaking; whether it was the team leader, the scientist or the sociologist (p=0.03) while there was no association with whom a particular person is speaking with (p=0.11). More significant associations existed with how they were speaking i.e. whether they were questioning, responding, making a statement, etc. (p=0.005). The largest associations however were the temporal expressions during the collaboration event (p<0.001). These findings were combined by linking verbal communication with periods of high or low expression of different NS.

FIG. 13 is a diagram linking team conversations with EEG-E NS expression data according to an embodiment. In FIG. 13, the expression of 25 different NS patterns for one group (group #5) of high school students that participated in the simulation was plotted on a second-by-second basis, and areas of statistically high or low NS expression were highlighted. The left side of the figure shows the dialog among the students towards the end of the task when EEG-E expression was low as indicated by the over expression of particular neural synchronies. During this ~40 second period the team was figuring out how to spell psychiatrist. In contrast, during an earlier 40 second time period when EEG-E expression was elevated for all three team members the conversation reflects hypothesis generation and testing. These studies extend those of emotion recall by showing that there are meaningful and relevant associations between the internal processes being reflected by EEG and overt external actions of the team.

FIG. 25 is a flow diagram of a method for monitoring and analyzing neurophysiologic indicators of members of multiple teams according to an embodiment. The method illustrated in FIG. 25 is similar to that illustrated in FIG. 20, except the method of FIG. 25 is used to monitor and analyze physiologic data for a plurality of teams. The method illustrated in FIG. 25 can be implemented using the systems illustrated in FIGS. 17, 18, and 19 according to an embodiment. The steps of FIG. 25 can be executed by data analysis computer system 1790 unless otherwise specified in the description. The method illustrated in FIG. 20 can be used to implement real time monitoring and analysis of a team performance of a collaborative task. The method can be used to provide real time feedback regarding the team's performance during the performance of the collaborative task or to provide offline feedback that can be used after the team's performance of the collaborative task to improve subsequent performances or to make adjustments to the collaborative task.

Similar to the single team embodiment, sensors are used to collect neurophysiologic data for each of the teams (step 2505). Step 2505 is similar to step 2005 of the method of FIG. 20. The data can include various neurophysiologic data, including High EEG-Engagement (EEG-E), Low EEG-E, Distraction and High EEG-Workload (EEG-WL) data. For example, in the embodiment illustrated in FIG. 17, EEG sensors 1710a, 1710b, and 1710c are used to collect EEG data from three members of a team whose performance is being monitored and analyzed. While the embodiment illustrated in FIG. 17 illustrates a team that includes three members, teams of other sizes that include more or less members can be included. As described above, other types of sensors and/or types of neurophysiologic data collected can be collected in other embodiments. Furthermore, while the embodiment described herein collects and analyzes just EEG data, in some embodiments, more than one type of neurophysiologic data can be collected and analyzed to identify neurophysiologic synchronies for each team.

As described above, the monitoring devices 1705a-1705c can be associated with one of the members of the team and can be used to collect the signal data output by the sensor devices 1710a-1719c. The monitoring device 1705a-1705c can be configured to store data collected by the sensor devices 1710a-1719c. The monitoring device 1705a-1705c can also be configured to download the sensor data to data analysis computer system 1790 via a wired or wireless connection. According to some embodiments, the monitoring devices 1705a-1705c can be configured to collect data during a team activity that is being monitored and the collected data is downloaded to the data analysis computer system 1790 after the event is completed. In other embodiments, the monitoring devices 1705a-1705c can be configured to transmit data to the data analysis computer system 1790 as the data is collected.

As described above, in some embodiments, data is collected for a plurality of time periods (also referred to herein as "epochs") during the monitored team performance. For example, in some embodiments neurophysiologic data can be collected on a second-by-second basis. For example, in an embodiment, second-by-second calculations of the probabilities of High EEG-Engagement (EEG-E), Low EEG-E, Distraction and High EEG-Workload (EEG-WL) can be performed.

According to an embodiment, data representing environmental conditions can be collected in parallel with the collection of the neurophysiologic data for the team in step 2505 (step 2507). Step 2507 is similar to step 2007 of the method of FIG. 20. As described above with respect to FIG. 20, the environmental can have an impact on the neurological and cognitive states expressed by members of the teams during the monitored performance. Environmental conditions experience by team members can be manipulated through the use of virtual reality and/or other types of simulations to provide stimulus for training exercises and/or to assess team performance under various conditions. Environmental information can be logged using various techniques and this information can later be correlated with NS expression.

According to an embodiment, the information collected in step 2507 can be analyzed to characterize the team environmental condition (step 2512). This step is similar to that of step 2012 of the method illustrated in FIG. 20. Events or tasks that can impact the cognitive state of the team members can be identified and this information can be used in conjunction with NS expression data to assess the performance of the teams being monitored. The method illustrated in FIG. 25 can be used to identify how teams respond to a new training environment and/or training configuration. For example, the method illustrated in FIG. 25 can be used to identify teams respond to switching from SPAN training to a virtual reality simulation, or from a virtual reality simulation to a Bridge Trainer simulation. One skilled in the art will recognize that these are merely examples of the types of changes to the training environment or configuration that can be used, and that the method illustrated in FIG. 25 can be used to identify teams' reactions to other types of changes in environment.

According to some embodiments, the data collected by the sensors can be optionally preprocessed before the data is analyzed to identify neurophysiologic synchronies (step 2510). This step is similar to that of step 2010 of the method illustrated in FIG. 20. As described above, the sensor data collected during a monitored performance can be synchronized and time stamped so that the data collected for each of the members of the team can be aligned with that team members respective description of the environmental condition and/or physiologic and environmental condition information collected for other team members. The collected data can also be processed to remove artifacts that can increase the probability for misclassification of the cognitive state of team members, such as spikes, excursions, eye blinks, and non-specific physiological interference (e.g., muscle activity in the EEG signal). Various techniques can be used to remove artifacts in the data caused by eye blink events. In some embodiments, other types of preprocessing of the data can also be performed, such as to remove artifacts caused by muscle movement. In some embodiments, the data collected by the sensors can be processed to remove line noise or other artifacts introduced during the data collection process. According to an embodiment, the preprocessing step can be performed by the data analysis module 1925 of the data analysis computer system 1790. According to other embodiments, monitoring device 1705 can be configured to perform some or all of the preprocessing of the data before the data is downloaded to the data analysis computer system 1790.

The neurophysiologic data collected for each team can then be analyzed can then analyzed to identify the cognitive and emotional states of the individual team members and of the team as a whole (step 2515). Step 2515 is similar to that of step 2015 of the method illustrated in FIG. 20. In the method illustrated in FIG. 25, the data for each individual team is normalized and NS expression identified for each team. The normalized data for each team can then be used to compare the performance of the teams in subsequent processing steps described below. According to an embodiment, the collected data for each team is normalized before the collected data is analyzed to identify neurophysiologic synchronies. In some embodiments, the normalization step is performed by the data analysis module 1925 of data analysis computer system 1790. According to an embodiment, a continuum of EEG metrics which measure high or low engagement, distraction/confusion/boredom/fatigue, or mental workload can be utilized to assess the cognitive state of the team members. According to an embodiment, variability in heart rate (preferably derived from ECG or pulse rate) can be used to assess rapid changes in sympathetic arousal/stress (i.e., emotion). Any of these cognitive or emotional state assessments may be used to assess the state of the individual. FIG. 21 is a flow diagram of a normalization method that can be used to perform the normalization step on each team's data.

Once the individual and the team's cognitive and emotional states and the team environmental conditions have been identified in the preceding steps, the team's cognitive and emotional states can be analyzed within the construct of team event that occurred during the monitored period of learning or training (step 2520). Step 2520 is similar to step 2020 of the method illustrated in FIG. 20. Neurophysiologic synchrony expression by the team can be compared to event information in order to identify and interpret NS expression associated with specific events during a monitored performance.

A comparison of the performance data collected for the participating teams can then be performed to generate team performance comparisons (step 2525). Team performance interpretation data from step 2520 can be compared to interpretation data for other teams in order to provide contextual information for assessing the performance of the teams. The comparison of team performance data can also be used to assess how well individual teams are performing a particular task. According to an embodiment, the team state/event interpretations generated in step 2520 can be compared to a team state or event interpretations from previous sessions and/or with expert data regarding team performance. Team performance data from a monitored session can be compared to expert data and/or to data other teams to provide evidence that the team is learning a particular task. Comparing performance data from a single session to previous session data allows a single monitored session to provide useful training information, because the data generated from the session can be reviewed and discussed in the context of the performance of multiple teams and/or expert data.

According to an embodiment, computer system 170 can include a data store that can be used to store data from previous sessions. In some embodiments, analyzed data from previous sessions can be stored in analyzed data store 1955. According to some embodiments, the team state/event interpretations can be compared with expert data stored in expert data store 1960 and/or with data collected from repeated sessions using the same team to assess team neurodynamics indicative of learning. According to an embodiment, an example of analyzing and comparing team performances is illustrated in FIGS. 16A and 16B. The embodiment illustrated in FIGS. 16A and 16B is described in greater detail below.

One or more performance reports can also be generated for the monitored team performance/team learning session (step 2530). Step 2530 is similar to that of step 2030 of the method illustrated in FIG. 2030. According to an embodiment, one or more team performance reports can be generated that illustrate the neurophysiologic synchronies identified in the analysis of the neurophysiologic data collected from the team while the team performance was being monitored and/or a user interface of the computer system 1790 can be used to generate a visualization of the data generated in the previous steps of this method. According to an embodiment, the report generation module 1930 of the data analysis computer system 1790 can be configured to generate various types of reports that present the results of the data analysis. The reports can include comparisons with expert data and/or with prior performance information for the team to highlight team learning and/or changes in team performance. The reports can include comparisons with expert data and/or with prior performance information for the team to highlight team learning and/or changes in team performance. The learning and/or performance information included in the reports can be used to identify problems with a team (e.g., one or more members that do not work well together) and can be used to identify whether a team is exhibiting NS expression that indicate mastery or lack thereof of certain skills. This information can be used to tailor training tasks for the team to focus on particular aspects of the team task that may require improvement. Comparisons between the performance of various teams can be included in the report.

The team's cognitive and emotional states identified in step 2520, and/or the results of the comparison of the team state/events interpretations of step 2525, and/or the various performance reports generated in step 2530 can be used as a basis for generating individual and/or team feedback (step 2540). As described above, feedback for one or more team members can be generated in real time as the team performs a collaborative task. In these embodiments, steps 2520, 2525, and 2530 can also be performed in real time while the team is performing the collaborative task. As a result, feedback can be generated from the results of these steps and the method can return to steps 2505 and 2507 where additional data can be collected and analyzed. The data generated in the preceding steps can be used to identify individual team members or a constellation of multiple team members who are not performing the collaborative task at a desired level, and to provide real-time intervention during the performance of the collaborative task by providing real-time feedback.

As described above, various types of feedback can be provided. For example, haptic feedback can be provided to one or more team members, which provides tactile stimulation to the team members to alert the team members to somehow alter their behavior. For example, haptic feedback could be provided to a member of team who is exhibiting low engagement during a portion of a collaborative task that requires a high level of attention from the team member. The haptic feedback can be used to signal the team member to pay attention to the task. Other types of feedback, such as audiovisual feedback can be provided. For example, audible signal or commands could be played through headphones to specific team members or played through a speaker system, so that the signal or commands are audible to the team members. Visual feedback could also be provided, such as a graphical representation of team performance or textual commands or performance indicators could also be displayed to the team members. In embodiments where the collaborative task involves a simulation, the simulation could be configured to display the various audiovisual indicators in the simulated environment.

According to some embodiments, feedback can also be provided to an administrator or instructor of the collaborative task, and the administrator or instructor can use this information to make changes to a training session and/or simulation to address the issues identified. For example, an instructor could use feedback received regarding the team's performance of the task in real-time to make changes to the simulation environment and/or other corrective actions to address the identified problems. Various types of feedback can be provided to the administrator or instructor, such as graphical representations of the neurophysiologic states exhibited by team members during performance of the collaborative task and/or audiovisual signals indicating that one or more members of the team are exhibiting neurophysiologic states that are divergent from desired states indicative of learning or acquisition of expertise at a particular task or team performance According to some embodiments, the method can be used to provide offline feedback to instructors and/or team members. The reports and other information generated in the preceding steps of the method can be examined after the collaborative task is completed, and the information provided can be used to make change to the training exercises and/or simulations and/or discussed with team members to allow team members to adjust their behavior accordingly in subsequent collaborative tasks.

Figure 26:
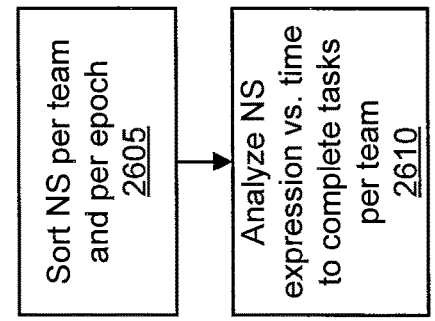
FIG. 26 is a flow diagram of a method for generating a map of neurophysiologic synchronies across multiple teams according to an embodiment.

FIG. 26 is a flow diagram of a method for generating a map of neurophysiologic synchronies across multiple teams according to an embodiment. The method illustrated in FIG. 26 can be used to implement, at least in part, step 2525 of the method illustrated in FIG. 25. The method illustrated in FIG. 27 can be implemented using the data analysis module 1925 of the computer system 1790. The method illustrated in FIG. 26 can be used to generate a map of neurophysiologic synchrony expression across teams similar to that illustrated in FIGS. 12A, 12B, and 12C.

The normalized NS data generated in step 2515 can be sorted by team and by epoch (step 2605). According to an embodiment, the NS frequencies can be identified as part of step 2520 of the method illustrated in FIG. 25 where the collected data is analyzed to identify NS patterns. Once the data has been sorted, the data can be analyzed to create a map that identifies which NS patterns were expressed by each team and the amount of time that it took each team to complete an assigned task (step 2610). The map can be sorted by the amount of time that it took each team to complete the assigned task and/or by the number of NS patterns exhibited by each team. This map illustrates the correlation between the number of NS patterns exhibited by a team and how quickly the team was able to complete the assigned task.

A visualization of the transition map can be generated in step 2530 of FIG. 25. In some embodiments, the user interface module 1940 can be configured to generate a display, such as a web page, that displays the map to a user. In other embodiments, the report generation module 1930 can be configured to generate a report that includes the map generated in step 2610.

According to some embodiments, a combination of metrics can be used to characterize the cognitive or emotional states of the team members. Although a co-expressions of team members can be derived using any singular measure of cognitive or emotional state, the characterization is improved using a combination of metrics (e.g., engagement, workload, stress, etc.) that incorporates changing patterns. For example, it is common for engagement to drop temporarily when a team member is mapping visual information to memory to interpret an environmental condition, which in turn causes an increase in stress (i.e., heart rate spike) as a result of the interpretation. One such approach employs a neural network to combine multiple metrics into a single neurophysiologic synchrony or cognitive plus emotional state (CES). In one embodiment the individual metrics submitted to the neural network includes time series data so that dynamic changes to the patterns measures are incorporated into the output. Each node in the neural network can then be mapped to the dynamic, inter-related pattern that that node represents for subsequent interpretation. For example, a pattern of decelerating heart rate and engagement in combination with increasing workload is indicative of a CES pattern of expert deadly force decision making. A pattern of high engagement with low workload and heart rate suggests the user is performing a task that is visually stimulating but doesn't require interpretation. One skilled in the art will recognize there are multiple statistical and analytical means available to combine metrics and interpret the singular outputs.

The methods illustrated in FIGS. 20-29 can be modified for use with embodiment where a combination of metrics is collected from team members. For example, in the embodiment illustrated in FIG. 20 a combination of metrics can be collected in step 2005 and the multiple metrics can be used in step 2015 to identify emotional and cognitive states of the team members. Furthermore, in the embodiment illustrated in FIG. 25 multiple metrics can be collected in step 2505 the multiple metrics can be used to can be used in step 2515 to identify emotional and cognitive states of the team members. Furthermore, the method illustrated in FIG. 22 can be modified to present multiple metrics to the ANN in steps 2205 to generate the NS topology and frequency map. In embodiment where multiple metrics are collected, the normalization process illustrated in FIG. 21 can also be modified to normalize data for multiple metrics. For example, in an embodiment, a normalized vector can be generated for each metric collected for each team member, and a normalized team vector can be generated that is a combination of the normalized vectors generated for each team member.

Figure 27:
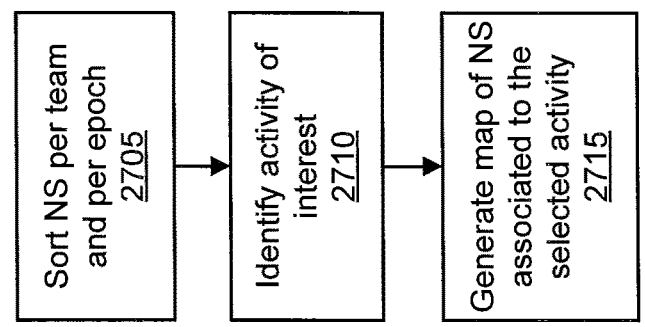
FIG. 27 is a flow diagram of a method for generating a map linking specific actions or events to specific neurophysiologic synchrony patterns according to an embodiment.

FIG. 27 is a flow diagram of a method for generating a map linking specific actions or events to specific neurophysiologic synchrony patterns according to an embodiment. The method illustrated in FIG. 26 can be used to implement, at least in part, step 2525 of the method illustrated in FIG. 25. The method illustrated in FIG. 27 can be implemented using the data analysis module 1925 of the computer system 1790. FIG. 27 can be used to generate a map of linking specific activities to a NS expression data, such as FIG. 13. For example, FIG. 13 maps team member conversations with EEG-E NS expression data according to an embodiment.

Neurophysiologic synchrony data for one or more teams can be sorted by team and by epoch (step 2705). According to an embodiment, the NS frequencies can be identified as part of step 2520 of the method illustrated in FIG. 25 where the collected data is analyzed to identify NS patterns. In some embodiments, the data for a single team can be collected and analyzed, while in other embodiments, data for multiple teams can be collected and analyzed. Activities of interest can then be identified (step 2710) for which the NS patterns exhibited during those activities will be identified and added to a map. According to some embodiments, the user interface module 1940 can provide a user interface that allows an administrator to select one or more events or to select one or more epochs of interest.

According to an embodiment, the NS patterns associated with each of the activities or epochs of interest can be identified and added to map that identified which NS patterns were exhibited during the one or more activities and/or epochs of interest (step 2715).

Once the data has been sorted, the data can be analyzed to create a map that identifies which NS patterns were expressed by each team and the amount of time that it took each team to complete an assigned task (step 2610). The map can be sorted by the amount of time that it took each team to complete the assigned task and/or by the number of NS patterns exhibited by each team. This map illustrates the correlation between the number of NS patterns exhibited by a team and how quickly the team was able to complete the assigned task.

A visualization of the transition map can be generated in step 2530 of FIG. 25. In some embodiments, the user interface module 1940 can be configured to generate a display, such as a web page, that displays the map to a user. In other embodiments, the report generation module 1930 can be configured to generate a report that includes the map generated in step 2715.

Example Embodiment—Complex Teamwork Simulation—Submarine Piloting and Navigation The present embodiment illustrates the application of the systems and methods for monitoring an analyzing neurophysiologic synchronies disclosed herein to a complex training task where a team is tasked with the safe piloting of a vessel. This task is such that it cannot be successfully completed until all members of the team share their specific knowledge, and successful teams put significant effort into developing and implementing training protocols for working together as a team. This training and experience allows leaders to develop mental models and relevant memory stores that provide rapid real-time pattern matching of perceived information to form the highest levels of situation awareness.

The techniques disclosed herein where applied during navigation training tasks that are an integral component of the Submarine Officer Advanced Course (SOAC) taught by the U.S. Navy Submarine School. In the SOAC course, Junior Officers can train to become department heads and ship drivers. The course is 16 weeks long with 4 classes per year. Sixty percent (60%) of the training is performed in the trainers which deliver real-world important navigation situations. Within this context, camaraderie and teamwork are critical, and accelerating the assembly and functioning of the team could make a real difference in reducing errors and operational risks.

The second task is the more complex high fidelity Submarine Piloting and Navigation (SPAN) simulations that has been the focus of parallel studies supported by the Defense Advanced Research Projects Agency (DARPA) Accelerated Learning Project. Within SPAN there are dynamically programmed situation events which are crafted to serve as the foundation of the adaptive team training Such events in the SPAN include encounters with approaching ship traffic, the need to avoid nearby shoals, changing weather conditions, and instrument failure. There are also task-oriented cues to provide information to guide the mission, and team-member cues that provide information on how other members of the team are performing/communicating. Finally there are adaptive behaviors that help the team adjust in cases where one or more members are under stress or are not familiar with aspects of the unfolding situation.

Within SPAN individual knowledge components include watch stations consisting of Helm, Fathometer operator, VMS operator, RADAR operator, GPS operator, Primary Recorder, Secondary Recorder, Plotter, Contact Coordinator, Assistant Navigator, Navigator, and Officer of the Deck. Navigation of the submarine is not something an individual can accomplish without many other people feeding information forward in an appropriate manner. It is essential that each member of the team is performing their roles in gathering information and sharing information with the team leadership structure.

Each SPAN session begins with a briefing detailing the navigation mission including a determination of the static position of the ship; weather conditions; potential hazards; and overall plan of the mission. This initial period is one of knowledge construction by the team and is analogous to Level 1 situation awareness ("SA") as described by Endsley. Level 1 of SA is the most basic level of situational awareness. Level 1 of SA involves the processes of monitoring, cue detection, and simple recognition, which leads to an awareness of multiple situational elements, such as object, events, people, systems and environmental factors, and to the current states of these situational elements, such as the locations, conditions, modes, actions, etc.

The briefing is followed by the simulation which can last from 20 to 60 minutes or longer. The simulation is a collaborative team problem solving session. In this approach, the team develops a common goal and constructs a shared model of the situation. The simulation is then paused and a debriefing session begins which is structured in the Team Dimensional Training (TDT) format developed from U.S. Navy Research and the Tactical Decision Making Under Stress (TADMUS) program. TDT is a training format that helps teams monitor and regulate their own performance based on four dimensions of teamwork deemed critical for effective team performance: Group performance on SPAN tasks is typically evaluated by experienced instructors and in pilot studies these evaluations have been reported to the research team. From a cognitive perspective this teamwork task is complex, requiring not only the monitoring of the unfolding situation and the monitoring of one's work with regard to that situation, but also the monitoring of the work of others.

The SPAN training can be enhanced using the NS techniques disclosed here. Each member of the team can be provided with a wireless EGG sensor headset similar to the sensor device 1710 illustrated in FIG. 17. Data was then collected and analyzed using systems and methods similar to those illustrated in FIGS. 17-22 described above. NS data can be collected and a neurophysiologic synchrony and frequency map can be generated using the techniques described above.

Figure 14A:
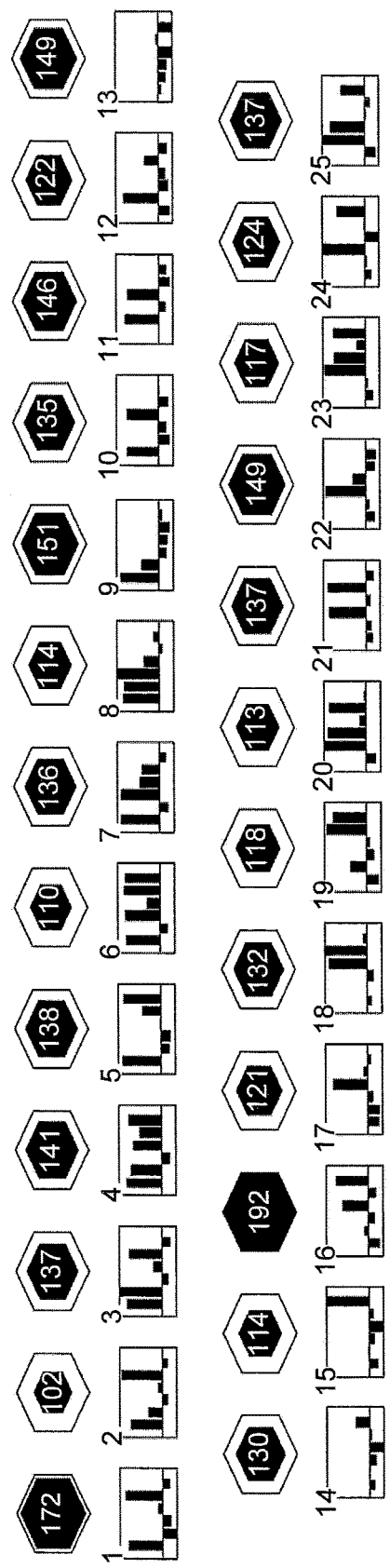
FIGS. 14A and 14B are diagrams illustrating a neurophysiologic synchrony and frequency map for a submarine piloting and navigation team according to an embodiment.
Figure 14B:
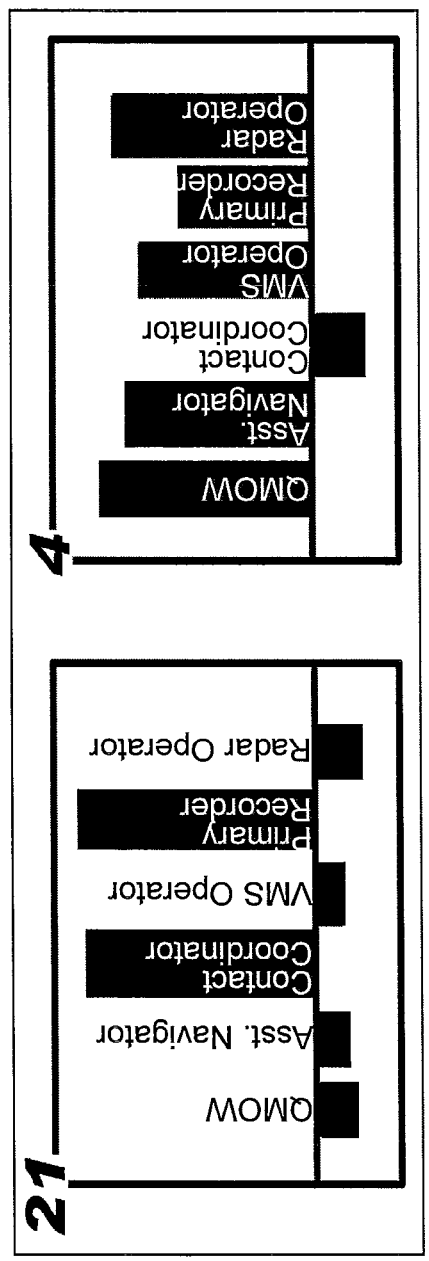

FIG. 14A is a neurophysiologic synchrony and frequency map for a SPAN team according to an embodiment. The neurophysiologic synchrony patterns are shown by the histograms in the boxes representing each neural network node, and the frequency of occurrence of each neurophysiologic synchrony is shown by the degree of fill in the hexagons. An expanded view of NS patterns 21 and 4 from the NS map of FIG. 14A is shown in FIG. 14B.

Returning now to FIG. 14A, each neurophysiologic synchrony shows a pattern of EEG-E for each member of the team and provides a snapshot of the overall team engagement. As an example, NS 21 indicates a pattern where the Contact Coordinator (Position 3) and Primary Recorder (Position 5) are highly engaged and the other 4 team members are at below average levels of engagement (FIG. 14). Node 4 indicates a pattern where the Contact Coordinator (Position 3) is below average engaged and the team members at the other positions are highly engaged.

The neurophysiologic synchronies so defined, can then be applied to explore multiple dynamics of teamwork, such as: 1) Does the quantitative and qualitative expression of NS patterns change with varying task demands? 2) Is the team's convergence toward shared situation awareness reflected in NS patterns? 3) Do preferred NS patterns change with team experience?

Figure 15:
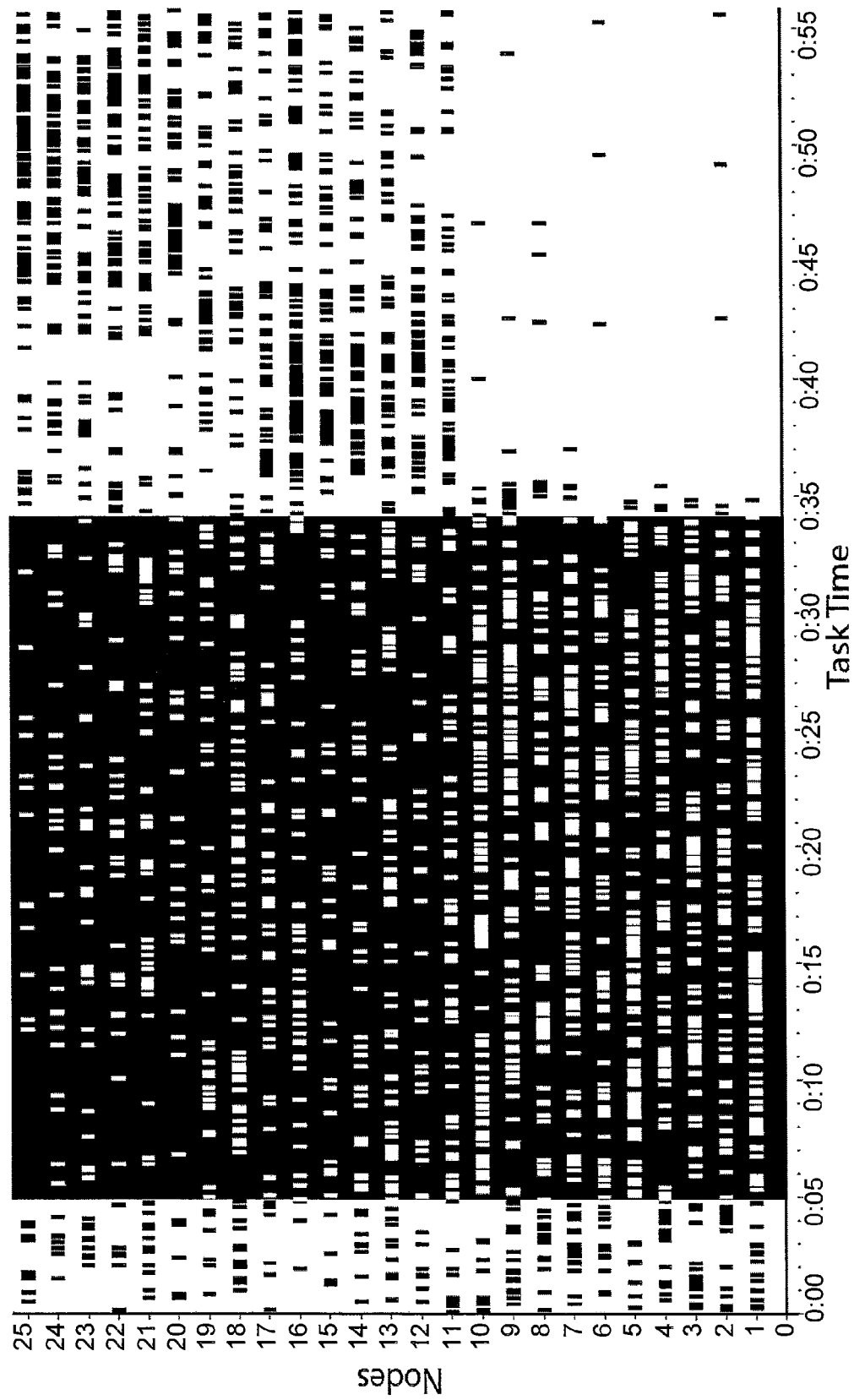
FIG. 15 is a diagram illustrating a distribution of neurophysiologic synchrony patterns during a SPAN performance including the team for which the neurophysiologic synchrony and frequency map

FIG. 15 is a graph illustrating the distribution of neurophysiologic synchrony patterns during a SPAN performance according to an embodiment. The time (in minutes) is enumerated along the (x-horizontal axis (x-axis) of the graph, and each of the 25 NS patterns are enumerated along the vertical axis (Y-axis) of the graph. The graph illustrates how the expression of different neurophysiologic synchrony patterns changes over the course of a SPAN task by one team (FIG. 15) with the pre-briefing epochs (0-4 minutes), simulation epochs (4-35 minutes), and the debriefing epochs (35-55 minutes) highlighted. The NS expressed at each second of the session are plotted vs. the task time. The graph is divided into three task segments. The initial segment on the left has been generated from data collected during the briefing period, the darkened section in the middle of the graph has been generated using data collected during the simulation itself, and the final segment to the right has been generated using data collected during the de-briefing segment.

The most noticeable difference was the near absence of NS patterns 1-10 expression during the debriefing section; instead these were replaced by NS patterns 11-25 which are those where the majority of team members expressed low EEG-E levels. The NS patterns 11-25 appeared as soon as the debriefing began, which suggests a difference in team coordination across these two task segments. After several minutes of the debriefing there was elevated expression of NS patterns 21-25 which represents moments where the team members, especially the contact coordinator, are expressing above average levels of EEG-E.

The differences between the pre-briefing and the simulation are less striking, perhaps due to the relatively short briefing period, but statistical comparisons (cross tabulation) showed that NS patterns 1, 9 and 10 were underrepresented during this segment (this is where the common feature is the Navigator and Primary Recorder have high EEG-E levels) and NS pattern 16 was over represented (this is where the VMS and Radar Operators have elevated EEG-E). These results suggest that neurophysiologic synchronies can change rapidly in response to changing task situations and that the changed synchrony patterns can persist over periods of 10 minutes or more.

Figure 28:
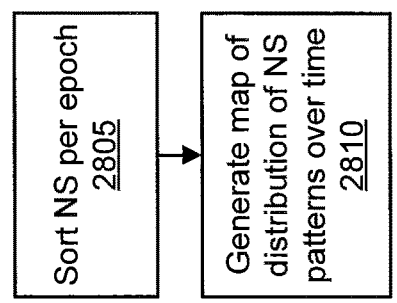
FIG. 28 is flow diagram of a method for generating a map of a distribution of neurophysiologic synchrony patterns exhibited by a team during a monitored performance according to an embodiment.

FIG. 28 illustrates a method for generating a map illustrating the distribution of neurophysiologic synchrony patterns during a monitored performance by a team according to an embodiment. The method illustrated in FIG. 28 can be used to implement, in part, step 2025 of the method illustrated in FIG. 20 or step 2525 illustrated in method 25. The method illustrated in FIG. 27 can be implemented using the data analysis module 1925 of the computer system 1790. In some embodiments, the method illustrated in FIG. 28 can be used to generate a distribution of NS patterns similar to that illustrated in the FIG. 15.

Neurophysiologic synchrony data for one or more teams can be sorted by epoch (step 2805). According to an embodiment, the NS frequencies can be identified as part of step 2520 of the method illustrated in FIG. 25 where the collected data is analyzed to identify NS patterns. A distribution map of the NS patterns exhibited by the one or more teams can then be generated (step 2810). The map identifies which NS patterns were exhibited during a particular epoch, and the map can include frequency information that identifies how often a particular NS pattern was exhibited at a particular time.

A visualization of the transition map can be generated in step 2530 of FIG. 25. In some embodiments, the user interface module 1940 can be configured to generate a display, such as a web page, that displays the map to a user. In other embodiments, the report generation module 1930 can be configured to generate a report that includes the map generated in step 2810.

Example Embodiment—Using Neurophysiologic Synchronies to Track the Development of Expertise This embodiment illustrates how the systems and methods disclosed herein can be used to study the development of expertise.

The final application of this process related to teamwork is the study of the development of expertise. The data in FIG. 15 suggests that teams may vary in NS expression depending on the efficiency (and perhaps experience) of the team. The following analysis with the SPAN teams has compared the frequencies of different neurophysiologic synchronies across the briefing, simulation and debriefing portions sections across four sessions separated by over a month during which additional training occurred.

The present embodiment illustrates a technique for assessing whether NS profiles changes as teams gain experience and/or in response to personnel changes in key team positions, and whether the NS profiles reflect the experience of the teams.

The analysis of NS profiles over multiple training sessions presents additional challenges that were not present in the embodiments where team performance was monitored and analyzed for a single training session. From an analytic perspective, this layer of studies is more complex given 1) the simulation has changed, 2) the team has a recent past history together which may be either positive or negative, and 3) there are major changes in team position and responsibility. For example: the Navigator and Assistant Navigator have switched positions during each collection series (sessions 1-2; June '09 series and sessions 3-4; July '09 series); the remaining team members and their task positions did not change. Between the first two sessions in June and the next two sessions in July only one member of the team remained in the same position (the Contact Coordinator).

These sessions were structured so that the first day the same team performed two simulations where the Navigation and Assistant Navigator switched positions and then one month later the same members again performed two simulations, again with the Navigator and Assistant Navigator switching positions.

To study the changes in the NS associated with switching the Navigator and Assistant Navigator positions, an ANN was trained according to the methods described in FIG. 22 with a normalized team performance vector, such as that generated using the method of FIG. 21. Artificial neural networks were trained with the EEG-E vectors for S1 and S2 or S3 and S4 of Team 1 and then retested separately to show the expression frequencies across each segment of the sessions. The normalized team performance vector from team #1 (T1) for the session #1 (S1) were combined and provide to an ANN to identify neurophysiologic synchronies. The normalized team performance vector from team #1 (T1) for the session #1 (S1) were combined and provide to a second ANN to identify neurophysiologic synchronies.

Note that here we trained the neural network with the combined NS vectors from both SPAN sessions, and then tested each of the individual sessions on this combined network to highlight the differences. While this form of analysis stresses the changes in neurophysiologic synchrony associated with the Navigator—Assistant Navigator switch, the consistency of usage of the different neurophysiologic synchronies can provide some information about the stability of the team. As indicated in FIGS. 16A and 16B the first time Team 1 performed SPAN simulations there were major shifts between Session 1 and Session 2 (S1 & S2) in the EEG-E neurophysiologic synchronies expression in the Brief, the Simulation and Debrief between S1 and S2. The reasons for these changes could include all those mentioned above. FIGS. 16A and 16B illustrate the frequencies of NS expression across sessions. FIG. 16A illustrates the differences in NS expressions for Team 1 in Sessions 1 and 2. FIG. 16B illustrates the differences in NS expression for Team 1 in Sessions 3 and 4.

When the team returned 1 month later, and had more experience functioning as a team, the frequency distributions of neurophysiologic synchrony expression between sessions S3 and S4 did not change as significantly. This may suggest that as a team gains experience patterns of interaction begin to be developed among team members leading to a more consistent use of NS patterns.

FIG. 29 illustrates a method for generating a map illustrating frequencies of neurophysiologic synchronies across sessions training sessions according to an embodiment. The method illustrated in FIG. 29 can be used to implement, in part, step 2025 of the method illustrated in FIG. 20 or step 2525 illustrated in method 25. The method illustrated in FIG. 27 can be implemented using the data analysis module 1925 of the computer system 1790. In some embodiments, the method illustrated in FIG. 29 can be used to generate a distribution of NS patterns similar to that illustrated in the FIGS. 16A and 16B.

Neurophysiologic synchrony data for one or more teams can be sorted per segment and per session (step 2905). As described above, each session can comprise multiple segments, and each segment can comprise multiple epochs. The frequencies of each of the NS patterns can then be determined for each of the segments (step 2910). According to an embodiment, the NS frequencies can be identified as part of step 2520 of the method illustrated in FIG. 25 where the collected data is analyzed to identify NS patterns. A map of the relative frequencies of each of the NS patterns per segment can then be generated (step 2915). According to some embodiments, the map can include the an count of the number of times that each pattern appeared per segment as well as how many times a particular NS pattern appeared in a segment relative to other NS patterns that appeared in that segment.

A visualization of the transition map can be generated in step 2530 of FIG. 25. In some embodiments, the user interface module 1940 can be configured to generate a display, such as a web page, that displays the map to a user. In other embodiments, the report generation module 1930 can be configured to generate a report that includes the map generated in step 2915.

Various illustrative implementations of the present invention have been described. However, one of ordinary skill in the art will see that additional implementations are also possible and within the scope of the present invention. Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in computer or controller accessible on computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A computer-implemented method for monitoring and analyzing neurophysiologic indicators of a team, where one or more processors are programmed to perform the steps comprising:
    acquiring electroencephalogram (EEG) data from one or more EEG sensors in each of a plurality of wearable EEG apparatuses, while the plurality of wearable EEG apparatuses are worn by a plurality of members of the team, during performance of one or more collaborative tasks;
    receiving neurophysiologic data, for each of the plurality of members of the team, derived from at least the acquired EEG data;
    determining at least one neurophysiologic synchrony pattern exhibited by the team while performing the one or more collaborative tasks, wherein each neurophysiologic synchrony pattern comprises a combination of measures of at least one neurophysiologic state, for each of the plurality of members of the team, that has been simultaneously detected for all of the plurality of members of the team;
    comparing the at least one neurophysiologic synchrony pattern for the team to at least one expected neurophysiologic synchrony pattern; and
    generating feedback for at least one member of the team based on a difference between the at least one neurophysiologic synchrony pattern for the team and the at least one expected neurophysiologic synchrony pattern, wherein the feedback comprises one or more of tactile feedback, audio feedback, and visual feedback.

2. The method of claim 1, further comprising generating at least one performance report providing a visualization of the at least one neurophysiologic synchrony pattern.

3. The method of claim 2, further comprising:
    receiving environmental condition data related to the environment in which the plurality of members of the team are performing the one or more collaborative tasks collected while the plurality of members of the team are performing the one or more collaborative tasks;
    identifying events occurring during the performance of the one or more collaborative tasks using the environmental condition data; and
    correlating the at least one neurophysiologic synchrony pattern with one or more identified events that occurred during the course of the performance of the one or more collaborative tasks to generate event interpretation data for the plurality of members of the team;
    wherein generating the at least one performance report includes generating a map providing a visual representation of the correlation of the at least one neurophysiologic synchrony pattern with the one or more events.

4. The method of claim 3, further comprising correlating event interpretation data with expert data to assess the performance of the plurality of members of the team in response to the one or more events.

5. The method of claim 3, further comprising correlating event interpretation data for the plurality of members of the team with event interpretation data from a previous session to assess improvement in learning by the plurality of members of the team.

6. The method of claim 3, further comprising correlating event interpretation data for the plurality of members of the team with event interpretation data for a second team performing the one or more collaborative tasks to assess the performance of the plurality of members of the team in comparison to the second team.

7. The method of claim 2, wherein the visualization of the at least one neurophysiologic synchrony pattern comprises a histogram of each neurophysiologic synchrony pattern.

8. The method of claim 1, wherein determining the at least one neurophysiologic synchrony pattern comprises normalizing the neurophysiologic data received for the plurality of members of the team.

9. The method of claim 8, wherein normalizing the neurophysiologic data comprises:
    calculating z-scores for each of the plurality of members of the team for each of a plurality of epochs;
    partitioning the neurophysiologic data for each of the plurality of members of the team into a normalized data vector based on the z-scores; and
    generating a normalized data vector for the plurality of members of the team by combining the normalized data vectors of the plurality of members of the team.

10. The method of claim 6, wherein determining at least one neurophysiologic synchrony pattern comprises determining a plurality of neurophysiologic synchrony patterns by:
    training an artificial neural network using the normalized data vector for the plurality of members of the team to partition the normalized data vector into a set of neurophysiologic synchrony patterns; and
    generating a map of the neurophysiologic synchrony patterns for the plurality of members of the team and a frequency map indicating the number of times that each of the neurophysiologic synchrony patterns was expressed by the plurality of members of the team during the one or more collaborative tasks.

11. The method of claim 1 wherein the one or more collaborative tasks comprise a simulation.

12. The method of claim 11, wherein the simulation comprising a training exercise, and wherein generating at least one performance report comprises assessing the performance of the plurality of members of the team in learning at least one skill.

13. The method of claim 1 wherein the one or more tasks comprise changing task events, and wherein generating at least one performance report comprises assessing the performance of the plurality of members of the team in response to the changing task events.

14. The method of claim 1, wherein the at least one expected neurophysiologic synchrony pattern represents at least one neurophysiologic synchrony pattern associated with expert performance of the one or more collaborative tasks.

15. The method of claim 1, wherein the feedback is provided to an instructor monitoring the performance of the one or more collaborative tasks by the plurality of members of the team.

16. The method of claim 1, wherein the feedback comprises tactile feedback provided by a haptic device in at least one of the plurality of wearable EEG apparatuses.

17. The method of claim 1, wherein the feedback comprises audiovisual feedback.

18. The method of claim 1, further comprising:
receiving additional neurophysiologic data derived from at least EEG data acquired from each of the plurality of members of the team after providing the feedback to the at least one member of the team;
determining at least one neurophysiologic synchrony pattern exhibited by the plurality of members of the team while performing the one or more collaborative tasks after the at least one member of the team received the feedback; and
generating at least one performance report providing a visualization of the at least one neurophysiologic synchrony pattern exhibited by the plurality of members of the team during the performance of the one or more collaborative tasks after the feedback was provided in order to determine whether improvement in performance by the plurality of members of the team has resulted from the feedback.

19. The method of claim 1, wherein the neurophysiologic data comprises a plurality of neurophysiologic metrics collected from each of the plurality of members of the team, and wherein determining the at least one neurophysiologic synchrony pattern comprises combining the plurality of neurophysiologic metrics into the at least one neurophysiologic synchrony pattern.

20. The method of claim 1, further comprising selecting a type of the feedback to be generated from a plurality of types of feedback based on the difference between the at least one neurophysiologic synchrony pattern and the at least one expected neurophysiologic synchrony pattern.

21. The method of claim 20, wherein the feedback is configured to improve one or both of the performance of the one or more collaborative tasks and the progress within the one or more collaborative tasks by the plurality of members of the team.

22. A technical system for monitoring and analyzing neurophysiologic indicators of a team, the system comprising:
a plurality of wearable electroencephalogram (EEG) apparatuses comprising EEG sensors configured to collect neurophysiologic data from each of a plurality of members of the team, while the plurality of members of the team are performing one or more collaborative tasks;
a data analysis server comprising at least one processor and one or more modules that, when executed by the at least one processor,
receive the neurophysiologic data collected by the plurality of wearable EEG apparatuses,
determine at least one neurophysiologic synchrony pattern exhibited by the team while performing the one or more collaborative tasks, wherein each neurophysiologic synchrony pattern comprises a combination of measures of at least one neurophysiologic state, for each of the plurality of members of the team, that has been simultaneously detected for all of the plurality of members of the team,
compare the at least one neurophysiologic synchrony pattern for the team to at least one expected neurophysiologic synchrony pattern, and
generate feedback for at least one member of the team based on a difference between the at least one neurophysiologic synchrony pattern for the team and that at least one expected neurophysiologic synchrony pattern, wherein the feedback comprises one or more of tactile feedback, audio feedback, and visual feedback.

23. The system of claim 22, wherein each of the plurality of wearable EEG apparatuses comprises a plurality of EEG sensors and a memory configured to store the neurophysiologic data.

24. The system of claim 23, wherein each of the plurality of wearable EEG apparatuses is configured to wirelessly transmit the neurophysiologic data to the data analysis server.

25. The system of claim 22, wherein the one or more modules are further configured to, when executed by the at least one processor, generate at least one performance report providing a visualization of the at least one neurophysiologic synchrony pattern.

26. The system of claim 25 wherein the one or more modules are further configured to, when executed by the at least one processor:
correlate the at least one neurophysiologic synchrony pattern with one or more events that occurred during performance of the one or more collaborative tasks to generate event interpretation data for the plurality of members of the team; and
generate a map providing a visual representation of the correlation of the at least one neurophysiologic synchrony pattern with the one or more events.

27. The system of claim 25, wherein the one or more modules are further configured to, when executed by the at least one processor, correlate event interpretation data with expert data to assess the performance of the plurality of members of the team in response to the one or more events.

28. The system of claim 25, wherein the one or more modules are further configured to, when executed by the at least one processor, correlate event interpretation data for the plurality of members of the team with event interpretation data from a previous session to assess improvement in learning by the plurality of members of the team.

29. The system of claim 25, wherein the one or more modules are further configured to, when executed by the at least one processor, correlate event interpretation data for the plurality of members of the team with event interpretation data for a second team performing the one or more collaborative tasks to assess the performance of the plurality of members of the team in comparison to the second team.

30. The system of claim 25, wherein determining the at least one neurophysiologic synchrony pattern comprises normalizing the neurophysiologic data.

31. The system of claim 30, wherein normalizing the neurophysiologic data comprises:
   calculating z-scores for each of the plurality of members of the team for each of a plurality of epochs;
   partitioning the neurophysiologic data for each of the plurality of members of the team into a normalized data vector based on the z-scores; and
   generating a normalized data vector for the plurality of members of the team by combining the normalized data vectors of the plurality of members of the team.

32. The system of claim 31 wherein determining at least one neurophysiologic synchrony pattern comprises determining a plurality of neurophysiologic synchrony patterns by:
   training an artificial neural network using the normalized data vector for the plurality of members of the team to partition the normalized data vector into a set of neurophysiologic synchrony patterns; and
   generating a map of the neurophysiologic synchrony pattern for the plurality of members of the team and a frequency map indicating the number of times that each of the neurophysiologic synchrony patterns was expressed by the plurality of members of the team during the one or more collaborative tasks.

33. The system of claim 25 wherein the one or more collaborative tasks comprise a simulation.

34. The system of claim 33, wherein the simulation comprises a training exercise, and wherein the report generation module is configured to generate at least one performance report assessing the performance of the plurality of members of the team in learning at least one skill.

35. The system of claim 25, wherein the one or more tasks comprise changing task events, and wherein the one or more modules are further configured to, when executed by the at least one processor, generate at least one performance report assessing the performance of the plurality of members of the team in response to the changing task events.

36. The system of claim 25 wherein the one or more modules are further configured to, when executed by the at least one processor:
   receive additional neurophysiologic data collected by the plurality of wearable EEG apparatuses from the plurality of members of the team after providing the feedback to the at least one member of the team;
   determine at least one neurophysiologic synchrony pattern exhibited by the plurality of members of the team while performing the one or more collaborative tasks after the at least one member of the team received the feedback; and
   generate at least one performance report providing a visualization of the at least one neurophysiologic synchrony pattern exhibited by the plurality of members of the team during the performance of the one or more collaborative tasks after the feedback was provided in order to determine whether improvement in performance by the plurality of members of the team has resulted from the feedback.

37. The system of claim 22, wherein the at least one expected neurophysiologic synchrony pattern represents at least one neurophysiologic synchrony pattern associated with expert performance of the one or more collaborative tasks.

38. The system of claim 22, wherein the feedback is provided to an instructor monitoring the performance of the one or more collaborative tasks by the plurality of members of the team.

39. The system of claim 22, wherein generating the feedback comprises generating a control signal to a haptic device in at least one of the plurality of wearable EEG apparatuses to provide tactile feedback to at least one of the plurality of members of the team.

40. The system of claim 22, wherein the feedback comprises audiovisual feedback.

41. The system of claim 22, wherein the neurophysiologic data comprises a plurality of neurophysiologic metrics collected from each of the plurality of members of the team, and wherein determining the at least one neurophysiologic synchrony pattern comprises combining the plurality of neurophysiologic metrics into the at least one neurophysiologic synchrony pattern.

* * * * *